(12) United States Patent
Kumar et al.

(10) Patent No.: US 7,137,344 B2
(45) Date of Patent: Nov. 21, 2006

(54) HYBRID ENERGY OFF HIGHWAY VEHICLE LOAD CONTROL SYSTEM AND METHOD

(75) Inventors: Ajith Kuttannair Kumar, Erie, PA (US); Lembit Salasoo, Schenectady, NY (US); Robert Dean King, Schenectady, NY (US); Henry Todd Young, North East, PA (US)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 10/918,849

(22) Filed: Aug. 9, 2004

(65) Prior Publication Data
US 2005/0039630 A1 Feb. 24, 2005

Related U.S. Application Data

(63) Continuation-in-part of application No. 10/378,335, filed on Mar. 3, 2003, now Pat. No. 6,973,880, which is a continuation-in-part of application No. 10/033,347, filed on Dec. 26, 2001, now Pat. No. 6,591,758.

(60) Provisional application No. 60/278,975, filed on Mar. 27, 2001.

(51) Int. Cl.
*B61C 3/00* (2006.01)

(52) U.S. Cl. .............................. 105/35; 105/50; 105/61; 180/65.3

(58) Field of Classification Search ................ 104/289, 104/288, 287; 105/35, 26.05, 49, 50, 61; 320/101, 125, 126, 137, 140, 166, 167, 150; 180/65.3, 65.4; 290/9, 14, 17, 25, 40 R, 290/50, 51; 318/139, 376, 432
See application file for complete search history.

(56) References Cited

U.S. PATENT DOCUMENTS 5,283,470 A 2/1994 Hadley et al.

(Continued)

FOREIGN PATENT DOCUMENTS

EP 0 640 507 3/1995

*Primary Examiner*—Mark T. Le
(74) *Attorney, Agent, or Firm*—Senniger Powers Carlos Hanze

(57) ABSTRACT

A system and method for managing electrical power generated by an engine for use in connection with operating a hybrid energy off highway vehicle load control system. A load control circuit determines a current operating condition of the Off Highway Vehicle, and determines a corresponding target operating condition of the Off Highway Vehicle The load control system determines a difference between the current operating condition and a target operating condition to identify transients. The load control system delivers power from the power source to a energy storage for an initial period after a transient condition is identified and then delivers power from the power source to source to the traction motors to propel the Off Highway Vehicle. The load control system also retrieves to power from the energy storage to assist in propelling the Off Highway Vehicle.

33 Claims, 30 Drawing Sheets

U.S. PATENT DOCUMENTS

| | | |
|---|---|---|
| 5,291,960 A | 3/1994 | Brandenburg et al. |
| 5,345,154 A | 9/1994 | King |
| 5,373,195 A | 12/1994 | De Doncker et al. |
| 5,466,998 A | 11/1995 | Kinoshita et al. |
| 5,517,093 A | 5/1996 | Augustyniak et al. |
| 5,517,923 A | 5/1996 | Cathiard |
| 5,589,743 A | 12/1996 | King |
| 5,659,240 A | 8/1997 | King |
| 5,710,699 A | 1/1998 | King et al. |
| 5,723,956 A | 3/1998 | King et al. |
| 5,898,282 A * | 4/1999 | Drozdz et al. .............. 318/139 |
| 5,905,360 A | 5/1999 | Ukita et al. |
| 5,999,864 A | 12/1999 | Thiel et al. |
| 6,308,639 B1 | 10/2001 | Donnelly et al. |
| 6,331,365 B1 | 12/2001 | King |
| 6,434,452 B1 | 8/2002 | Gray |
| 6,441,581 B1 * | 8/2002 | King et al. .................. 320/101 |
| 6,486,568 B1 | 11/2002 | King et al. |
| 6,591,758 B1 | 7/2003 | Kumar |
| 6,612,245 B1 | 9/2003 | Kumar et al. |
| 6,612,246 B1 | 9/2003 | Kumar |
| 6,615,118 B1 | 9/2003 | Kumar |
| 6,737,822 B1 | 5/2004 | King |
| 6,809,429 B1 | 10/2004 | Frank |
| 2002/0174798 A1 | 11/2002 | Kumar |

* cited by examiner

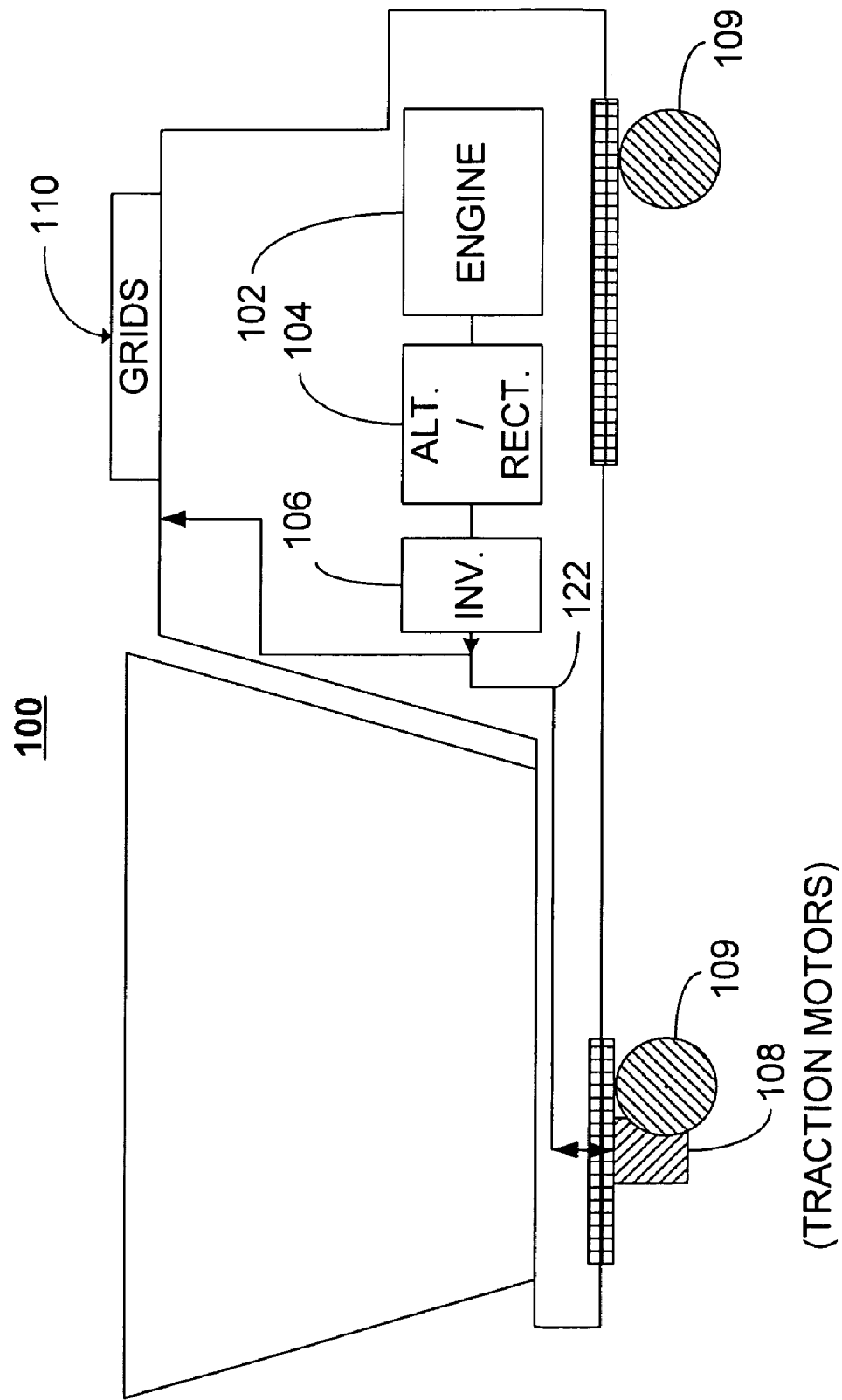

Energy Management System
Prevents Complete
Discharge In View Of
Anticipated Demand

HYBRID ENERGY OFF HIGHWAY VEHICLE LOAD CONTROL SYSTEM AND METHOD

CROSS REFERENCE TO RELATED APPLICATIONS

This Application is a Continuation-in-Part of U.S. patent application Ser. No. 10/378,335, filed on Mar. 3, 2003, now U.S. Pat. No. 6,973,880 entitled "HYBRID ENERGY OFF HIGHWAY VEHICLE ELECTRIC POWER STORAGE SYSTEM AND METHOD"; which is a Continuation-in-Part of application Ser. No. 10/033,347, filed on Dec. 26, 2001, now U.S. Pat. No. 6,591,758 entitled "HYBRID ENERGY LOCOMOTIVE ELECTRICAL POWER STORAGE SYSTEM"; and which claims priority from U.S. Provisional Application Ser. No. 60/278,975, filed on Mar. 27, 2001, the entire disclosure of which is incorporated herein by reference.

FIELD OF THE INVENTION

The invention relates generally to engine load control system and method for use in connection with a large, Off-Highway Vehicle such as a railway locomotive, mining truck or excavator. In particular, the invention relates to a system and method for managing engine load by storing electrical energy generated during engine start-up or excess prime mover power and transferring stored electrical energy to assist in propelling Off-Highway Vehicles driven by electric traction motors.

BACKGROUND OF THE INVENTION

FIG. 1A is a block diagram of an exemplary prior art off highway vehicle. In particular, FIG. 1A generally reflects a typical prior art diesel-electric off highway vehicle. Off highway vehicles include locomotives and mining trucks and excavators, where mining trucks and excavators range from 100-ton capacity to 400-ton capacity, but may be smaller or larger. Off highway vehicles typically have a power weight ratio of less than 10 h.p. per ton with a ratio of 5 h.p. per ton being common. Off highway vehicles typically also utilize dynamic or electric braking. This is in contrast to a vehicle such as a passenger bus that has a ratio of 15 h.p. per ton or more and utilizes mechanical or resistive braking.

As illustrated in FIG. 1A, the off highway vehicle 100 includes a diesel primary power source 102 driving an alternator/rectifier 104. As is generally understood in the art, the alternator/rectifier 104 provides DC electric power to an inverter 106 that converts the AC electric power to a form suitable for use by a traction motor 108. One common Off Highway Vehicle configuration includes one inverter/traction motor per wheel 109, with two wheels 109 comprising the equivalent of an axle (not shown). Such a configuration results in one or two inverters per Off Highway Vehicle. FIG. 1A illustrates a single inverter 106 and a single traction motor 108 for convenience. By way of example, large excavation dump trucks may employ motorized wheels such as the GEB23™ AC motorized wheel employing the GE150AC™ drive system (both of which are available from the assignee of the present system).

Strictly speaking, an inverter converts DC power to AC power. A rectifier converts AC power to DC power. The term "converter" is also sometimes used to refer to inverters and rectifiers. The electrical power supplied in this manner may be referred to as prime mover power (or primary electric power) and the alternator/rectifier 104 may be referred to as a source of prime mover power. In a typical AC diesel-electric Off Highway Vehicle application, the AC electric power from the alternator is first rectified (converted to DC). The rectified AC is thereafter inverted (e.g., using power electronics such as Insulated Gate Bipolar Transistors (IGBTs) or thyristors operating as pulse width modulators) to provide a suitable form of AC power for the respective traction motor 108.

As is understood in the art, traction motors 108 provide the tractive power to move Off Highway Vehicle 100 and any other vehicles, such as load vehicles, attached to Off Highway Vehicle 100. Such traction motors 108 may be an AC or DC electric motors. When using DC traction motors, the output of the alternator is typically rectified to provide appropriate DC power. When using AC traction motors, the alternator output is typically rectified to DC and thereafter inverted to three-phase AC before being supplied to traction motors 108.

The traction motors 108 also provide a braking force for controlling speed or for slowing Off Highway Vehicle 100. This is commonly referred to as dynamic braking, and is generally understood in the art. Simply stated, when a traction motor 108 is not needed to provide motivating force, it can be reconfigured (via power switching devices) so that the motor operates as an electric power generator. So configured, the traction motor 108 generates electric energy which has the effect of slowing the Off Highway Vehicle. In prior art Off Highway Vehicles, such as illustrated in FIG. 1A, the energy generated in the dynamic braking mode is typically transferred to resistance grids 110 mounted on the vehicle housing. Thus, the dynamic braking energy is converted to heat and dissipated from the system. Such electric energy generated in the dynamic braking mode is typically wasted.

It should be noted that, in a typical prior art DC hybrid vehicle, the dynamic braking grids 110 are connected to the traction motors 108. In a typical prior art AC hybrid vehicle, however, the dynamic braking grids are connected to the DC traction bus 122 because each traction motor 108 is normally connected to the bus by way of an associated inverter 106 (see FIG. 1B). FIG. 1A generally illustrates an AC hybrid vehicle with a plurality of traction motors; a single inverter is depicted for convenience.

FIG. 1B is an electrical schematic of a typical prior art Off Highway Vehicle 100. It is generally known in the art to employ a single electrical energy source 102, however, two or more electrical energy sources may be employed. In the case of a single electrical energy source, a diesel engine 102 coupled to an alternator 104 provides the primary source power 104. In the case where two or more electrical energy sources 102 are provided, a first system comprises the prime mover power system that provides power to the traction motors 108. A second system (not shown) provides power for so-called auxiliary electrical systems (or simply auxiliaries). Such an auxiliary system may be derived as an output of the alternator, from the DC output, or from a separate alternator driven by the primary power source. For example, in FIG. 1B, a diesel engine 102 drives the prime mover power source 104 (e.g., an alternator and rectifier), as well as any auxiliary alternators (not illustrated) used to power various auxiliary electrical subsystems such as, for example, lighting, air conditioning/heating, blower drives, radiator fan drives, control battery chargers, field exciters, power steering, pumps, and the like. The auxiliary power system may also receive power from a separate axle driven generator. Auxiliary power may also be derived from the traction alternator of prime mover power source 104.

The output of the prime mover power source 104 is connected to a DC bus 122 that supplies DC power to the traction motor 108. The DC bus 122 may also be referred to as a traction bus 122 because it carries the power used by the traction motor subsystems. As explained above, a typical prior art diesel-electric Off Highway Vehicle includes two traction motors 108, one per each wheel 109, wherein the two wheels 109 operate as an axle assembly, or axle-equivalent. However, a system may be also be configured to include a single traction motor per axle or configured to include four traction motors, one per each wheel 109 of a two axle-equivalent four-wheel vehicle. In FIG. 1B, each traction motor subsystem 124A and 124B comprises an inverter (e.g., inverter 106A and 106B) and a corresponding traction motor (e.g., traction motor 108A and 108B, respectively).

During braking, the power generated by the traction motors 108 is dissipated through a dynamic braking grid subsystem 110. As illustrated in FIG. 1B, a typical prior art dynamic braking grid subsystem 110 includes a plurality of contactors (e.g., DB1–DB5) for switching a plurality of power resistive elements between the positive and negative rails of the DC bus 122. Each vertical grouping of resistors may be referred to as a string. One or more power grid cooling blowers (e.g., BL1 and BL2) are normally used to remove heat generated in a string due to dynamic braking. It is also understood that these contactors (DB1–DB5) can be replaced by solid-state switches like GTO/IGBTs and can be modulated (like a chopper) to control the effective dynamic brake resistance.

As indicated above, prior art Off Highway Vehicles typically waste the energy generated from dynamic braking. Attempts to make productive use of such energy have been unsatisfactory. For example, one system attempts to use energy generated by a traction motor 108 in connection with an electrolysis cell to generate hydrogen gas as a supplemental fuel source. Among the disadvantages of such a system are the safe storage of the hydrogen gas and the need to carry water for the electrolysis process. Still other prior art systems fail to recapture the dynamic braking energy at all, but rather selectively engage a special generator that operates when the associated vehicle travels downhill. One of the reasons such a system is unsatisfactory is because it fails to recapture existing braking energy and fails to make the captured energy available for reuse on board the Off Highway Vehicle.

One desirable characteristics of an OHV system is fast acceleration and response. The engine load rate limits the present vehicles from accelerations. With hybrid energy storage it is possible to preload the engine and put that energy into the batteries (or other storage means) before the vehicle needs to move and thereby loading the engine. Therefore, there is a need for an energy management system and method that control when energy is captured and stored, and when such energy is regenerated for later use for traction and auxiliaries to improve the fuel efficiency and improve the performance of Off Highway Vehicles.

SUMMARY OF THE INVENTION

In one aspect of the invention, the invention provides a hybrid off-road vehicle having a high load to power ratio with improved transient operating response to commanded vehicle operation by managing electrical power generation, transmission and storage on the vehicle. The vehicle includes wheels supporting the vehicle. The vehicle also includes a primary power source on the vehicle for generating primary electrical power. The vehicle includes a traction motor system associated with at least one of the wheels for rotating the wheel to propel the vehicle. The vehicle includes an electric energy storage system on the vehicle for storing and discharging electrical power. The vehicle also includes a load control circuit electrically connected to the primary power source, the energy storage system and the traction motor system for selectively delivering power from the power source to the traction motor system and from the power source to the energy storage system. The vehicle further includes a first sensor for sensing a command parameter indicative of a commanded operating condition of the vehicle. The vehicle also includes a second sensor for sensing a operating parameter indicative of a current operating condition of the vehicle. The vehicle also includes a processor responsive to the command and operating parameters for generating a control signal that is used by the load control circuit for selectively controlling the delivery of the power from the power source to the traction motor system and from the power source to the energy storage system for the controlling the generation, transmission and storage of power on the vehicle.

In another aspect of the invention, a method for managing electrical power generated by a power source for use in connection with operating a hybrid energy off highway vehicle is provided. The vehicle includes wheels supporting the vehicle and a traction motor system associated with at least one of the wheels for rotating the wheel to propel the vehicle. The method includes sensing an operating parameter of the off highway vehicle. The sensed operating parameter indicates a current operating condition of the off highway vehicle. The method also includes sensing a command parameter for the off highway vehicle. The commanded parameter indicates a commanded operating condition The method further includes calculating a difference between the current operating condition and the commanded operating condition. The method further includes selectively controlling the delivery of the power from the power source to the traction motor system and from the power source to an energy storage system as function of the calculated difference for the controlling the generation, transmission and storage of power on the vehicle.

Other aspects and features of the present invention will be in part apparent and in part pointed out hereinafter.

BRIEF DESCRIPTION OF THE DRAWINGS

FIG. 1A is a block diagram of a prior art Off Highway Vehicle.

Corresponding reference characters and designations generally indicate corresponding parts throughout the drawings.

DETAILED DESCRIPTION OF ASPECTS OF THE INVENTION

Figure 2:
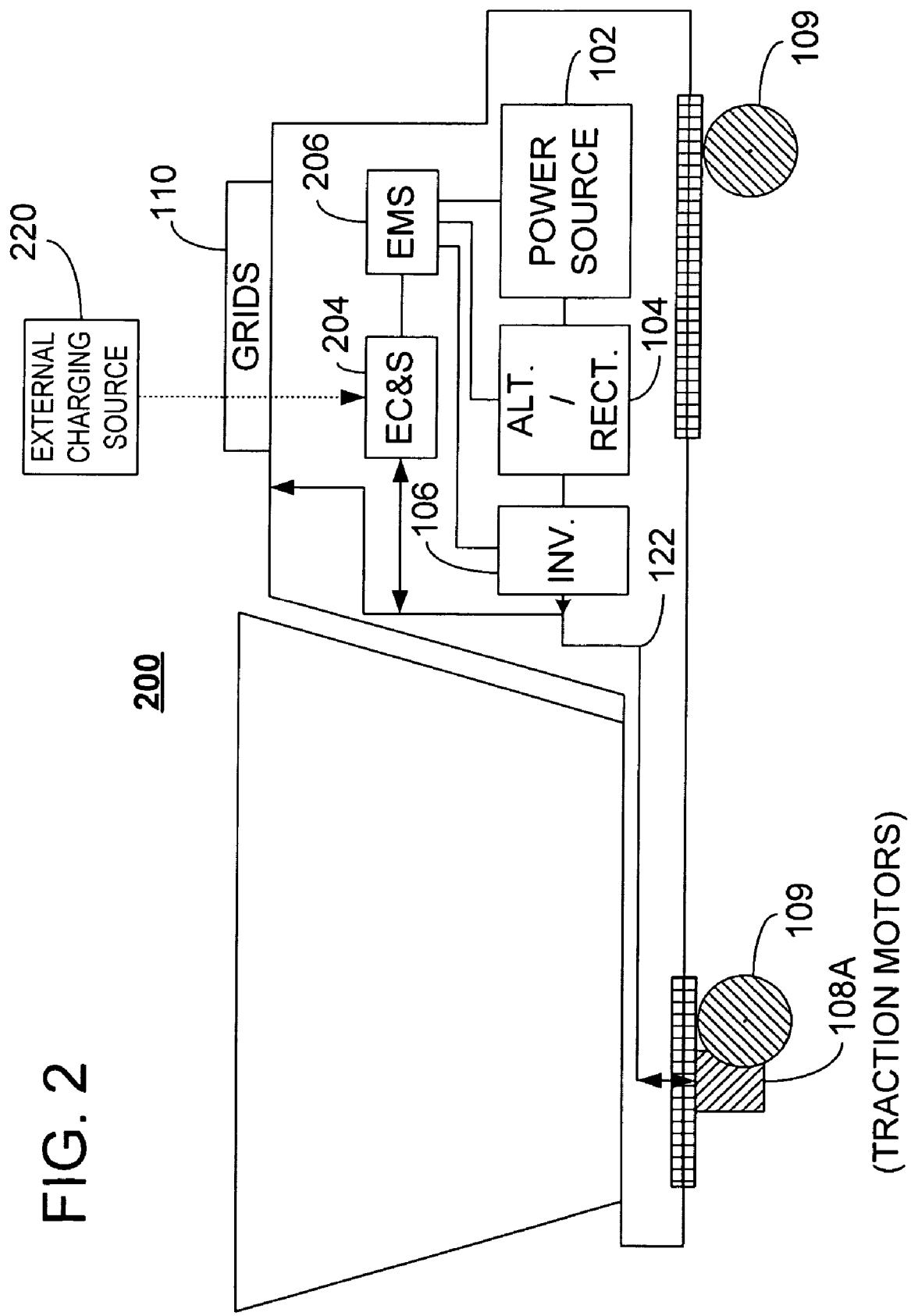
FIG. 2 is a block diagram of one embodiment of hybrid energy Off Highway Vehicle system.

FIG. 2 is a block diagram of one embodiment of a hybrid energy Off Highway Vehicle system 200. In this embodiment, the hybrid energy Off Highway Vehicle system preferably captures and regenerates at least a portion of the dynamic braking electric energy generated when the vehicle traction motors operate in a dynamic braking mode.

The Off Highway Vehicle system includes an Off Highway Vehicle 200 having a primary energy source 104. In some embodiments, a power converter is driven by the primary energy source 102 and provides primary electric power. A traction bus 122 is coupled to the power converter and carries the primary electric power. A traction drive 108 is coupled to the traction bus 122. The traction drive 108 has a motoring mode in which the traction drive is responsive to the primary electric power for propelling the Off Highway Vehicle 200. The traction drive 108 has a dynamic braking mode of operation wherein the traction drive generates dynamic braking electrical energy. An energy management system 206 comprises an energy management processor (not shown). The energy management system 206 determines a power storage parameter and a power transfer parameter. An energy capture and storage system 204 is responsive to the energy management system 206. The energy capture and storage system 204 selectively stores electrical energy as a function of the power storage parameter. The energy capture and storage system 204 selectively supplies secondary electric power from the electrical energy stored therein as a function of the power transfer parameter.

In one embodiment, the energy capture and storage system 204 selectively receives electrical power generated during the dynamic braking mode of operation and stores it for later regeneration and use. In the alternative or in addition to receiving and storing dynamic braking power, energy capture and storage system 204 can also be constructed and arranged to receive and store power from other sources. For example, excess prime mover power from primary energy source 104 can be transferred and stored. Similarly, when two or more Off Highway Vehicles 200 operate in tandem and are electrically coupled, excess power from one of the Off Highway Vehicles can be transferred and stored in energy capture and storage system 204. Also, a separate primary energy source 102 (e.g., diesel generator, fuel cell, trolley line, etc.) can be used to supply a charging voltage (e.g., a constant charging voltage) to energy capture and storage system 204. Still another source of charging is an optional off-vehicle charging source 220. For example, energy capture and storage system 204 can be charged by external charging source 220 such as a battery charger.

The energy capture and storage system 204 preferably includes at least one of the following storage subsystems for storing the electrical energy generated during the dynamic braking mode: a battery subsystem, a flywheel subsystem, an ultra-capacitor subsystem, and a fuel cell fuel generator (not shown). Other storage subsystems are possible. Ultra-capacitors are available from Maxwell Technologies. These storage subsystems may be used separately or in combination. When used in combination, these storage subsystems can provide synergistic benefits not realized with the use of a single energy storage subsystem. A flywheel subsystem, for example, typically stores energy relatively fast but may be relatively limited in its total energy storage capacity. A battery subsystem, on the other hand, often stores energy relatively slowly but can be constructed to provide a relatively large total storage capacity. Hence, a flywheel subsystem may be combined with a battery subsystem wherein the flywheel subsystem captures the dynamic braking energy that cannot be timely captured by the battery subsystem. The energy thus stored in the flywheel subsystem may be thereafter used to charge the battery. Accordingly, the overall capture and storage capabilities are preferably extended beyond the limits of either a flywheel subsystem or a battery subsystem operating alone. Such synergies can be extended to combinations of other storage subsystems, such as a battery and ultra-capacitor in combination where the ultra-capacitor supplies the peak demand needs. In the case where the primary energy source 102 is a fuel cell, the energy capture and storage system 204 may include an electrolysis system that generates hydrogen from the fuel cell wastewater. The stored hydrogen is provided to the fuel cell as an energy source for providing primary or secondary power.

It should be noted at this point that, when a flywheel subsystem is used, a plurality of flywheels is preferably arranged to limit or eliminate the gyroscopic effect each flywheel might otherwise have on the Off Highway Vehicle and load vehicles. For example, the plurality of flywheels may be arranged on a six-axis basis to greatly reduce or eliminate gyroscopic effects. It should be understood, however, that reference herein to a flywheel embraces a single flywheel or a plurality of flywheels.

Referring still to FIG. 2, energy capture and storage system 204 not only captures and stores electric energy generated in the dynamic braking mode of the Off Highway Vehicle, it also supplies the stored energy to assist the Off Highway Vehicle effort (i.e., to supplement and/or replace primary energy source power).

Figure 3:
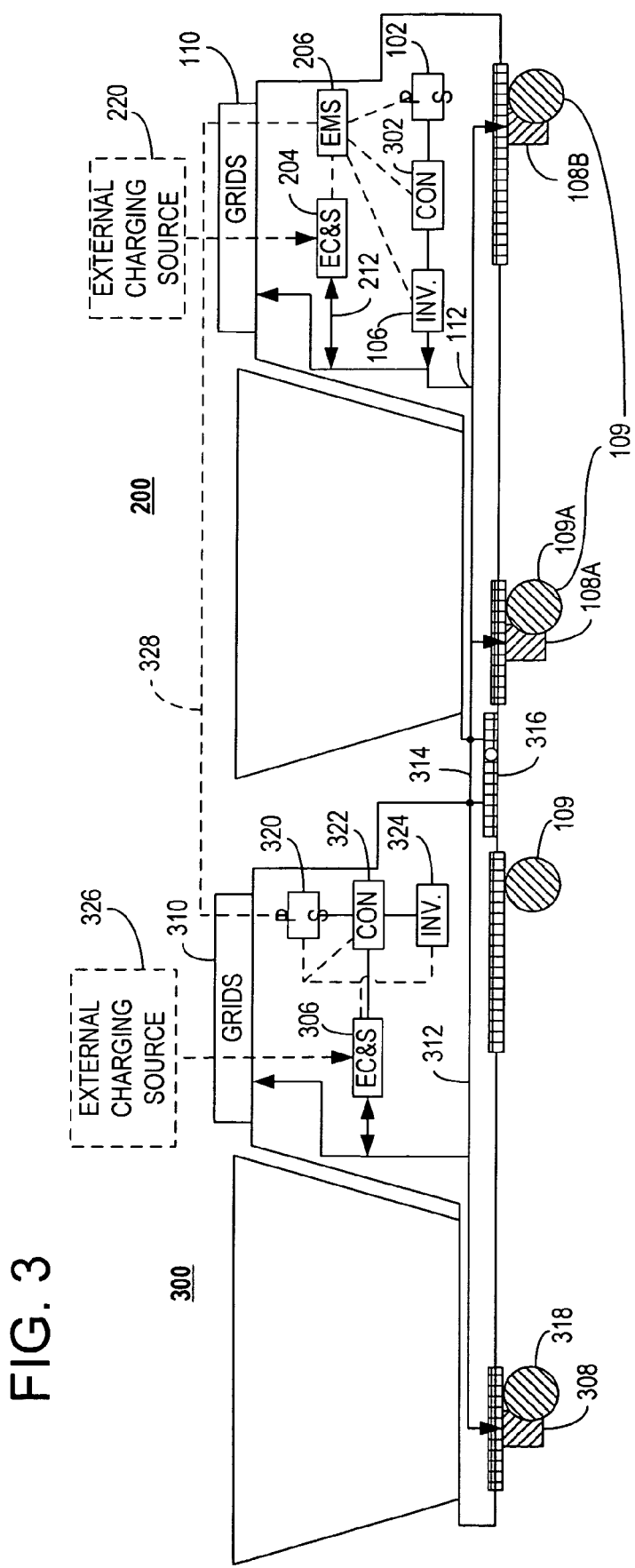
FIG. 3 is a block diagram of one embodiment of hybrid energy Off Highway Vehicle system configured with a fuel cell and a load vehicle.

It should be understood that it is common for each Off Highway Vehicle 200 to operate separately from other Off Highway Vehicles. However, two or more Off Highway Vehicles could operate in tandem where they are mechanically and/or electrically coupled to operate together. Furthermore, another optional arrangement includes an Off Highway Vehicle that is mechanically coupled to a load vehicle. While FIG. 2 illustrates a single Off Highway Vehicle, FIG. 3 illustrates an Off Highway Vehicle 200 operating in a tandem arrangement with optional load vehicle 300. Load vehicle 300 may be a passive vehicle that is pulled or pushed by the Off Highway Vehicle 200 or optionally may include a plurality of load vehicle traction motors 308 that provide tractive effort to load vehicle wheels 318. The electrical power stored in energy capture and storage 204 may be selectively supplied (e.g., via tandem traction bus 314) to the load vehicle traction motors 308 via load vehicle traction bus 312. Thus, during times of increased demand, load vehicle traction motors 308 augment the tractive power provided by Off Highway Vehicle traction motors 108. As another example, during times when it is not possible to store more energy from dynamic braking (e.g., energy storage system 204 is charged to capacity), efficiency considerations may suggest that load vehicle traction motors 308 also augment Off Highway Vehicle traction motors 108.

It should be appreciated that when energy capture and storage system 204 drives load vehicle traction motors 308, additional circuitry will likely be required. For example, if energy capture and storage system 204 comprises a battery storing and providing a DC voltage, one or more inverter drives 106 may be used to convert the DC voltage to a form suitable for use by the load vehicle traction motors 308. Such drives are preferably operationally similar to those associated with the Off Highway Vehicle.

Rather than, or in addition to, using the electrical power stored in energy capture and storage 204 for powering load vehicle traction motors 308, such stored energy may also be used to augment the electrical power supplied to Off Highway Vehicle traction motors 108 (e.g., via line 212).

Other configurations are also possible. For example, the Off Highway Vehicle itself may be configured, either during manufacturing or as part of a retrofit program, to capture, store, and regenerate excess electrical energy, such as dynamic braking energy, excess primary energy source power or excess trolley line power. In another embodiment, an energy capture and storage subsystem 306 may be located on some or all of the load vehicles attached to the Off Highway Vehicle. FIG. 3 illustrates a load vehicle 300 equipped with a load vehicle energy capture and storage system 306 which receives load vehicle dynamic braking power from load vehicle traction motor 308 via bus 312 during dynamic braking. Such a load vehicle 300 may optionally include separate traction motors 308. In each of the foregoing embodiments, the load vehicle energy capture and storage subsystem 306 can include one or more of the subsystems previously described.

When a separate load vehicle 300 is used, the load vehicle 300 and the Off Highway Vehicle 200 are preferably mechanically coupled via mechanical linkage 316 and electrically coupled via tandem traction bus 314 such that dynamic braking energy from the Off Highway Vehicle traction motors 108 and/or from optional load vehicle traction motors 308 is stored in energy capture and storage system 206 on board the Off Highway Vehicle and/or is stored in load vehicle capture and storage system 306 on the load vehicle 300. During motoring operations, the stored energy in the energy capture and storage system in one or the other or both the Off Highway Vehicle 200 and the load vehicle 300 is selectively used to propel Off Highway Vehicle traction motors 108 and/or optional load vehicle traction motors 308. Similarly, when the Off Highway Vehicle primary power source 102 produces more power than required for motoring, the excess prime mover power can be stored in energy capture and storage 204 and or load vehicle energy capture and storage 306 for later use.

If load vehicle 300 is not electrically coupled to the Off Highway Vehicle (other than for standard control signals), the optional traction motors 308 on the load vehicle 300 can also be used in an autonomous fashion to provide dynamic braking energy to be stored in energy capture and storage 306 for later use. One advantage of such a configuration is that load vehicle 202 can be coupled to a wide variety of Off Highway Vehicles.

It should be appreciated that when load vehicle traction motors 308 operate in a dynamic braking mode, various reasons may counsel against storing the dynamic braking energy in energy capture and storage 204 and/or 306 (e.g., the storage may be full). Thus, it is preferable that some or all of the dynamic braking energy generated by the load vehicle traction motors 308 be dissipated by grids 310 associated with load vehicle 300, or transferred to Off Highway Vehicle 200 to be dissipated by grids 110 (e.g., via tandem traction bus 316).

It should also be appreciated that load vehicle energy capture and storage system 306 may be charged from an external charging source 326 when such a charging source is available.

The embodiment of FIG. 3 will be further described in terms of one possible operational example. It is to be understood that this operational example does not limit the invention. The Off Highway Vehicle system 200 is configured in tandem including an Off Highway Vehicle 200 and a load vehicle 300. Tractive power for the Off Highway Vehicle 200 is supplied by a plurality of Off Highway Vehicle traction motors 108. In one embodiment, the Off Highway Vehicle 200 has four wheels 109, each pair corresponds to an axle pair as depicted as an optional embodiment of FIG. 3 as 109A and 109B. Each wheel 109A and 109B includes a separate Off Highway Vehicle traction motor 108A and 108B, and each traction motor 108A and 108B is an AC traction motor. In one embodiment, each of the two rear wheels 109A has a separate Off Highway Vehicle traction motor 108A and operates as pair of wheels 109A on a common axle, or axle-equivalent (illustrated as a single wheel 109A in FIG. 3). However, the wheels 109A may or may not be actually connected by a common axle, as such an axle-equivalent. In fact, in one embodiment, each wheel 109 is mount by a separate half-axle. The Off Highway Vehicle 200 includes a primary energy source 102 that drives an electrical power system. In one embodiment, the primary energy source is a diesel engine drives an alternator/rectifier 104 that comprises a source of prime mover electrical power (sometimes referred to as traction power or primary power). In this particular embodiment, the prime mover electrical power is DC power that is converted to AC power for use by the traction motors. More specifically, one or more inverters (e.g., inverter 106) receive the prime mover electrical power and selectively supply AC power to the plurality of Off Highway Vehicle traction motors 108 to propel the Off Highway Vehicle. In another embodiment, the primary energy source 102 is a fuel cell. The fuel cell generates DC prime mover power and selectively supplies the DC primary mover power to a DC-to-DC converter 302 as shown in FIG. 3. In yet another embodiment, the Off Highway Vehicle 200 may utilize a trolley line (not shown) as the primary energy source, or as a secondary energy source that supplements the primary energy source when the Off Highway Vehicle is traversing an inclined travel path, e.g., trolley assist. Thus, Off Highway Vehicle traction motors 108 propel the Off Highway Vehicle in response to the prime mover electrical power.

Each of the plurality of Off Highway Vehicle traction motors 108 is preferably operable in at least two operating modes, a motoring mode and a dynamic braking mode. In the motoring mode, the Off Highway Vehicle traction motors 108 receive electrical power (e.g., prime mover electrical power via inverters) to propel the Off Highway Vehicle 200. As described elsewhere herein, when operating in the dynamic braking mode, the traction motors 108 generate electricity. In the embodiment of FIG. 3, load vehicle 300 is constructed and arranged to selectively capture and store a portion of the electricity generated by the traction motors 308 and/or 108 during dynamic braking operations. This is accomplished by energy capture and storage system 204 and/or 306. The captured and stored electricity is selectively used to provide a secondary source of electric power. This secondary source of electric power may be used to selectively supplement or replace the prime mover electrical power (e.g., to help drive one or more Off Highway Vehicle traction motors 108) and/or to drive one or more load vehicle traction motors 308. In the latter case, load vehicle traction motors 308 and Off Highway Vehicle traction motors 108 cooperate to propel the tandem Off Highway Vehicle 200 and load vehicle 300.

Advantageously, load vehicle energy capture and storage 306 can store dynamic braking energy without any electrical power transfer connection with the primary Off Highway Vehicle. In other words, energy capture and storage 306 can be charged without an electrical coupling such as tandem traction bus 314. This is accomplished by operating the Off Highway Vehicle primary power source 320 to provide motoring power to Off Highway Vehicle traction motors 308 while operating load vehicle 300 in a dynamic braking mode. For example, the Off Highway Vehicle primary power source 102 may be operated at a relatively high power setting while load vehicle traction motors 308 are configured for dynamic braking. Energy from the dynamic braking process can be used to charge energy capture and storage 306. Thereafter, the stored energy can be used to power load vehicle traction motors 308 to provide additional motoring power to the tandem Off Highway Vehicle 200 and load vehicle 300.

Referring again to FIG. 3 is another optional embodiment of hybrid energy Off Highway Vehicle system 300 configured with a fuel cell with a separate load vehicle. This embodiment includes a fuel cell as primary power source 102 that drives DC-to-DC converter 302. Converter 302 provides DC power to inverter that provides primary tractive power. In another embodiment, where the traction motor 108 is a DC traction motor, the converter may provide tractive DC power directly to the DC traction motor 108 via traction bus 112.

Referring again to FIG. 3, another optional embodiment includes a load vehicle configured with a load vehicle power source 320. Load vehicle power source could be any type of power source as described above for the Off Highway Vehicle 200. In one embodiment, load vehicle power source 320 is a fuel cell that generates a constant source of DC electrical energy. The DC electrical energy that is generated by the fuel cell is converted by a DC-to-DC converter 322 and provided to an Inverter 324 for the provision of load vehicle primary power. In this embodiment, load vehicle primary power may be provided by load vehicle bus 312 to the load vehicle traction motor 308, to the Off Highway Vehicle traction motors 108, to load vehicle energy capture and storage system 306, or to Off Highway Vehicle energy capture and storage system 204. In this embodiment, the load vehicle power source 320, the power converter 322, the converter 324 and/or the load vehicle energy capture and storage system 306 may be operable in response to a load vehicle energy management system (not shown) or to the energy management system 206 of the coupled Off Highway Vehicle via a energy management communication link 328. Such an energy management communication link 328 may be a wired communication link or a wireless communication link.

Figure 4:
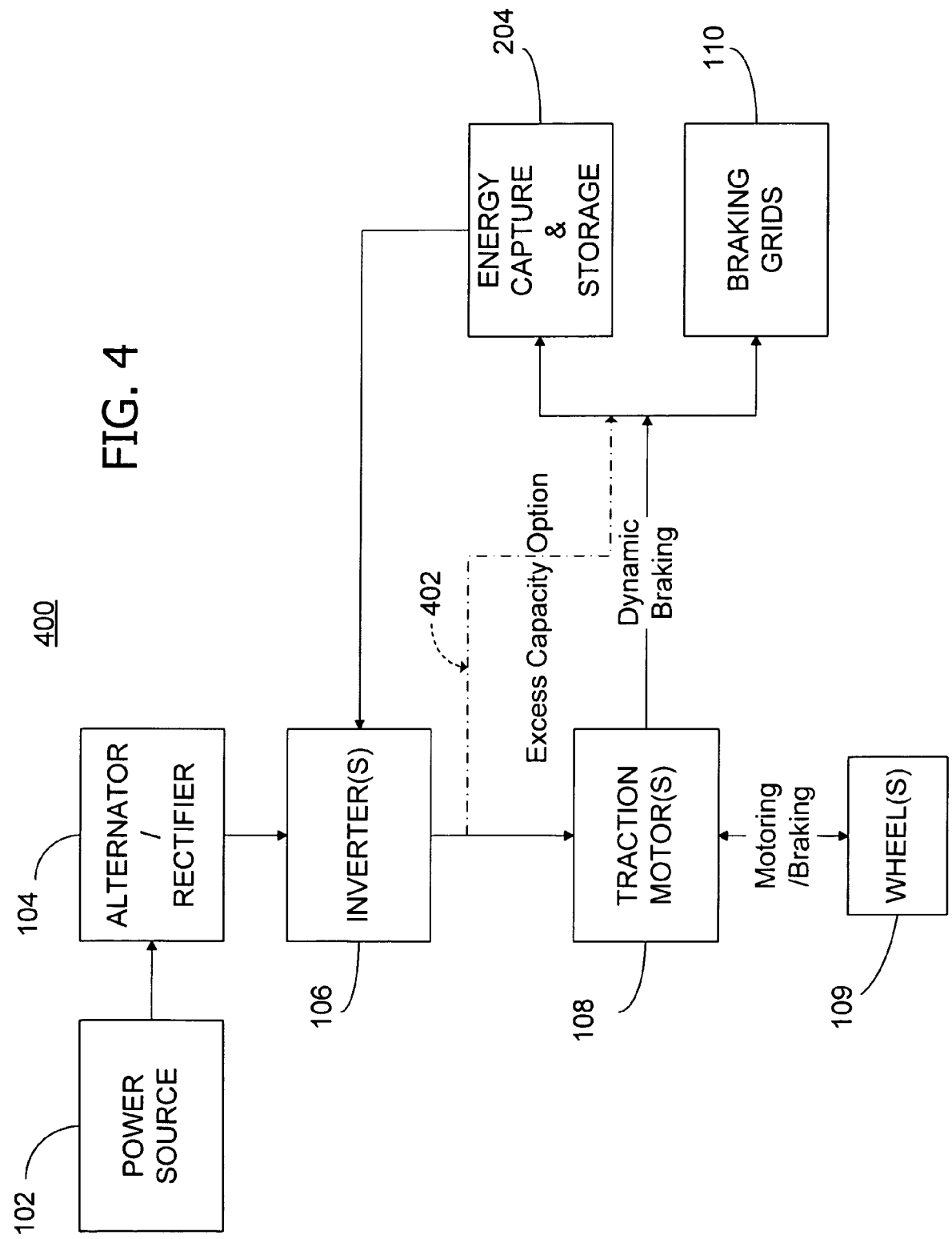
FIG. 4 is a block diagram illustrating one embodiment of an energy storage and generation system suitable for use in connection with hybrid energy Off Highway Vehicle system.

FIG. 4 is a system-level block diagram that illustrates aspects of one embodiment of the energy storage and generation system. In particular, FIG. 4 illustrates an energy storage and generation system 400 suitable for use with a hybrid energy Off Highway Vehicle system, such as hybrid energy Off Highway Vehicle system 200 or load vehicle system 300 (FIG. 3). Such an energy storage and generation system 400 could be implemented, for example, as part of a separate load vehicle (e.g., FIGS. 2 and 3) and/or incorporated into an Off Highway Vehicle.

As illustrated in FIG. 4, a primary energy source 102 drives a prime mover power source 104 (e.g., an alternator/rectifier converter). The prime mover power source 104 preferably supplies DC power to an inverter 106 that provides three-phase AC power to an Off Highway Vehicle traction motor 108. It should be understood, however, that the system 400 illustrated in FIG. 4 can be modified to operate with DC traction motors as well. Preferably, there is a plurality of traction motors 108, e.g., one per traction wheel 109. In other words, each Off Highway Vehicle traction motor preferably includes a rotatable shaft coupled to the associated wheel 109 for providing tractive power to the associated wheel 109. Thus, each Off Highway Vehicle traction motor 108 provides the necessary motoring force to an associated wheel 109 to cause the Off Highway Vehicle 200 to move. One arrangement includes a single wheel 109 on the Off Highway Vehicle to be equipped with a single traction motor 108. Another embodiment is for two wheels 109 on opposing sides of the vehicle acting as an axle-equivalent, each equipped with a separate traction motor 108.

When traction motors 108 are operated in a dynamic braking mode, at least a portion of the generated electrical power is routed to an energy storage medium such as energy storage 204. To the extent that energy storage 204 is unable to receive and/or store all of the dynamic braking energy, the excess energy is routed to braking grids 110 for dissipation as heat energy. Also, during periods when primary power source 102 is being operated such that it provides more energy than needed to drive traction motors 108, the excess capacity (also referred to as excess prime mover electric power) may be optionally stored in energy storage 204. Accordingly, energy storage 204 can be charged at times other than when traction motors 108 are operating in the dynamic braking mode. This aspect of the system is illustrated in FIG. 4 by a dashed line 402.

The energy storage 204 of FIG. 4 is preferably constructed and arranged to selectively augment the power provided to traction motors 108 or, optionally, to power separate traction motors 308 associated the load vehicle 300. Such power may be referred to as secondary electric power and is derived from the electrical energy stored in energy storage 204. Thus, the system 400 illustrated in FIG. 4 is suitable for use in connection with an Off Highway Vehicle having an on-board energy capture and storage 204 and/or with a separate load vehicle 300 equipped with a load vehicle energy capture and storage 306.

Figure 5:
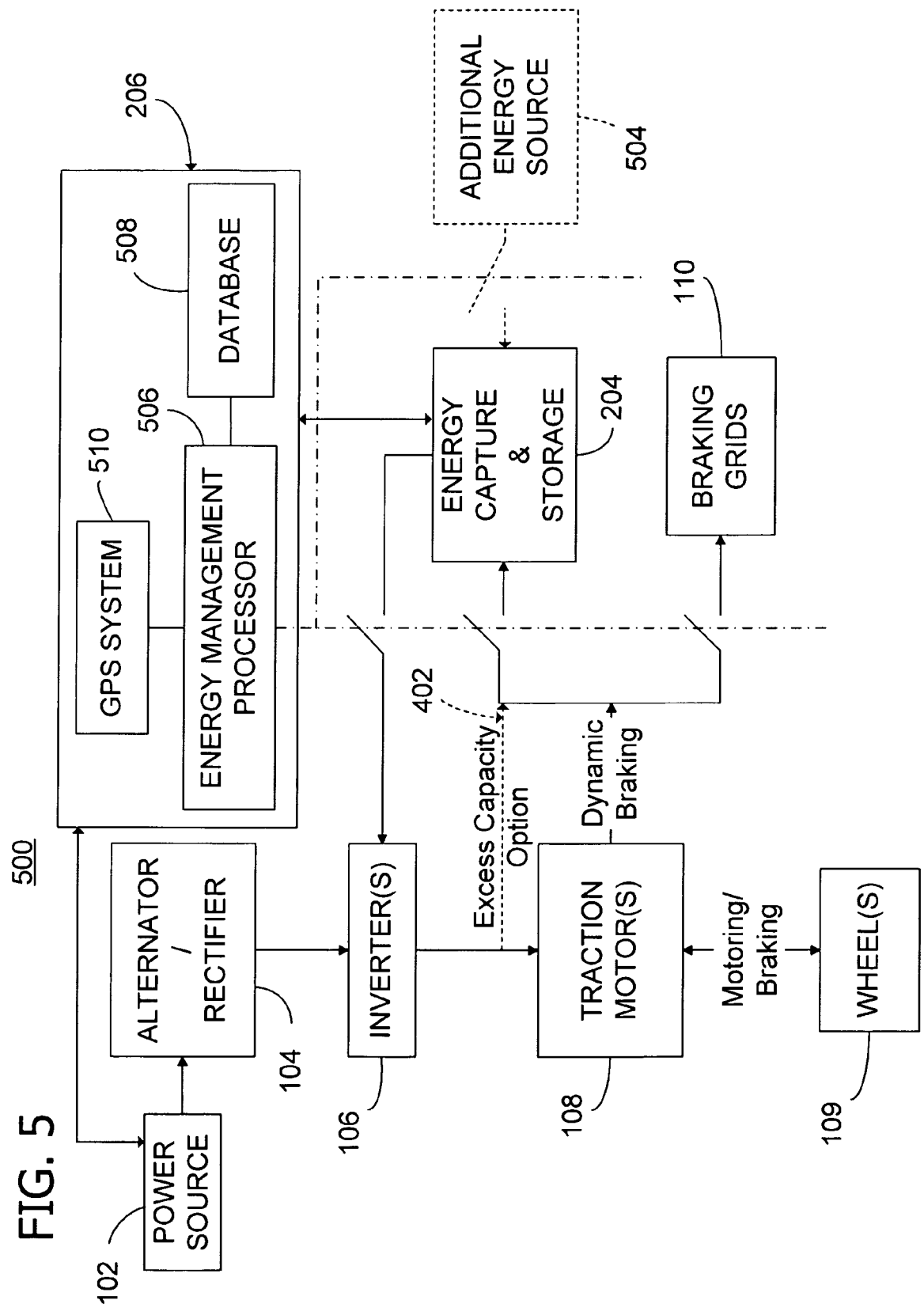
FIG. 5 is a block diagram illustrating an energy storage and generation system suitable for use in a hybrid energy Off Highway Vehicle system, including an energy management system for controlling the storage and regeneration of energy.

FIG. 5 is a block diagram that illustrates aspects of one embodiment of an energy storage and generation system 500 suitable for use with a hybrid energy Off Highway Vehicle system. The system 500 includes an energy management system 206 for controlling the storage and regeneration of energy. Therefore, although FIG. 5 is generally described with respect to an Off Highway Vehicle system, the energy management system 500 illustrated therein is not to be considered as limited to Off Highway Vehicle applications.

Referring still to the exemplary embodiment illustrated in FIG. 5, system 500 preferably operates in the same general manner as system 400 of FIG. 4; the energy management system 206 provides additional intelligent control functions. FIG. 5 also illustrates an optional energy source 504 that is preferably controlled by the energy management system 206. The optional energy source 504 may be a second energy source (e.g., another Off Highway Vehicle operating in tandem with the primary Off Highway Vehicle) or a completely separate power source (e.g., trolley line, or a wayside power source such as a battery charger) for charging energy storage 204. In one embodiment, such a separate charging power source includes an electrical power station for charging an energy storage medium associated with a separate load vehicle (e.g., vehicle 202 of FIG. 2) while stationary, or a system for charging the energy storage medium while the load vehicle is in motion. In one embodiment, optional energy source 504 is connected to a traction bus (not illustrated in FIG. 5) that also carries primary electric power from prime mover power source 104.

As illustrated, the energy management system 206 preferably includes an energy management processor 506, a database 508, and a position identification system 510, such as, for example, a global positioning satellite system receiver (GPS) 510. The energy management processor 506 determines present and anticipated Off Highway Vehicle position information via the position identification system 510. In one embodiment, energy management processor 506 uses this position information to locate data in the database 508 regarding present and/or anticipated travel path topographic and profile conditions, sometimes referred to as travel path situation information. Such travel path situation information may include, for example, travel path grade, travel path elevation (e.g., height above mean sea level), travel path curve data, speed limit information, and the like. In the case of a locomotive off highway vehicle, the travel path and characteristics are those of a railroad track. It is to be understood that such database information could be provided by a variety of sources including: an onboard database associated with processor 510, a communication system (e.g., a wireless communication system) providing the information from a central source, manual operator input(s), via one or more travel path signaling devices, a combination of such sources, and the like. Finally, other vehicle information such as, the size and weight of the vehicle, a power capacity associated with the prime mover, efficiency ratings, present and anticipated speed, present and anticipated electrical load, and so on may also be included in a database (or supplied in real or near real time) and used by energy management processor 506.

It should be appreciated that, in an alternative embodiment, energy management system 206 could be configured to determine power storage and transfer requirements associated with energy storage 204 in a static fashion. For example, energy management processor 506 could be pre-programmed with any of the above information, or could use look-up tables based on past operating experience (e.g., when the vehicle reaches a certain point, it is nearly always necessary to store additional energy to meet an upcoming demand).

The energy management processor 506 preferably uses the present and/or upcoming travel path situation information, along with Off Highway Vehicle status information, to determine power storage and power transfer requirements. Energy management processor 506 also determines possible energy storage opportunities based on the present and future travel path situation information. For example, based on the travel path profile information, energy management processor 506 may determine that it is more efficient to completely use all of the stored energy, even though present demand is low, because a dynamic braking region is coming up (or because the Off Highway Vehicle is behind schedule and is attempting to make up time). In this way, the energy management system 206 improves efficiency by accounting for the stored energy before the next charging region is encountered. As another example, energy management processor 506 may determine not to use stored energy, despite present demand, if a heavier demand is soon to be encountered in the travel path.

Advantageously, energy management system 206 may also be configured to interface with primary energy source controls. Also, as illustrated in FIG. 5, energy storage 204 may be configured to provide an intelligent control interface with energy management system 206.

In operation, energy management processor 506 determines a power storage requirement and a power transfer requirement. Energy storage 204 stores electrical energy in response to the power storage requirement. Energy storage 204 provides secondary electric power (e.g. to a traction bus connected to inverters 106 to assist in motoring) in response to the power transfer requirement. The secondary electric power is derived from the electrical energy stored in energy storage 204.

As explained above, energy management processor 506 preferably determines the power storage requirement based, in part, on a situation parameter indicative of a present and/or anticipated travel path topographic characteristic. Energy management processor 506 may also determine the power storage requirement as a function of an amount of primary electric power available from the prime mover power source 104. Similarly, energy management processor 506 may determine the power storage requirement as function of a present or anticipated amount of primary electric power required to propel the Off Highway Vehicle.

Also, in determining the energy storage requirement, energy management processor 506 preferably considers various parameters related to energy storage 204. For example, energy storage 204 will have a storage capacity that is indicative of the amount of power that can be stored therein and/or the amount of power that can be transferred to energy storage 204 at any given time. Another similar parameter relates to the amount of secondary electric power that energy storage 204 has available for transfer at a particular time.

As explained above, system 500 preferably includes a plurality of sources for charging energy storage 204. These sources include dynamic braking power, excess prime mover electric power, and external charging electric power. Preferably, energy management processor 506 determines which of these sources should charge energy storage 204. In one embodiment, present or anticipated dynamic braking energy is used to charge energy storage 204, if such dynamic braking energy is available. If dynamic braking energy is not available, either excess prime mover electric power or external charging electric power is used to charge energy storage 204.

In the embodiment of FIG. 5, energy management processor 506 preferably determines the power transfer requirement as a function of a demand for power. In other words, energy storage 204 preferably does not supply secondary electric power unless traction motors 108 are operating in a power consumption mode (i.e., a motoring mode, as opposed to a dynamic braking mode). In one form, energy management processor 506 permits energy storage 204 to supply secondary electric power to inverters 106 until either (a) the demand for power terminates or (b) energy storage 204 is completely depleted. In another form, however, energy management processor 506 considers anticipated power demands and controls the supply of secondary electric power from energy storage 204 such that sufficient reserve power remains in energy storage 204 to augment prime mover power source during peak demand periods. This may be referred to as a "look-ahead" energy management scheme.

In the look-ahead energy management scheme, energy management processor 506 preferably considers various present and/or anticipated travel path situation parameters, such as those discussed above. In addition, energy management processor may also consider the amount of power stored in energy storage 204, anticipated charging opportunities, and any limitations on the ability to transfer secondary electric power from energy storage 204 to inverters 106.

FIGS. 6A–D, 7A–D, and 8A–E illustrate, in graphic form, aspects of three different embodiments of energy management systems, suitable for use with a hybrid energy vehicle, that could be implemented in a system such as system 500 of FIG. 5. It should be appreciated that these figures are provided for exemplary purposes and that, with the benefit of the present disclosure, other variations are possible. It should also be appreciated that the values illustrated in these figures are included to facilitate a detailed description and should not be considered in a limiting sense. It should be further understood that, the examples illustrated in these figures relate to a variety of large Off Highway Vehicles, including locomotives, excavators and mine trucks and which are generally capable of storing the electric energy generated during the operation of such vehicles. Some of these vehicles travel a known, repetitive or predictable course during operation. For example, a locomotive travels a known travel path, e.g., the railroad track. Such Off Highway Vehicles include vehicles using DC and AC traction motor drives and having dynamic braking/retarding capabilities.

There are four similar charts in each group of figures (FIGS. 6A–D, FIGS. 7A–D, and FIGS. 8A–D). The first chart in each group (i.e., FIGS. 6A, 7A, and 8A) illustrates the required power for both motoring and braking. Thus, the first chart graphically depicts the amount of power required by the vehicle. Positive values on the vertical axis represent motoring power (horsepower); negative values represent dynamic braking power. It should be understood that motoring power could originate with the prime mover (e.g., diesel engine, fuel cell or other primary energy source), or from stored energy (e.g., in an energy storage medium in a separate vehicle), or from a combination of the prime mover and stored energy. Dynamic braking power could be dissipated or stored in the energy storage medium.

The horizontal axis in all charts reflects time in minutes. The time basis for each chart in a given figure group are intended to be the same. It should be understood, however, that other reference bases are possible.

The second chart in each group of figures (i.e., FIGS. 6B, 7B, and 8B) reflects theoretical power storage and consumption. Positive values reflect the amount of power that, if power were available in the energy storage medium, could be drawn to assist in motoring. Negative values reflect the amount of power that, if storage space remains in the energy storage medium, could be stored in the medium. The amount of power that could be stored or drawn is partially a function of the converter and storage capabilities of a given vehicle configuration. For example, the energy storage medium will have some maximum/finite capacity. Further, the speed at which the storage medium is able to accept or supply energy is also limited (e.g., batteries typically charge slower than flywheel devices). Other variables also affect energy storage. These variables include, for example, ambient temperature, the size and length of any interconnect cabling, current and voltage limits on dc-to-dc converters used for battery charging, power ratings for an inverter for a flywheel drive, the charging and discharging rates of a battery, or a motor/shaft limit for a flywheel drive. The second chart assumes that the maximum amount of power that could be transferred to or from the energy storage medium at a given time is 500 h.p. Again, it should be understood that this 500 h.p. limit is included for exemplary purposes. Hence, the positive and negative limits in any given system could vary as a function of ambient conditions, the state and type of the energy storage medium, the type and limits of energy conversion equipment used, and the like.

The third chart in each figure group (i.e., FIGS. 6C, 7C, and 8C) depicts a power transfer associated with the energy storage medium. In particular, the third chart illustrates the actual power being transferred to and from the energy storage medium versus time. The third chart reflects limitations due to the power available for storage, and limitations due to the present state of charge/storage of the energy storage medium (e.g., the speed of the flywheel, the voltage in an ultra-capacitor, the charge in the battery, and the like).

The fourth chart in each figure group (i.e., FIGS. 6D, 7D, and 8D) depicts actual energy stored. In particular, the fourth chart illustrates the energy stored in the energy storage medium at any particular instant in time.

Referring first to FIGS. 6A–D, these figures reflect an energy management system that stores energy at the maximum rate possible during dynamic braking until the energy storage medium is completely full. In this embodiment, all energy transfers to the storage medium occur during dynamic braking. In other words, in the embodiment reflected in FIGS. 6A–D, no energy is transferred to the energy storage medium from excess prime mover power available during motoring, or from other energy sources. Similarly, energy is discharged, up to the maximum rate, whenever there is a motor demand (limited to and not exceeding the actual demand) until the energy storage medium is completely discharged/empty. FIGS. 6A–D assume that the energy storage medium is completely discharged/empty at time 0.

Figure 6A:
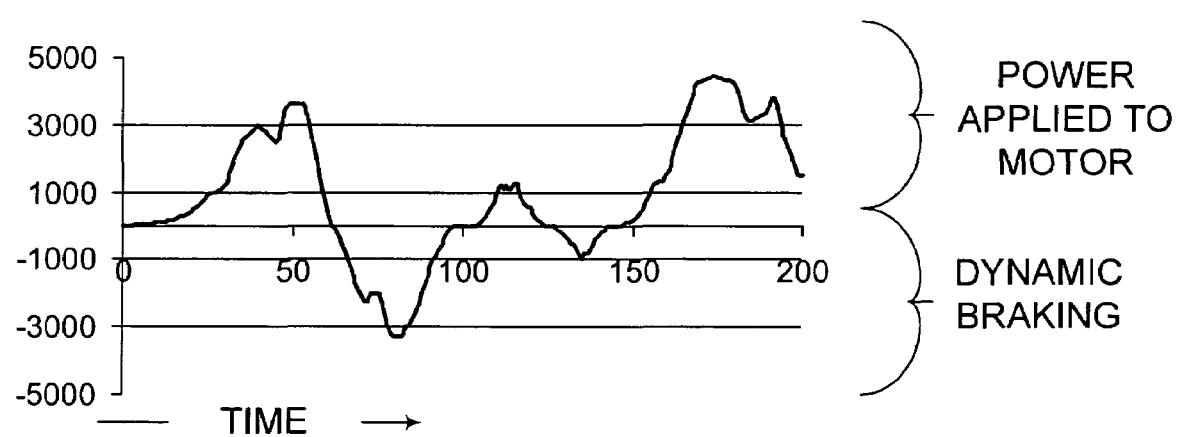
FIGS. 6A–6D are timing diagrams that illustrate one embodiment of an energy management system for controlling the storage and regeneration of energy, including dynamic braking energy.

Referring now specifically to FIG. 6A, as mentioned above, the exemplary curve identified therein illustrates the power required (utilized) for motoring and dynamic braking. Positive units of power reflect when motoring power is being applied to the wheels 109 of the vehicle (e.g., one or more traction motors are driving Off Highway Vehicle wheels). Negative units of power reflect power generated by dynamic braking.

Figure 6B:
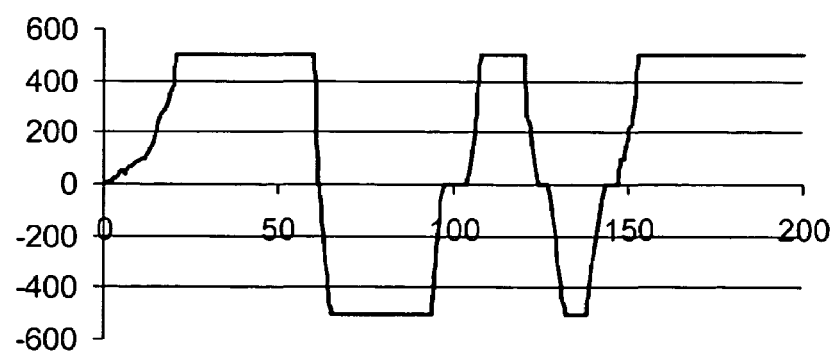

FIG. 6B is an exemplary curve that reflects power transfer limits. Positive values reflect the amount of stored energy that would be used to assist in the motoring effort, if such energy were available. Negative units reflect the amount of dynamic braking energy that could be stored in the energy storage medium if the medium were able to accept the full charge available. In the example of FIG. 6B, the energy available for storage at any given time is illustrated as being limited to 500 units (e.g., horsepower). As explained above, a variety of factors limit the amount of power that can be captured and transferred. Thus, from about 0 to 30 minutes, the Off Highway Vehicle requires less than 500 h.p. If stored energy were available, it could be used to provide all of the motoring power. From about 30 minutes to about 65 or 70 minutes, the Off Highway Vehicle requires more than 500 h.p. Thus, if stored energy were available, it could supply some (e.g., 500 h.p.) but not all of the motoring power. From about 70 minutes to about 75 minutes or so, the Off Highway Vehicle is in a dynamic braking mode and generates less than 500 h.p. of dynamic braking energy. Thus, up to 500 h.p. of energy could be transferred to the energy storage medium, if the medium retained sufficient capacity to store the energy. At about 75 minutes, the dynamic braking process generates in excess of 500 h.p. Because of power transfer limits, only up to 500 h.p. could be transferred to the energy storage medium (again, assuming that storage capacity remains); the excess power would be dissipated in the braking grids. It should be understood that FIG. 6B does not reflect the actual amount of energy transferred to or from the energy storage medium. That information is depicted in FIG. 6C.

Figure 6C:
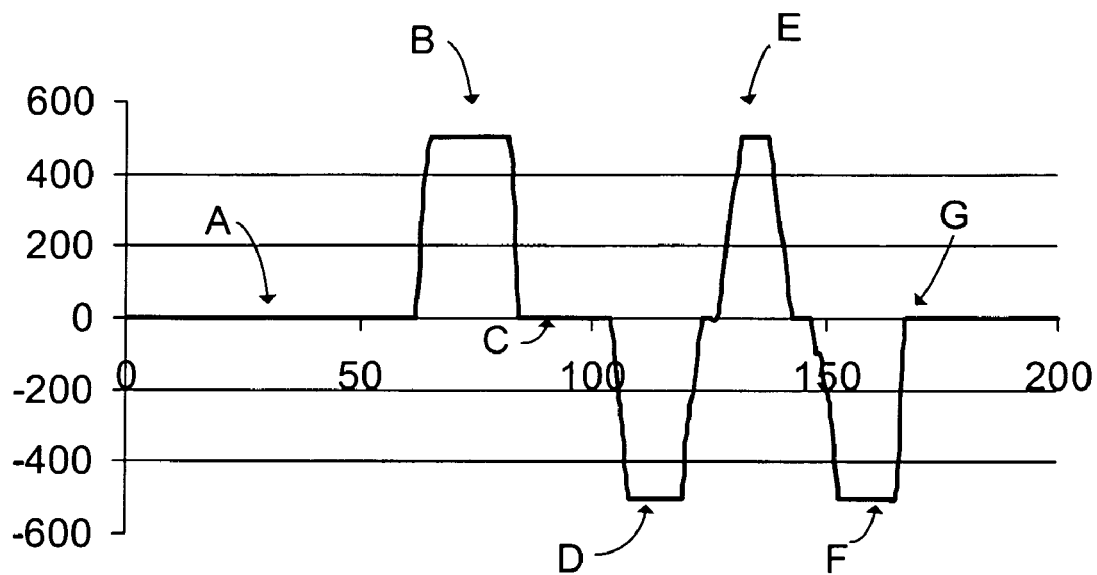

FIG. 6C is reflects the power transfer to/from the energy storage medium at any given instant of time. The example shown therein assumes that the energy storage medium is completely empty at time 0. Therefore, the system cannot transfer any power from the storage at this time. During a first time period A (from approximately 0–70 minutes), the vehicle is motoring (see FIG. 6A) and no power is transferred to or from the energy storage. At the end of the first time period A, and for almost 30 minutes thereafter, the vehicle enters a dynamic braking phase (see FIG. 6A). During this time, power from the dynamic braking process is available for storage (see FIG. 6B).

During a second time period B (from approximately 70–80 minutes), dynamic braking energy is transferred to the energy storage medium at the maximum rate (e.g., 500 units) until the storage is full. During this time there is no motoring demand to deplete the stored energy. Thereafter, during a third time period C (from approximately 80–105 minutes) the storage is full. Consequently, even though the vehicle remains in the dynamic braking mode or is coasting (see FIG. 6A), no energy is transferred to or from the energy storage medium during time period C.

During a fourth time period D (from approximately 105–120 minutes), the vehicle resumes motoring. Because energy is available in the energy storage medium, energy is drawn from the storage and used to assist the motoring process. Hence, the curve illustrates that energy is being drawn from the energy storage medium during the fourth time period D.

At approximately 120 minutes, the motoring phase ceases and, shortly thereafter, another dynamic braking phase begins. This dynamic braking phase reflects the start of a fifth time period E that lasts from approximately 125–145 minutes. As can be appreciated by viewing the curve during the fifth time period E, when the dynamic braking phase ends, the energy storage medium is not completely charged.

Shortly before the 150-minute point, a sixth time period F begins which lasts from approximately 150–170 minutes. During this time period and thereafter (see FIG. 6A), the vehicle is motoring. From approximately 150–170 minutes, energy is transferred from the energy storage medium to assist in the motoring process. At approximately 170 minutes, however, the energy storage is completely depleted. Accordingly, from approximately 170–200 minutes (the end of the sample window), no energy is transferred to or from the energy storage medium.

Figure 6D:
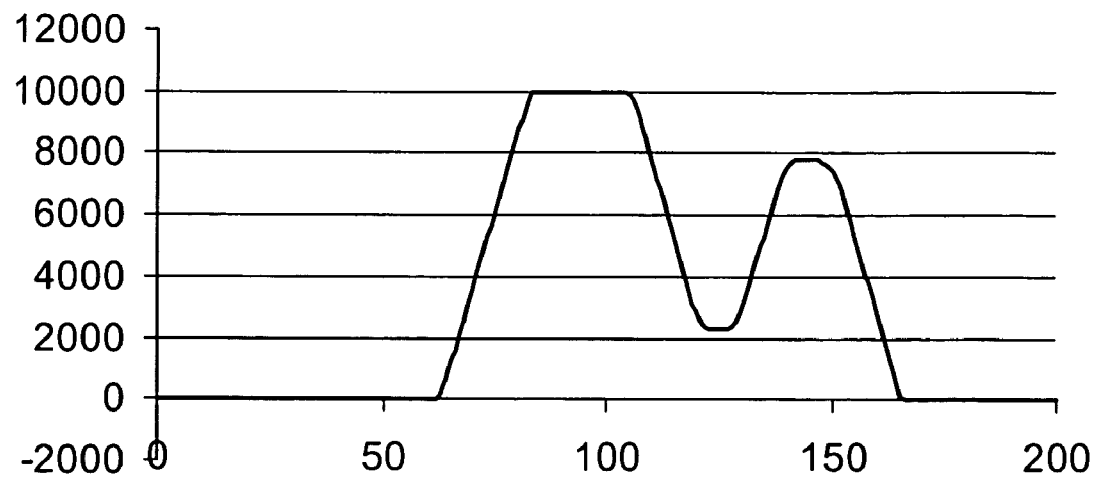

FIG. 6D illustrates the energy stored in the energy storage medium of the exemplary embodiment reflected in FIGS. 6A–D. Recall that in the present example, the energy storage medium is assumed to be completely empty/discharged at time 0. Recall also that the present example assumes an energy management system that only stores energy from dynamic braking. From approximately 0–70 minutes, the vehicle is motoring and no energy is transferred to or from the energy storage medium. From approximately 70–80 minutes or so, energy from dynamic braking is transferred to the energy storage medium until it is completely full. At approximately 105 minutes, the vehicle begins another motoring phase and energy is drawn from the energy storage medium until about 120 minutes. At about 125 minutes, energy from dynamic braking is again transferred to the energy storage medium during another dynamic braking phase. At about 145 minutes or so, the dynamic braking phase ends and storage ceases. At about 150 minutes, energy is drawn from the energy storage medium to assist in motoring until all of the energy has been depleted at approximately 170 minutes.

FIGS. 7A–D correspond to an energy management system that includes a "look-ahead" or anticipated needs capability. This embodiment applies particularly when the travel path of the Off Highway Vehicle is known or is planned. Such a system is unlike the system reflected in FIGS. 6A–D, which simply stores dynamic braking energy when it can, and uses stored energy to assist motoring whenever such stored energy is available. The energy management system reflected by the exemplary curves of FIGS. 7A–D anticipates when the prime mover cannot produce the full required demand, or when it may be less efficient for the prime mover to produce the full required demand. As discussed elsewhere herein, the energy management system can make such determinations based on, for example, known present position, present energy needs, anticipated future travel path topography, anticipated future energy needs, present energy storage capacity, anticipated energy storage opportunities, and like considerations. The energy management system depicted in FIGS. 7A–D, therefore, preferably prevents the energy storage medium from becoming depleted below a determined minimum level required to meet future demands.

By way of further example, the system reflected in FIGS. 7A–D is premised on a Off Highway Vehicle having a primary energy source that has a "prime mover limit" of 4,000 h.p. Such a limit could exist for various factors. For example, the maximum rated output could be 4,000 h.p., or operating efficiency considerations may counsel against operating the primary power source above 4,000 h.p. It should be understood, however, that the system and figures are intended to reflect an exemplary embodiment only, and are presented herein to facilitate a detailed explanation of aspects of an energy management system suitable for use with off-highway hybrid energy vehicles such as, for example, the Off Highway Vehicle system illustrated in FIG. 2.

Figure 7A:
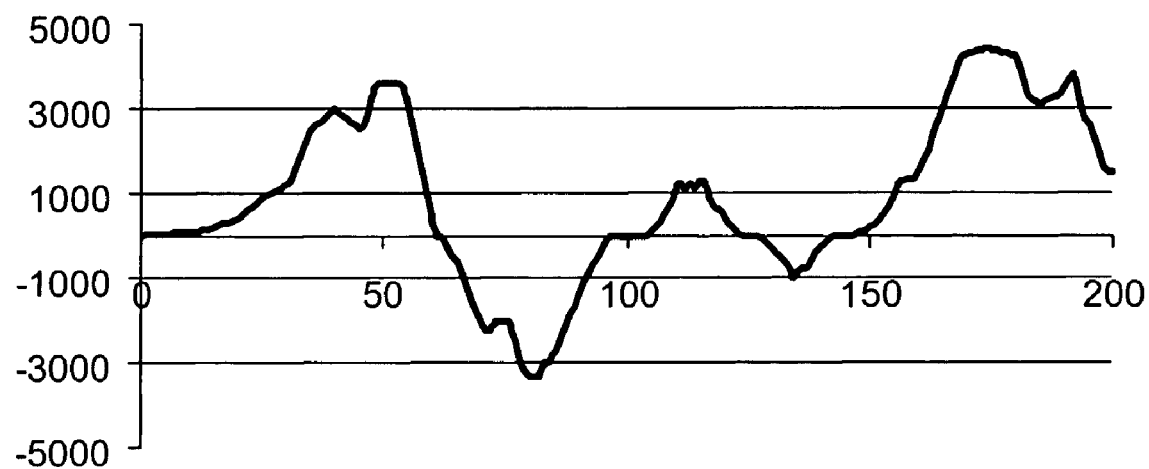
FIGS. 7A–7D are timing diagrams that illustrate another embodiment energy management system for controlling the storage and regeneration of energy, including dynamic braking energy.

Referring now to FIG. 7A, the exemplary curve illustrated therein depicts the power required for motoring (positive) and braking (negative). At approximately 180 minutes, the motoring demand exceeds 4,000 h.p. Thus, the total demand at that time exceeds the 4,000 h.p. operating constraint for the primary energy source. The "look-ahead" energy management system reflected in FIGS. 7A–D, however, anticipates this upcoming need and ensures that sufficient secondary power is available from the energy storage medium to fulfill the energy needs.

One way for the energy management system to accomplish this is to look ahead (periodically or continuously) to the upcoming travel path/course profile (e.g., incline/decline, length of incline/decline, and the like) for a given time period (also referred to as a look-ahead window). In the example illustrated in FIGS. 7A–D, the energy management system looks ahead 200 minutes and then computes energy needs/requirements backwards. The system determines that, for a brief period beginning at 180 minutes, the primary energy source would require more energy than the limit.

Figure 7B:
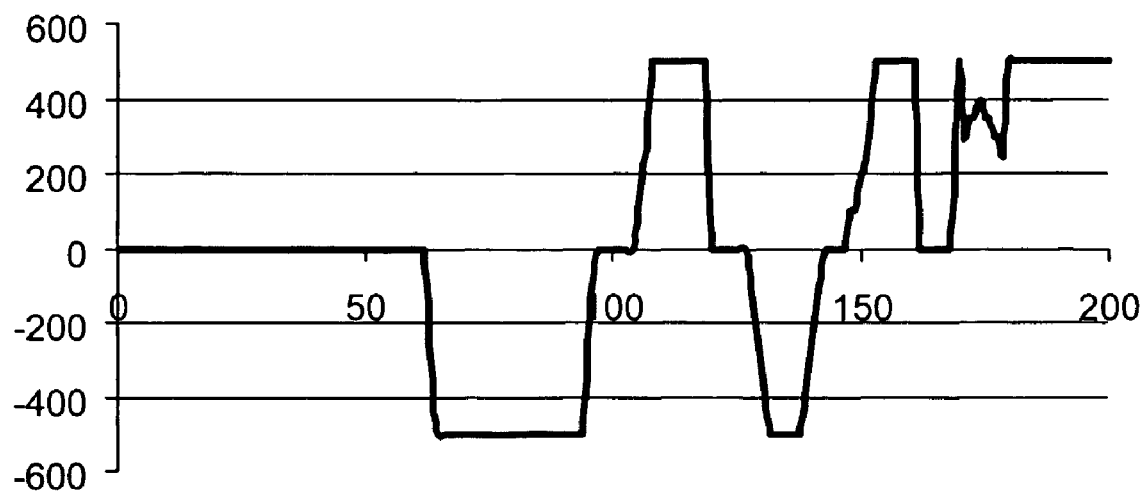

FIG. 7B is similar to FIG. 6B. FIG. 7B, however, also illustrates the fact that the energy storage medium is empty at time 0 and, therefore, there can be no power transfer from the energy storage medium unless and until it is charged. FIG. 7B also reflects a look-ahead capability.

Figure 7C:
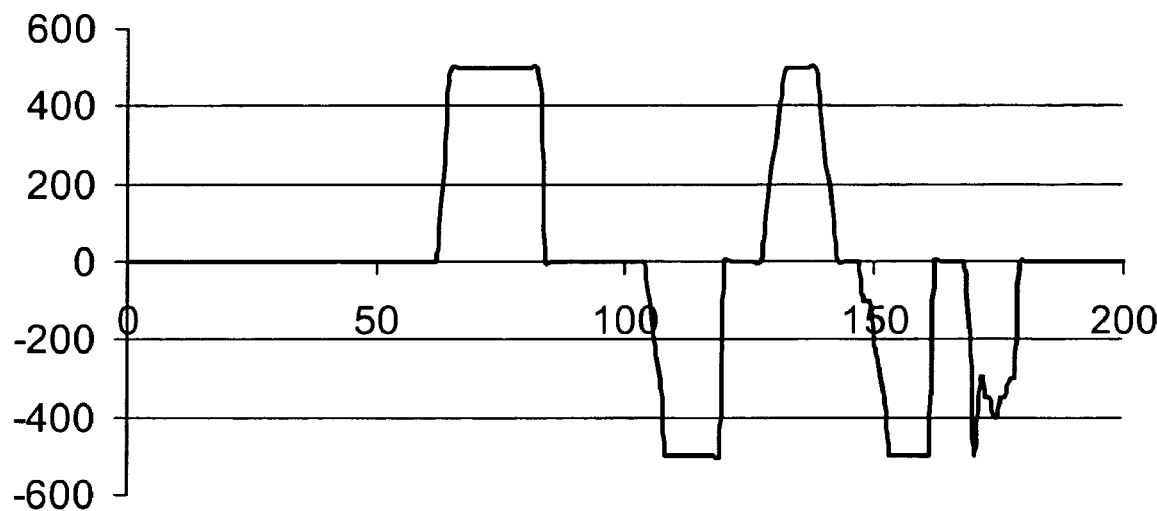
Figure 7D:
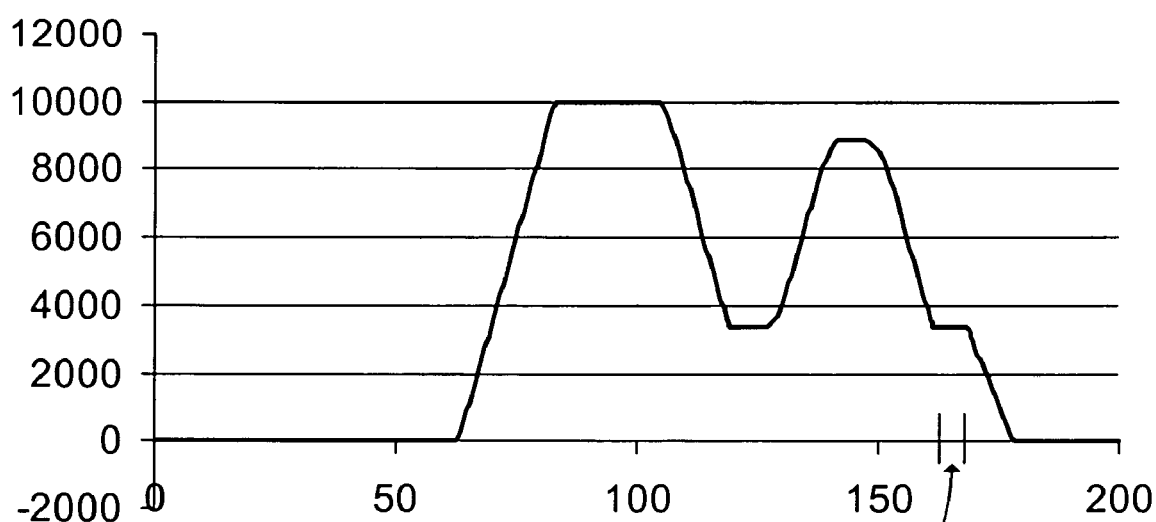

Comparing FIGS. 6A–D with FIGS. 7A–D, it is apparent how the systems respectively depicted therein differ. Although the required power is the same in both examples (see FIGS. 6A and 7A), the system reflected in FIGS. 7A–D prevents complete discharge of the energy storage medium prior to the anticipated need at 180 minutes. Thus, as can be seen in FIGS. 7C and 7D, prior to the 180 minute point, the system briefly stops transferring stored energy to assist in motoring, even though additional stored energy remains available. The additional energy is thereafter transferred, beginning at about 180 minutes, to assist the prime mover when the energy demand exceeds 4,000 h.p. Hence, the system effectively reserves some of the stored energy to meet upcoming demands that exceed the desired limit of the prime mover.

It should be understood and appreciated that the energy available in the energy storage medium could be used to supplement driving traction motors associated with the prime mover, or could also be used to drive separate traction motors (e.g., on a load vehicle). With the benefit of the present disclosure, an energy management system accommodating a variety of configurations is possible.

FIGS. 8A–E reflect pertinent aspects of another embodiment of an energy management system suitable for use in connection with Off Highway Vehicle energy vehicles. The system reflected in FIGS. 8A–E includes a capability to store energy from both dynamic braking and from the prime mover or another charging power source. For example, a given power source may operate most efficiently at a given power setting (e.g., 4,000 h.p.). Thus, it may be more efficient to operate the power source at 4,000 h.p. at certain times, even when actual motoring demand falls below that level. In such cases, the excess energy can be transferred to an energy storage medium.

Figure 8A:
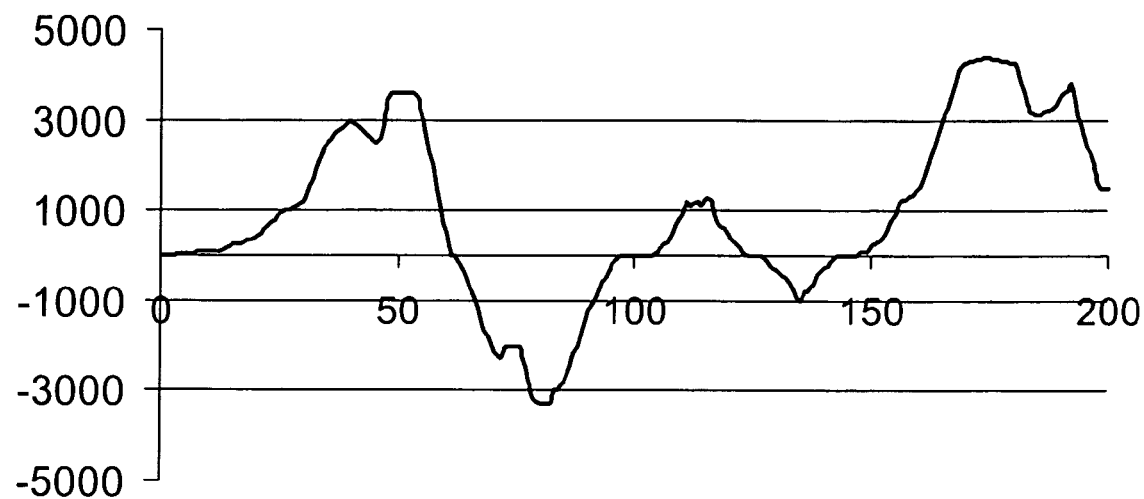
FIGS. 8A–8E are timing diagrams that illustrate another embodiment energy management system for controlling the storage and regeneration of energy, including dynamic braking energy.
Figure 8B:
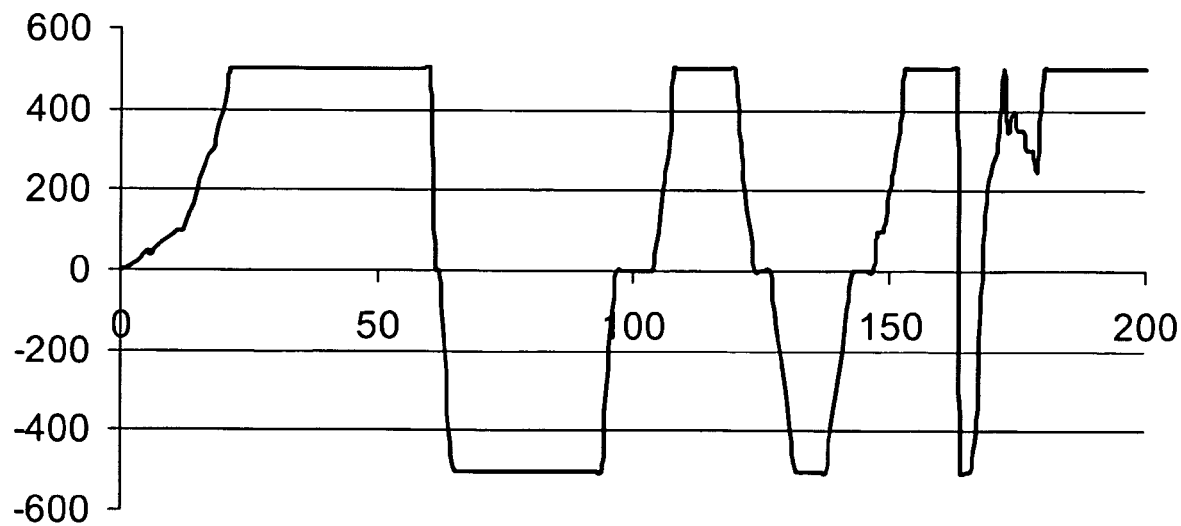
Figure 8C:
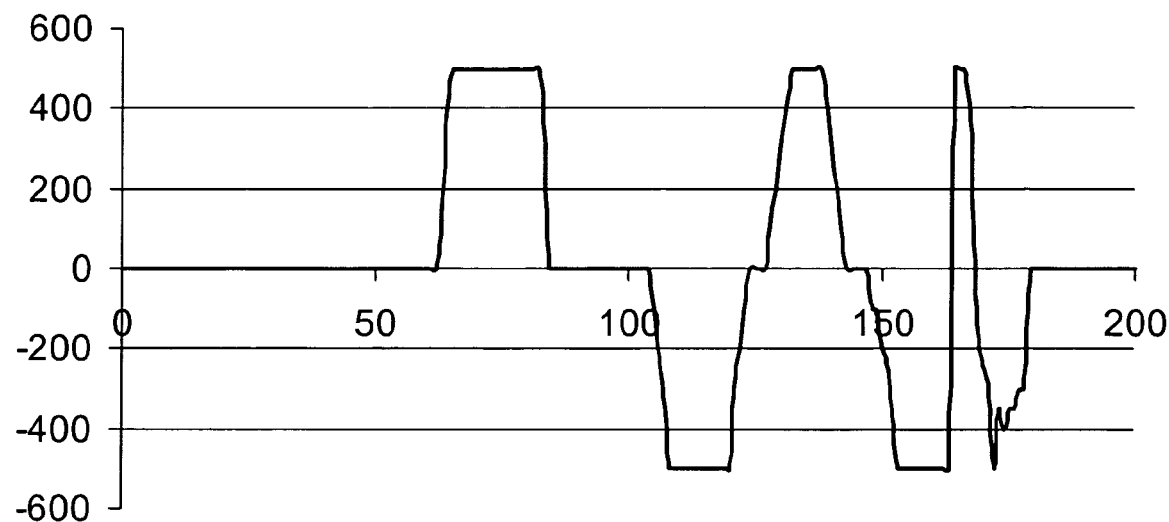
Figure 8D:
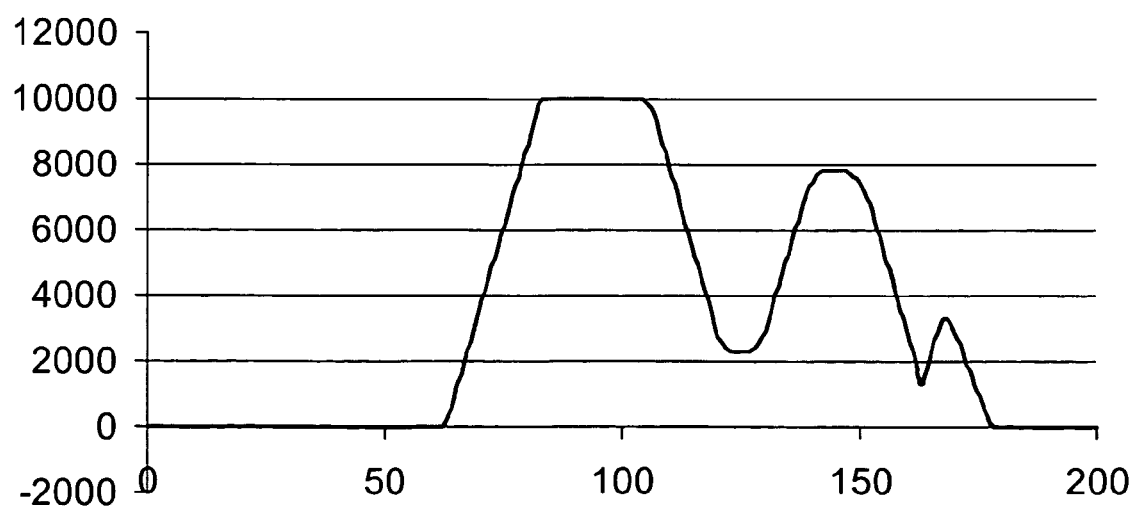

Thus, comparing FIGS. 8A–D with FIGS. 6A–D and 7A–D, the differences between the systems respectively depicted therein are apparent. Referring specifically to FIGS. 8A and 8D, from about 0–70 minutes, the motoring requirements (FIG. 8A) are less than the exemplary optimal 4,000 h.p. setting. If desirable, the power source could be run at 4,000 h.p. during this time and the energy storage medium could be charged. As illustrated, however, the energy management system determines that, based on the upcoming travel path profile and anticipated dynamic braking period(s), an upcoming dynamic braking process will be able to fully charge the energy storage medium. In other words, it is not necessary to operate the primary energy source at 4,000 h.p. and store the excess energy in the energy storage medium during this time because an upcoming dynamic braking phase will supply enough energy to fully charge the storage medium. It should be understood that the system could also be designed in other ways. For example, in another configuration the system always seeks to charge the storage medium whenever excess energy could be made available.

At approximately 180 minutes, power demands will exceed 4,000 h.p. Thus, shortly before that time (while motoring demand is less than 4,000 h.p.), the primary energy source can be operated at 4,000 h.p., with the excess energy used to charge the energy storage medium to ensure sufficient energy is available to meet the demand at 180 minutes. Thus, unlike the systems reflected in FIGS. 6D and 7D, the system reflected in FIG. 8D provides that, for a brief period prior to 180 minutes, energy is transferred to the energy storage medium from the prime mover, even though the vehicle is motoring (not braking).

Figure 8E:
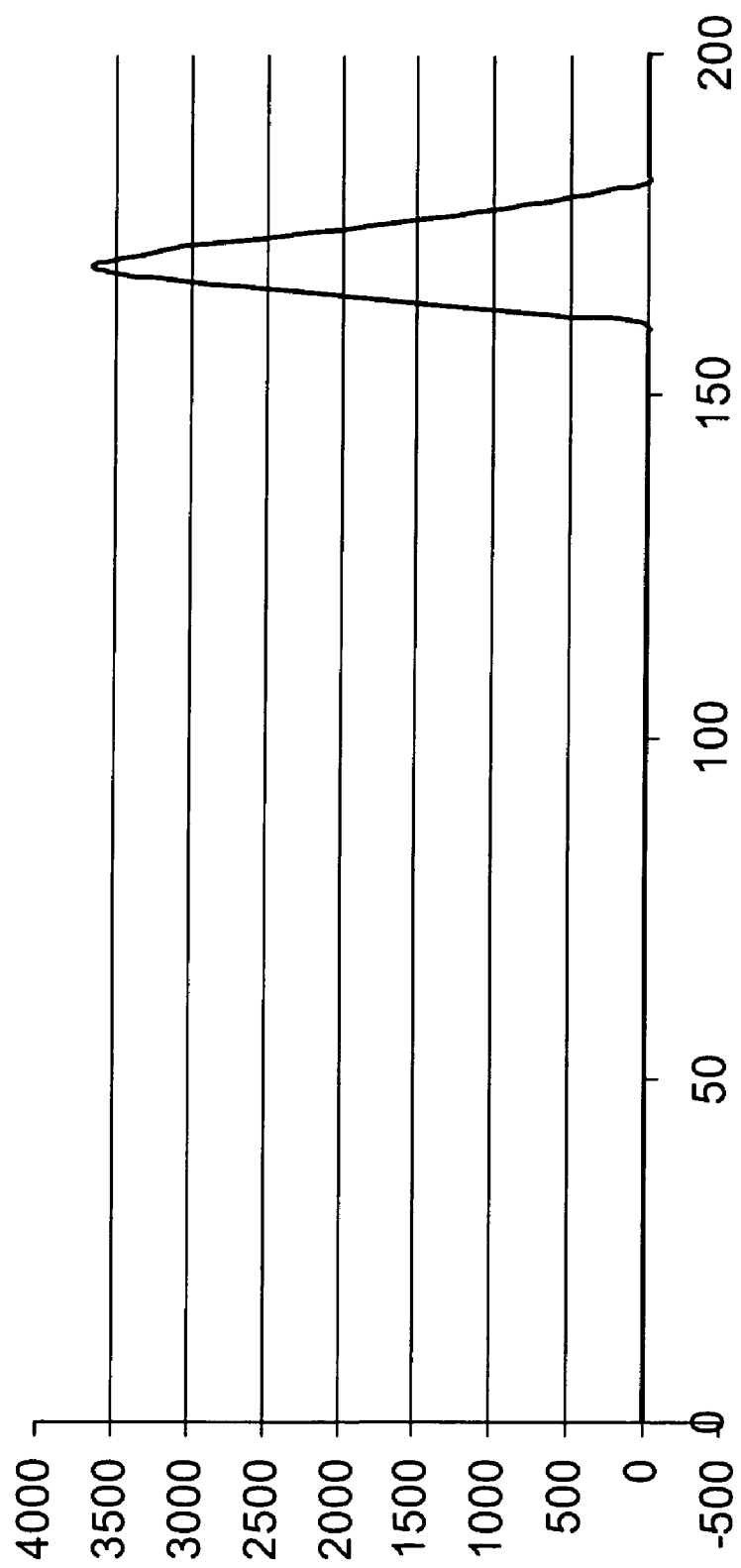

FIG. 8E illustrates one way that the energy management system can implement the look-ahead capability to control energy storage and transfer in anticipation of future demands. FIG. 8E assumes a system having a 200 minute look-ahead window. Such a look-ahead window is chosen to facilitate an explanation of the system and should not be viewed in a limiting sense. Beginning at the end of the window (200 minutes), the system determines the power/energy demands at any given point in time. If the determined demand exceeds the prime mover's capacity or limit, the system continues back and determines opportunities when energy can be stored, in advance of the determined excess demand period, and ensures that sufficient energy is stored during such opportunities.

Although FIGS. 6A–D, 7A–D, and 8A–E have been separately described, it should be understood that the systems reflected therein could be embodied in a single energy management system. Further, the look-ahead energy storage and transfer capability described above could be accomplished dynamically or in advance. For example, in one form, an energy management processor (see FIG. 5) is programmed to compare the vehicle's present position with upcoming travel path/course characteristics in real or near real time. Based on such dynamic determinations, the processor then determines how to best manage the energy capture and storage capabilities associated with the vehicle in a manner similar to that described above with respect to FIGS. 7A–D and 8A–E. In another form, such determinations are made in advance. For example, an off-vehicle planning computer may be used to plan a route and determine energy storage and transfer opportunities based on a database of known course information and projected conditions such as, for example, vehicle speed, weather conditions, and the like. Such pre-planned data would thereafter be used by the energy management system to manage the energy capture and storage process. Look-ahead planning could also be done based on a route segment or an entire route. In some Off Highway Vehicle applications, such as a mine truck or excavator, the travel path may be substantially the same on a day-to-day basis, but may change on a weekly or monthly basis as the mine is worked and the travel path changes to adapt to the mine configuration. In these cases, look-ahead planning may be changed as changes to the travel path occur.

It should further be understood that the energy management system and methods described herein may be put into practice with a variety of vehicle configurations. The energy management systems and methods described herein may be employed as part of an Off Highway Vehicle in which the energy storage medium is included as part of the vehicle itself. In other embodiments, such systems and methods could be practiced with a Off Highway Vehicle having a separate load vehicle configured to house an external energy capture and storage medium. As another example, the energy management systems and methods herein described could be employed with a Off Highway Vehicle having a separate load vehicle that employs its own traction motors. Other possible embodiments and combinations should be appreciated from the present disclosure and need not be recited in additional detail herein.

FIGS. 9A–9G are electrical schematics illustrating several different embodiments of an electrical system suitable for use in connection with a hybrid energy Off Highway Vehicle. In particular, the exemplary embodiments illustrated in these figures relate to a hybrid energy Off Highway Vehicle system. It should be understood that the embodiments illustrated in FIGS. 9A–9G could be incorporated in a plurality of configurations, including those already discussed herein (e.g., a Off Highway Vehicle with a separate load vehicle, a Off Highway Vehicle with a self-contained hybrid energy system, an autonomous load vehicle, and the like). Other vehicles like off highway dump trucks for mining use the same type of configuration using one, two or four traction motors, one per each driving wheel 109.

Figure 9A:
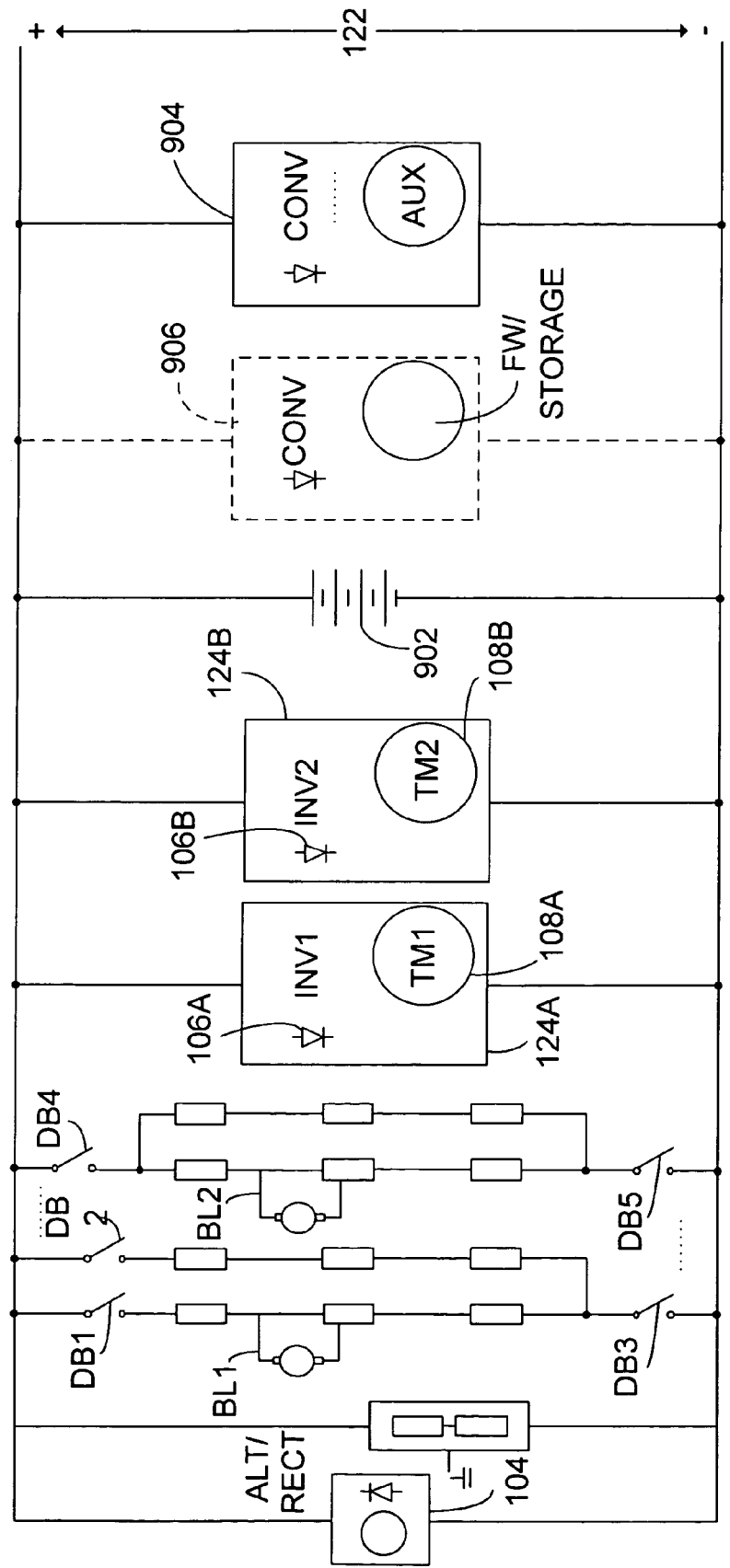
FIGS. 9A–9G are electrical schematics illustrating several embodiments of an electrical system suitable for use in connection with a hybrid energy vehicle.

FIG. 9A illustrates an electrical schematic of a Off Highway Vehicle electrical system having a energy capture and storage medium suitable for use in connection with aspects of the systems and methods disclosed herein. The particular energy storage element illustrated in FIG. 9A comprises a battery storage 902. The battery storage 902 is preferably connected directly across the traction bus (DC bus 122). In this exemplary embodiment, an auxiliary power drive 904 is also connected directly across DC bus 122. The power for the auxiliaries is derived from DC bus 122, rather than a separate bus.

It should be appreciated that more than one type of energy storage element may be employed in addition to battery storage 902. For example, an optional flywheel storage element 906 can also be connected in parallel with battery storage 902. The flywheel storage 906 shown in FIG. 9A is preferably powered by an AC motor or generator connected to DC bus 122 via an inverter or converter. Other storage elements such as, for example, capacitor storage devices (including ultra-capacitors) and additional battery storages (not shown) can also be connected across the DC bus and controlled using choppers and/or converters and the like. It should be understood that although battery storage 902 is schematically illustrated as a single battery, multiple batteries or battery banks may likewise be employed.

In operation, the energy storage elements (e.g., battery storage 902 and/or any optional energy storage elements such as flywheel 906) are charged directly during dynamic braking operations. Recall that, during dynamic braking, one or more of the traction motor subsystems (e.g., 124A–124B) operate as generators and supply dynamic braking electric power that is carried on DC bus 122. Thus, all or a portion of the dynamic braking electric power carried on DC bus 122 may be stored in the energy storage element because the power available on the bus exceeds demand. When the power source is motoring, the battery (and any other optional storage element) is permitted to discharge and provide energy to DC bus 122 that can be used to assist in driving the traction motors. This energy provided by the storage element may be referred to as secondary electric power. Advantageously, because the auxiliaries are also driven by the same bus in this configuration, the ability to take power directly from DC bus 122 (or put power back into bus 122) is provided. This helps to minimize the number of power conversion stages and associated inefficiencies due to conversion losses. It also reduces costs and complexities.

In an alternative embodiment, a fuel cell provides all or a portion of the primary power. In this embodiment, the energy storage device may include an electrolysis or similar fuel cell energy source generation. As one example, the energy generated during dynamic braking powers electrolysis to create hydrogen from water, one water source being the waster water created by the fuel cell during prime energy generation. The generated hydrogen is stored and is used as a fuel for the primary power source, the fuel cell.

It should be appreciated that the braking grids may still be used to dissipate all or a portion of the dynamic braking electric power generated during dynamic braking operations. For example, an energy management system is preferably used in connection with the system illustrated in FIG. 9A. Such an energy management system is configured to control one or more of the following functions: primary energy generation, energy storage; stored energy usage; and energy dissipation using the braking grids. It should further be appreciated that the battery storage (and/or any other optional storage element) may optionally be configured to store excess prime mover electric power that is available on the traction bus.

Those skilled in the art should appreciate that certain circumstances preclude the operation of a diesel engine or fuel cell operating as the primary energy source when the Off Highway Vehicle needs to be moved. For example, the engine or fuel cell may not be operable. As another example, various rules and concerns may prevent the operation of a diesel engine inside buildings, yards, maintenance facilities, mines or tunnels. In such situations, the Off Highway Vehicle may be moved using a fuel cell or stored secondary power. Advantageously, various hybrid energy Off Highway Vehicle configurations disclosed herein permit the use of stored power for battery jog operations directly. For example, the battery storage 902 of FIG. 9A can be used for battery jog operations. Further, the prior concept of battery jog operations suggests a relatively short time period over a short distance. The various configurations disclosed herein permit jog operations for much longer time periods and over much longer distances.

Figure 9B:
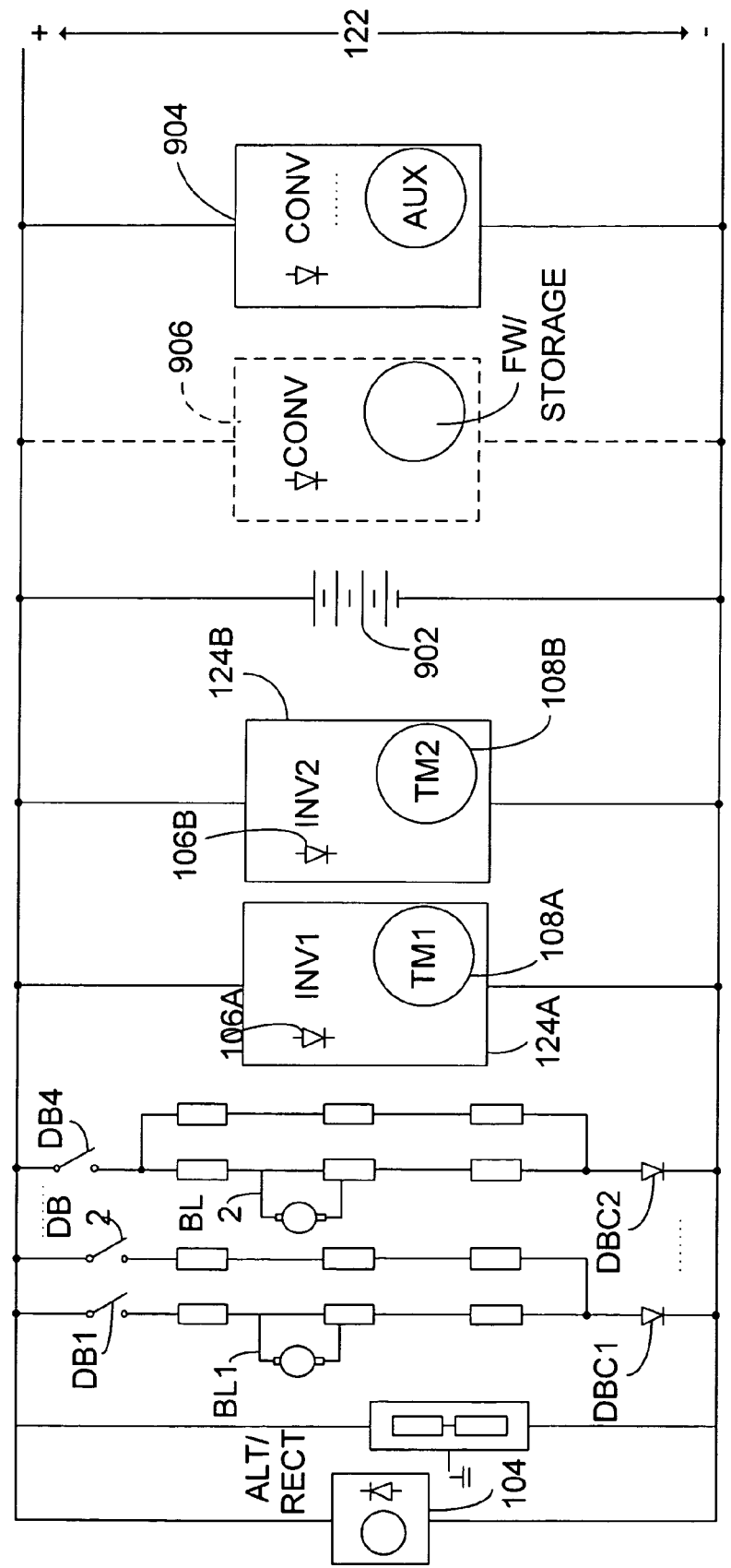

FIG. 9B illustrates a variation of the system of FIG. 9A. A primary difference between FIGS. 9A and 9B is that the system shown in FIG. 9B includes chopper circuits DBC1 and DBC2 connected in series with the braking grids. The chopper circuits DBC1 and DBC2 allow fine control of power dissipation through the grids that, therefore, provides greater control over the storage elements such as, for example, battery storage 902. In one embodiment, chopper circuits DBC1 and DBC2 are controlled by an energy management system (see FIG. 5). It should also be appreciated that chopper circuits DBC1 and DBC2, as well as any optional storage devices added to the circuit (e.g., flywheel storage 906), could also be used to control transient power. In some embodiments, a combination of dynamic braking contactors and chopper circuits may be utilized.

In the configuration of FIG. 9A, the dynamic braking contactors (e.g., DB1, DB2) normally only control the dynamic braking grids in discrete increments. Thus, the power flowing into the grids is also in discrete increments (assuming a fixed DC voltage). For example, if each discrete increment is 1,000 h.p., the battery storage capability is 2,000 h.p., and the braking energy returned is 2,500 h.p., the battery cannot accept all of the braking energy. As such, one string of grids is used to dissipate 1,000 h.p., leaving 1,500 h.p. for storage in the battery. By adding choppers DBC1, DBC2, the power dissipated in each grid string can be more closely controlled, thereby storing more energy in the battery and improving efficiency. In the foregoing example, choppers DBC1 and DBC2 can be operated at complementary 50% duty cycles so that only 500 h.p. of the braking energy is dissipated in the grids and 2,000 h.p. is stored in the battery.

Figure 9C:
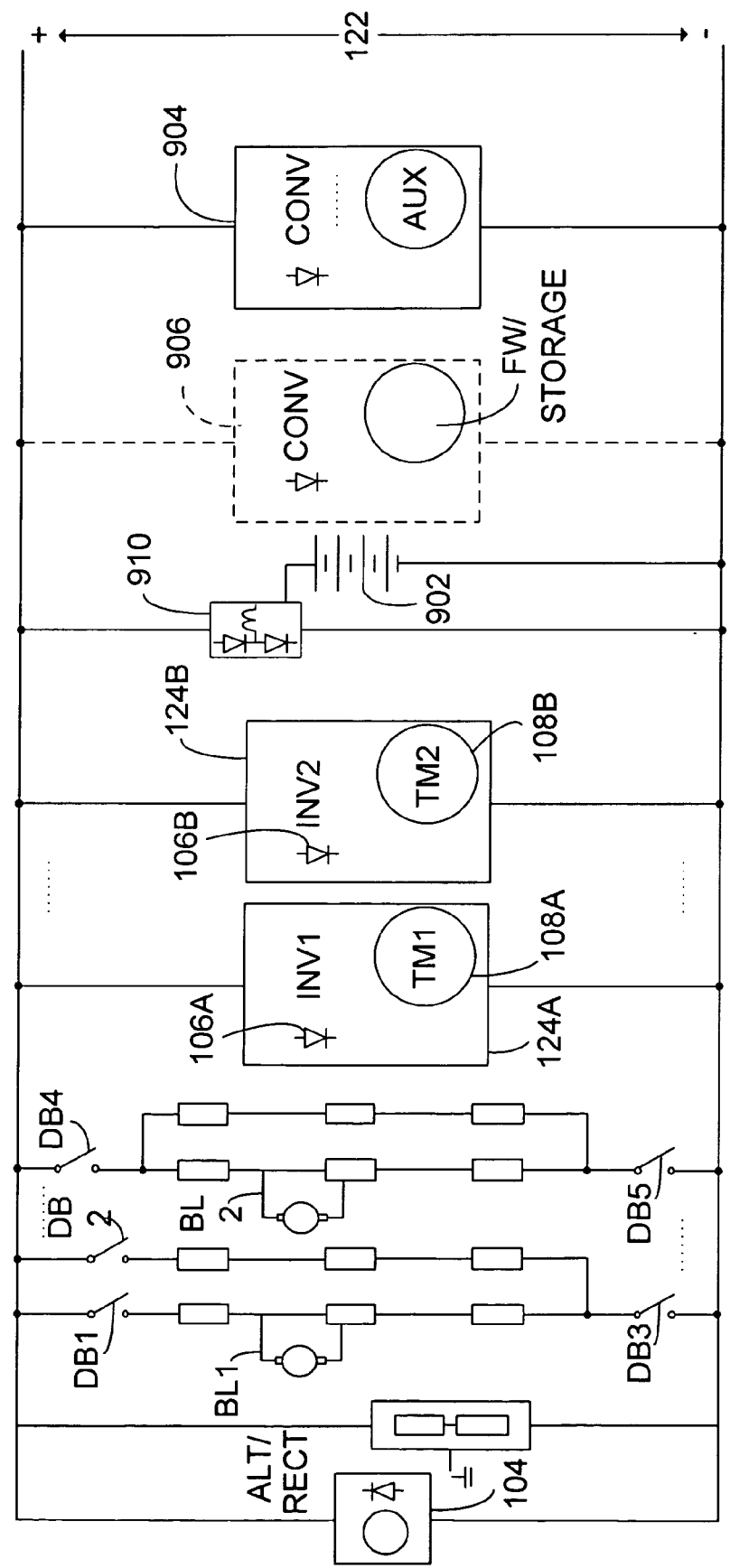

FIG. 9C is an electrical schematic of a Off Highway Vehicle electrical system illustrating still another configuration for implementing an energy storage medium. In contrast to the systems illustrated in FIGS. 9A and 9B, the battery storage 902 of FIG. 9C is connected to DC bus 122 by way of a dc-to-dc converter 910. Such a configuration accommodates a greater degree of variation between DC bus 122 voltage and the voltage rating of battery storage 902. Multiple batteries and/or DC storage elements (e.g., capacitors) could be connected in a similar manner. Likewise, chopper control, such as that illustrated in FIG. 9B could be implemented as part of the configuration of FIG. 9C. It should be further understood that the dc-to-dc converter 910 may be controlled via an energy management processor (see FIG. 5) as part of an energy management system and process that controls the storage and regeneration of energy in the energy storage medium.

In operation, the electric power carried on DC bus 122 is provided at a first power level (e.g., a first voltage level). The dc-to-dc converter 910 is electrically coupled to DC bus 122. The dc-to-dc converter 910 receives the electric power at the first power level and converts it to a second power level (e.g., a second voltage level). In this way, the electric power stored in battery storage 902 is supplied at the second power level. It should be appreciated that the voltage level on DC bus 122 and the voltage supplied to battery storage 902 via dc-to-dc converter 910 may also be at the same power level. The provision of dc-to-dc converter 910, however, accommodates variations between these respective power levels.

Figure 9D:
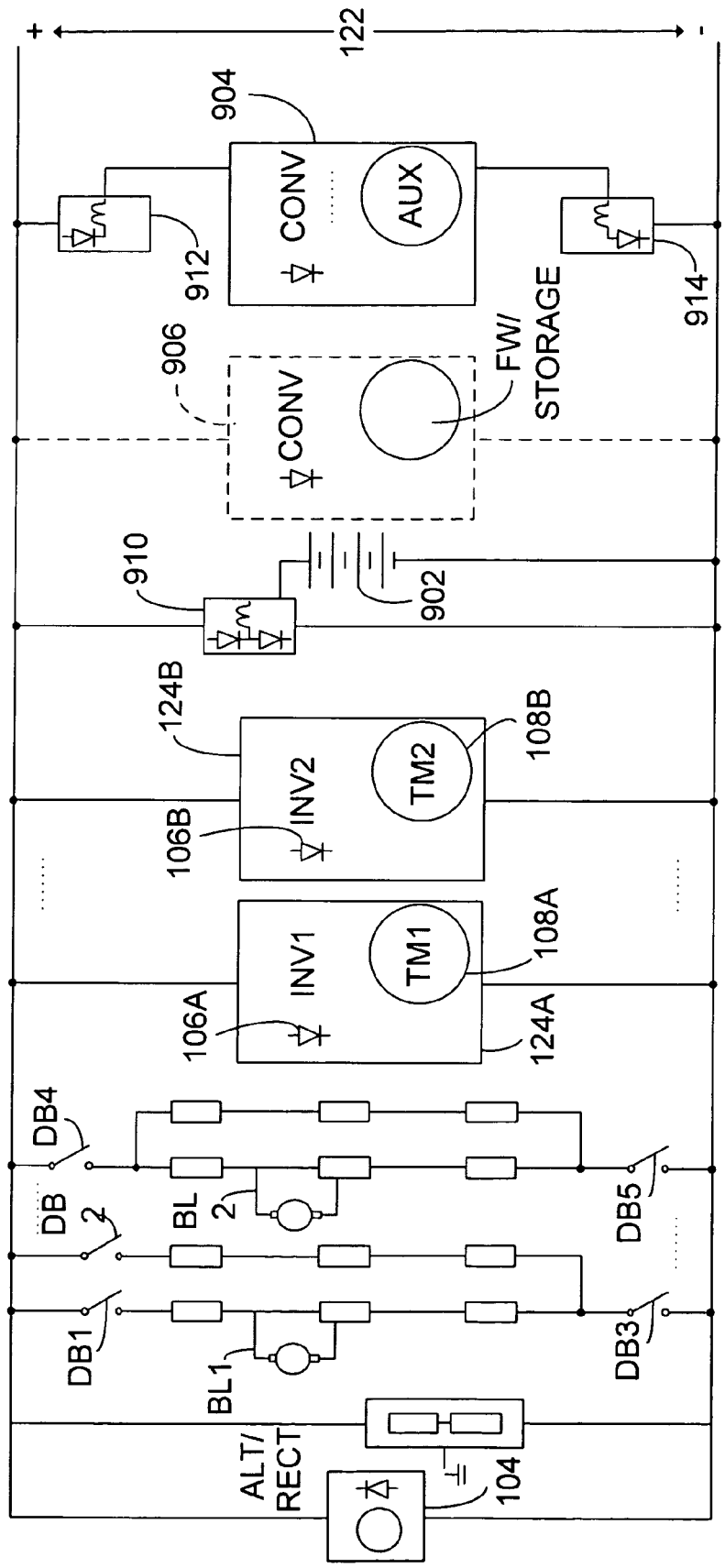

FIG. 9D is an electrical schematic of a Off Highway Vehicle electrical system that is similar to the system shown in FIG. 9C. One difference between these systems is that the auxiliary power subsystem 904 reflected in FIG. 9D is connected to DC bus 122 via a pair of dc-to-dc converters 912 and 914. Such a configuration provides the advantage of allowing the use of existing, lower voltage auxiliary drives and/or motor drives having low insulation. On the other hand, in this configuration, the auxiliary power traverses two power conversion stages. It should be understood that although FIG. 9D illustrates the auxiliaries as consuming power all of the time—not regenerating—bi-directional dc-to-dc converters can also be used in configurations in which it is desirable to have the auxiliaries regenerate power (see, for example, FIG. 9G). These dc-to-dc converters 912 and 914 are preferably controlled via an energy management system that controls the storage and regeneration of energy in the energy storage medium.

Figure 9E:
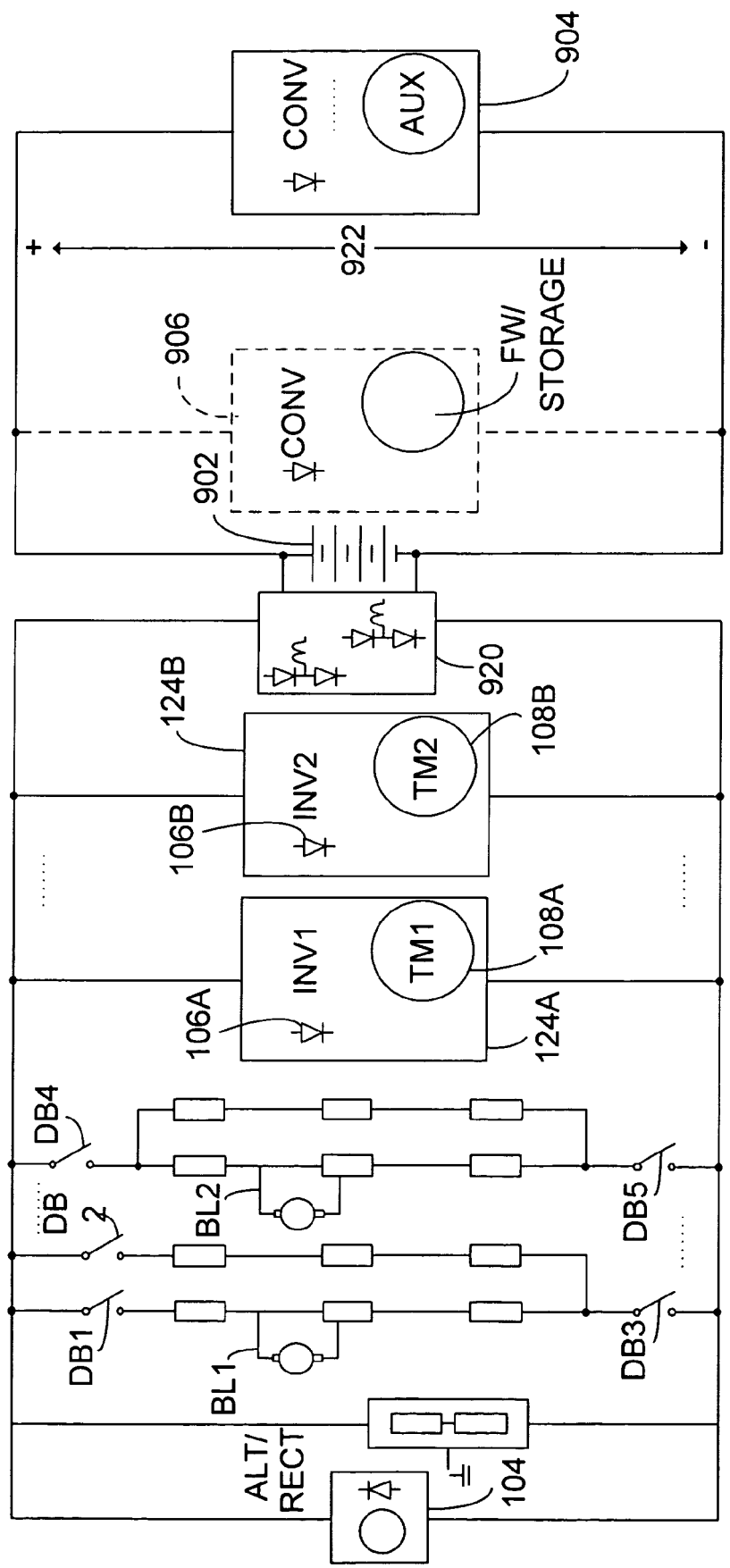

FIG. 9E illustrates, in electrical schematic form, still another configuration of an energy storage medium. Unlike the examples illustrated in FIGS. 9A–9D, however, the configuration of FIG. 9E includes a separate DC battery bus 922. The separate battery bus 922 is electrically isolated from main DC bus 122 (the traction bus) by a dc-to-dc converter 920 (also referred to as a two-stage converter). Accordingly, the power flow between the traction bus (DC bus 122), the energy storage elements, and the auxiliaries preferably passes through the bi-directional dc-to-dc converter 920. In the configuration of FIG. 9E, any additional storage elements (e.g., flywheels, capacitors, and the like) are preferably connected across the DC battery bus 922, rather than across the main DC bus 122. The dc-to-dc converter 920 may be controlled via an energy management system that controls the storage and regeneration of energy in the energy storage medium.

Figure 9F:
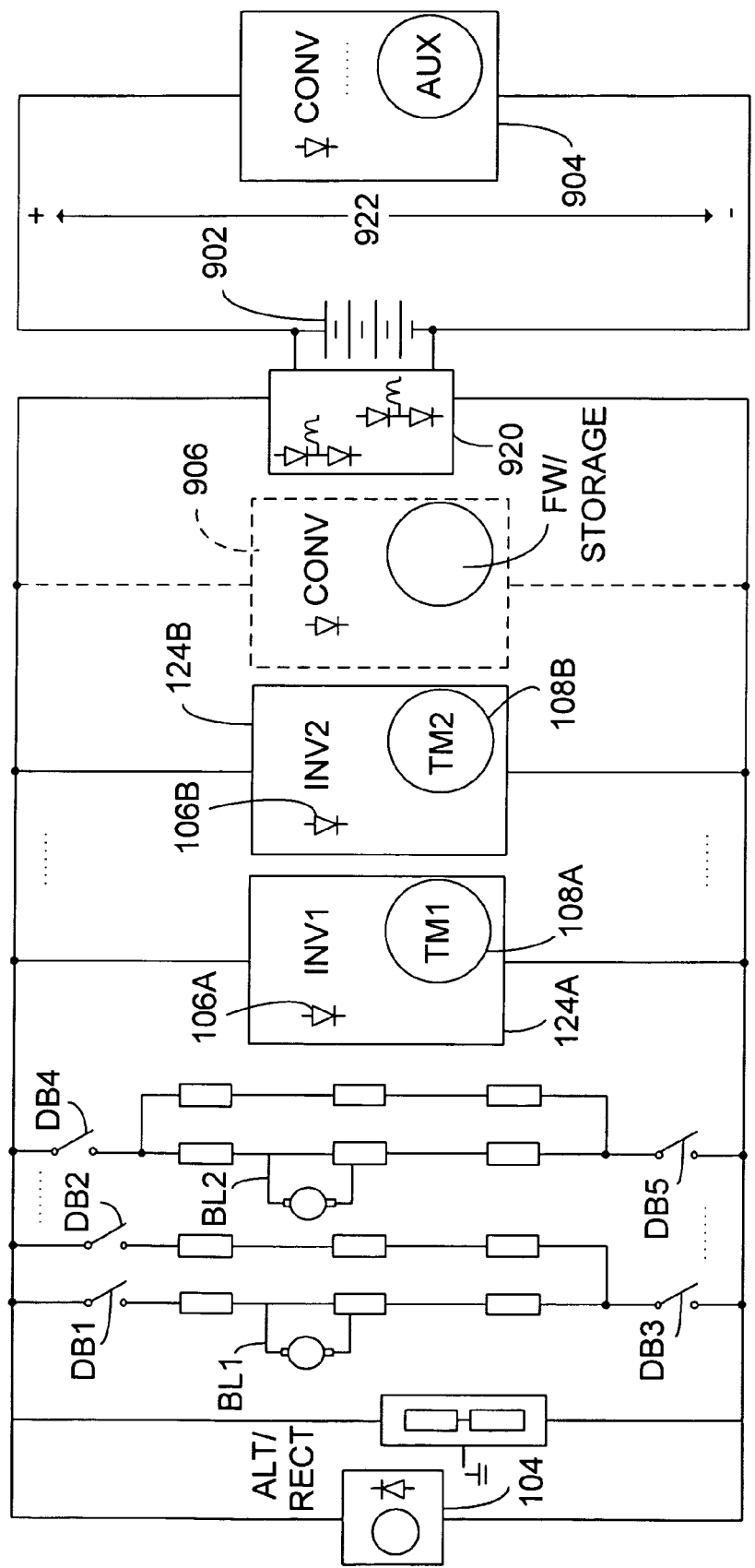

FIG. 9F reflects a variation of the configuration of FIG. 9E. In the configuration of FIG. 9F, any variable voltage storage elements (e.g., capacitors, flywheels, and the like) that are used in addition to battery 906 are connected directly across main DC bus 122 (the traction bus). However, battery 906 remains connected across the isolated DC battery bus 922. Advantageously, in this configuration dc-to-dc converter 920 matches the voltage level of battery storage 902 but avoids two conversions of large amounts of power for the variable voltage storage elements. Like the other configurations, the configuration of FIG. 9F may be implemented in connection with an energy management system that oversees and controls the storage and regeneration of energy in the energy storage medium.

Figure 9G:
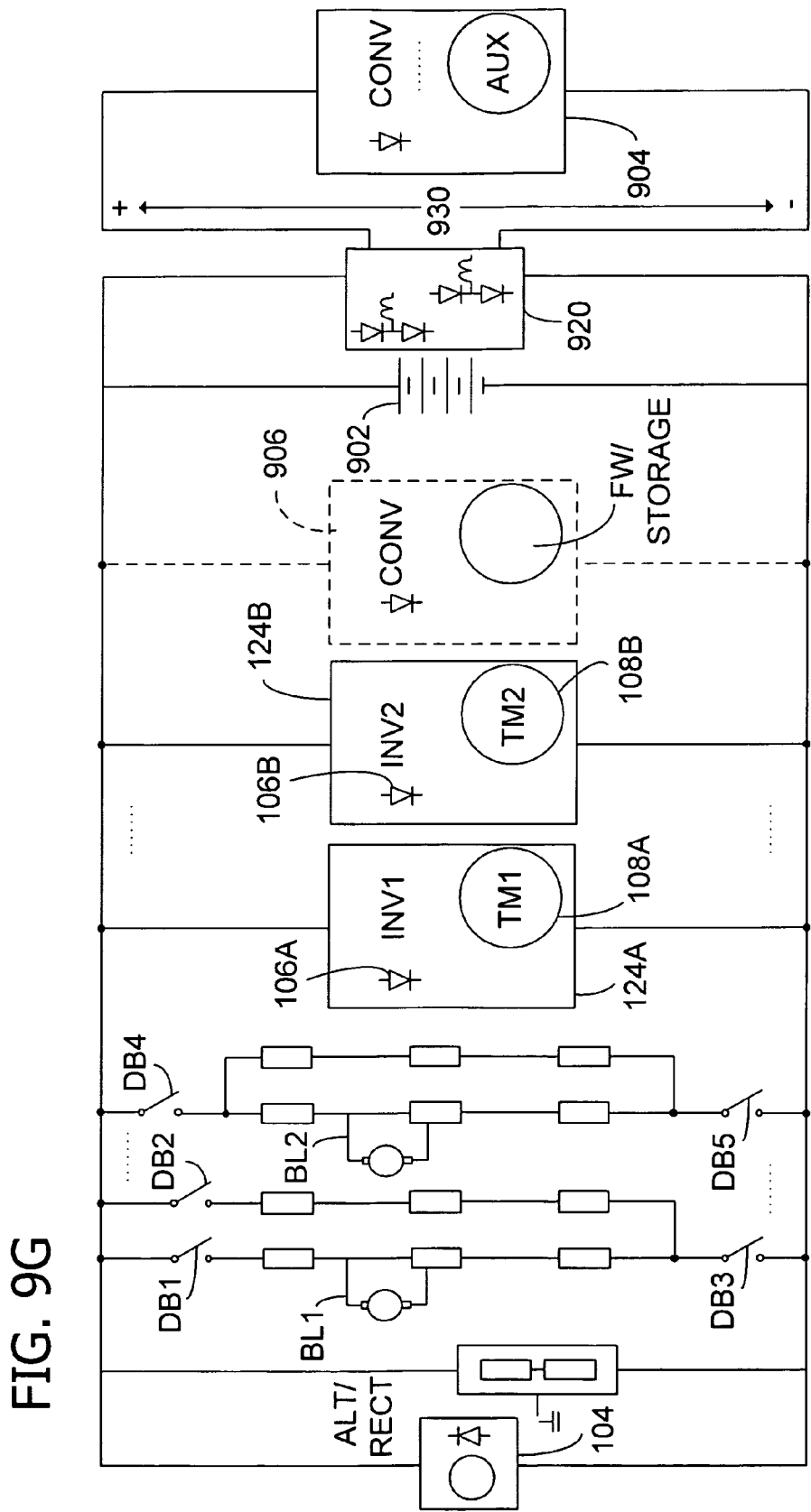

FIG. 9G reflects a variation of the configuration of FIG. 9F in which only the auxiliaries are connected to a separate auxiliary bus 930 through two-stage converter 920. Accordingly, electric power carried on DC bus 122 is provided at a first power level and power carried on the auxiliary bus 930 is provided at a second power level. The first and second power levels may or may not be the same.

Figure 10A:
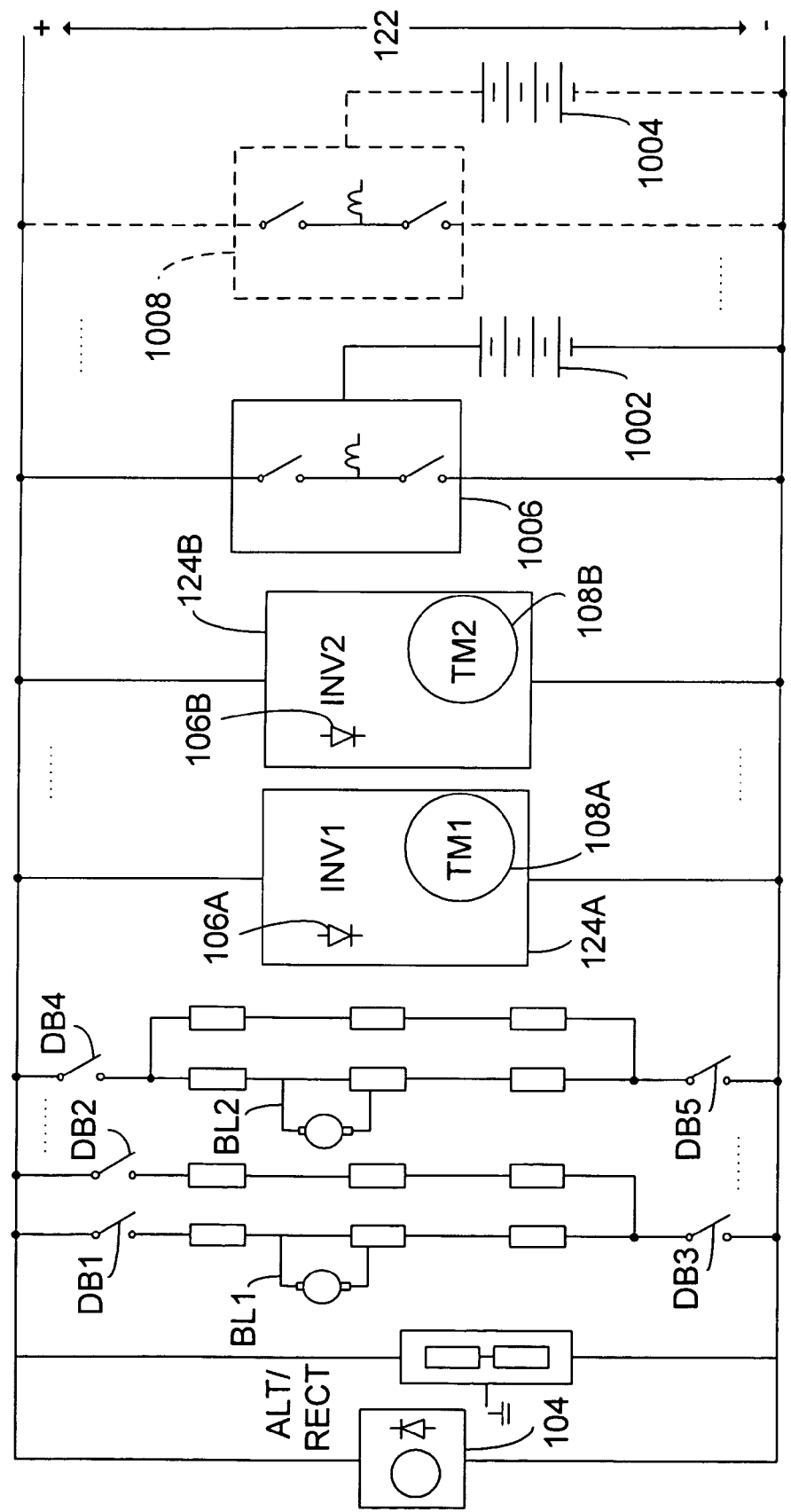
FIGS. 10A–10C are electrical schematics illustrating additional embodiments of an electrical system suitable for use in connection with a hybrid energy vehicle.
Figure 10B:
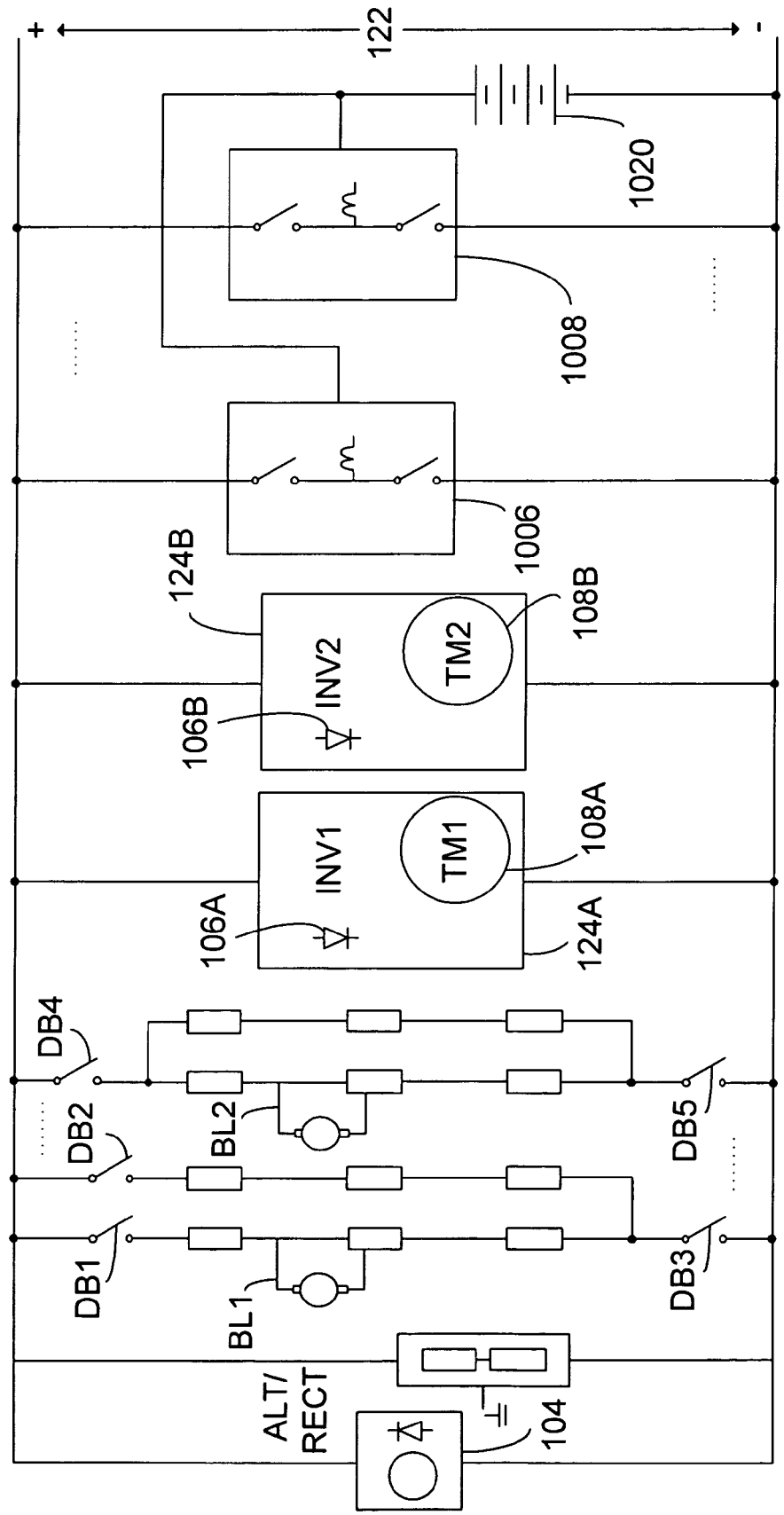
Figure 10C:
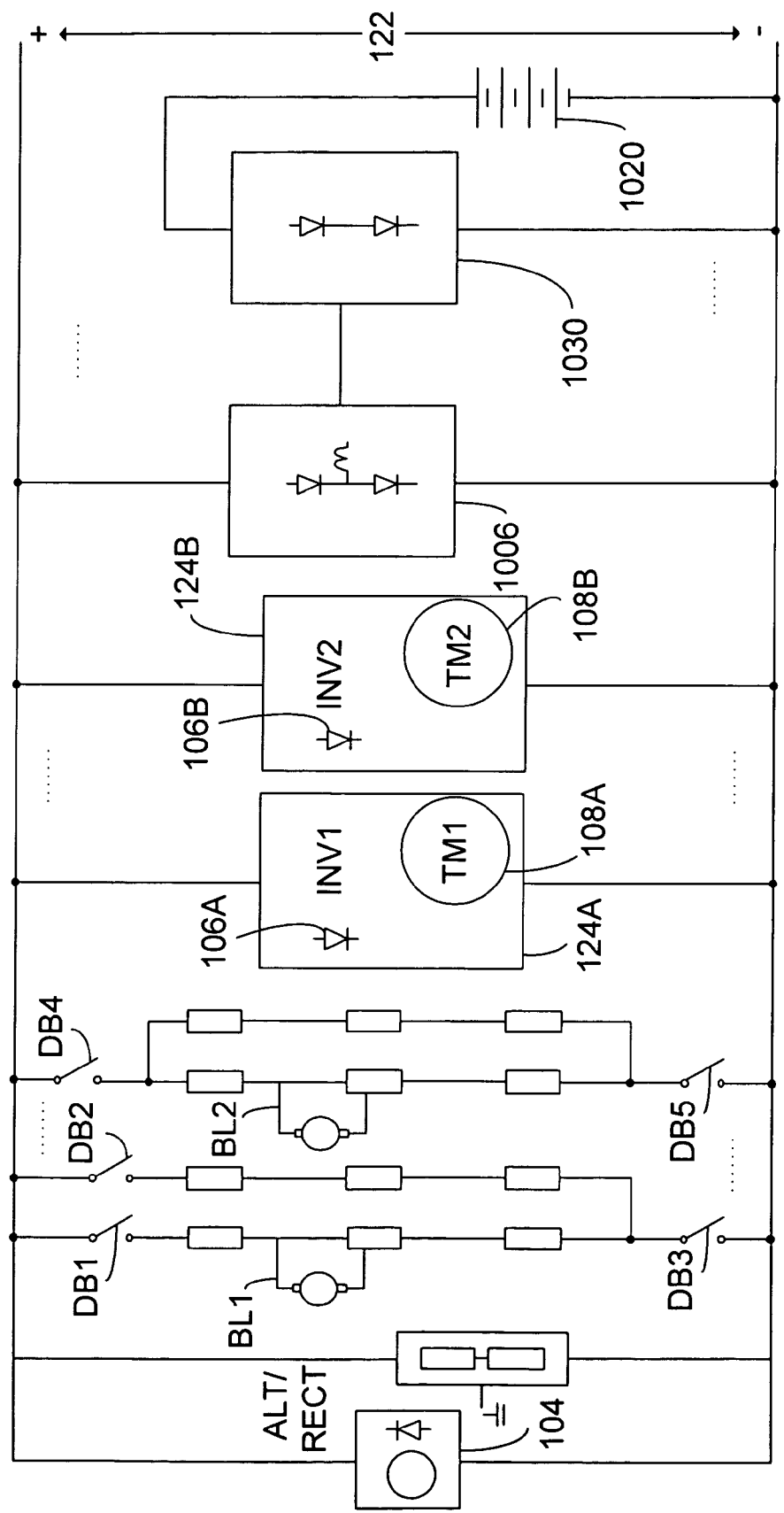

FIGS. 10A–10C are electrical schematics that illustrate additional embodiments, including embodiments particularly suited for modifying existing AC Off Highway Vehicles. It should be understood, however, that the configurations illustrated and described with respect to FIGS. 10A–10C are not limited to retrofitting existing Off Highway Vehicles.

FIG. 10A illustrates a variation of the embodiment illustrated in FIG. 9C. The embodiment of FIG. 10A uses only battery storage devices and does not include a non-battery storage, such as optional flywheel storage 906. In particular, FIG. 10A illustrates an embodiment having a converter 1006 (e.g., a dc-to-dc converter) connected across DC bus 122. A battery storage element 1002 is connected to the converter 1006. Additional converters and battery storage elements may be added to this configuration in parallel. For example, another converter 1008 may be connected across DC bus 122 to charge another battery storage element 1004. One of the advantages of the configuration of FIG. 10A is that it facilitates the use of multiple batteries (or battery banks) having different voltages and/or charging rates.

In certain embodiments, power transfer between energy storage devices is facilitated. The configuration of FIG. 10A, for instance, allows for energy transfer between batteries 1002 and 1004 via the DC bus 122. For example, if during motoring operations, the primary power source supplies 2,000 h.p. of power to the dc traction bus, the traction motors consume 2,000 h.p., and battery 1002 supplies 100 h.p. to the traction bus (via converter 1006), the excess 100 h.p. is effectively transferred from battery 1002 to battery 1004 (less any normal losses).

The configuration illustrated in FIG. 10B is similar to that of FIG. 10A, except that it uses a plurality of converters (e.g., converters 1006, 1008) connected to the DC bus 122 to supply a common battery 1020 (or a common battery bank). One of the advantages of the configuration of FIG. 10B is that it allows the use of relatively smaller converters. This may be particularly advantageous when retrofitting an existing Off Highway Vehicle that already has one converter. A similar advantage of this configuration is that it allows the use of higher capacity batteries. Still another advantage of the configuration of FIG. 10B is that it permits certain phase shifting operations, thereby reducing the ripple current in the battery and allowing the use of smaller inductors (not shown). For example, if converters 1006 and 1008 are operated at 1,000 Hz, 50% duty cycles, and the duty cycles are selected such that converter 1006 is on while converter 1008 is off, the converter effect is as if a single converter is operating at 2,000 Hz, which allows the use of smaller inductors.

FIG. 10C an electrical schematic illustrating another embodiment that is particularly well suited for retrofitting an existing Off Highway Vehicle to operate as a hybrid energy Off Highway Vehicle. The configuration of FIG. 10C uses a double set of converters 1006, 1030 and one or more batteries 1020 (of the same or different voltage levels). An advantage of the system depicted in FIG. 10C is that the battery 1020 can be at a higher voltage level than the DC bus 122. For example, if the converters 1006, 1008 illustrated in FIGS. 10A and 10B are typical two quadrant converters, they will also have freewheeling diodes associated therewith (not illustrated). If the voltage of battery 1002, 1004 (FIG. 10A), or 1020 (FIG. 10B) exceeds the DC bus voltage, the battery will discharge through the freewheeling diode. A double converter, such as that illustrated in FIG. 10C, avoids this situation. One advantage of this capability is that the voltage level on the DC bus can be modulated to control power to the dynamic braking grids independently.

Figure 11:
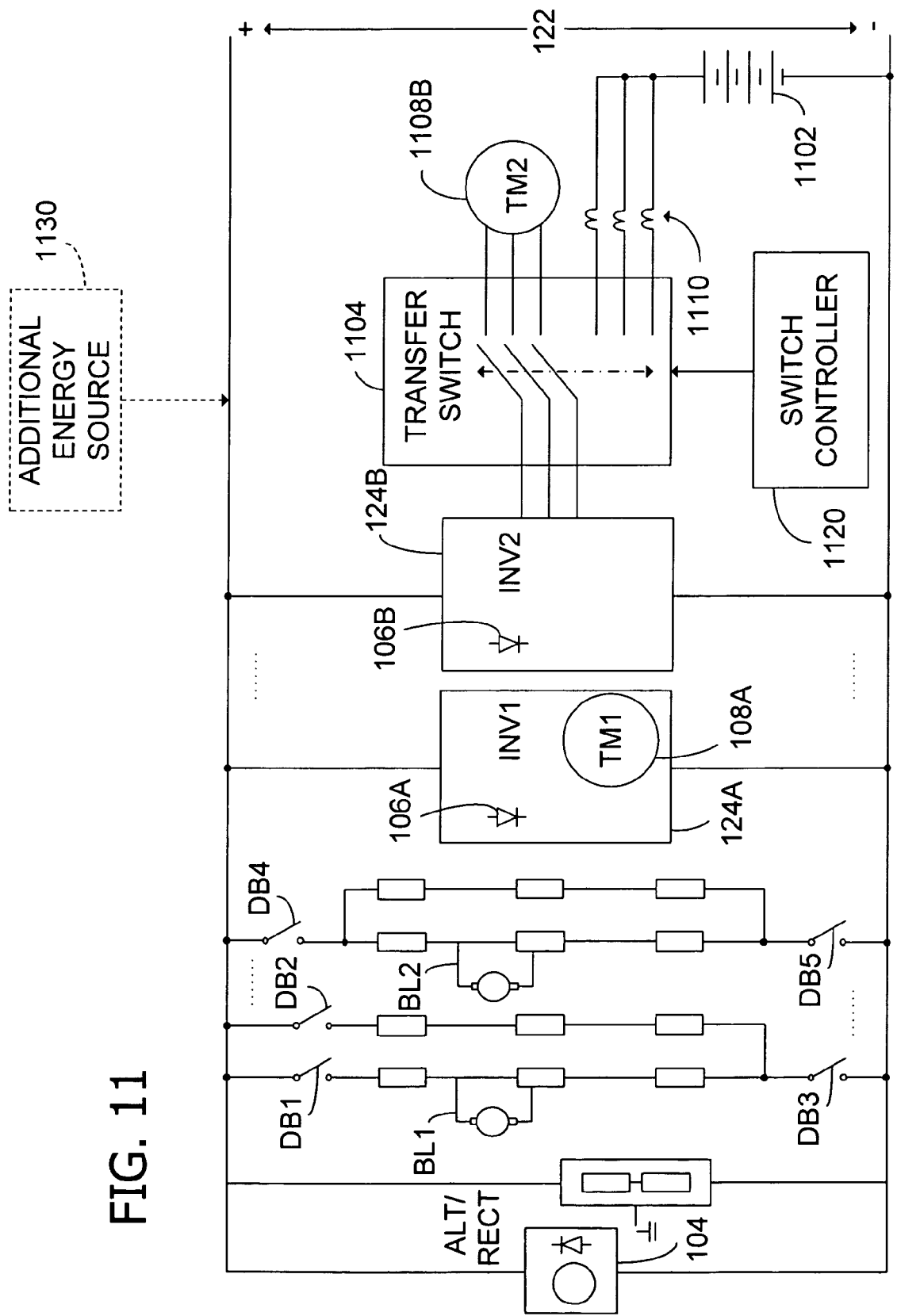
FIG. 11 is an electrical schematic that illustrates one embodiment of connecting electrical storage elements.
Figure 12:
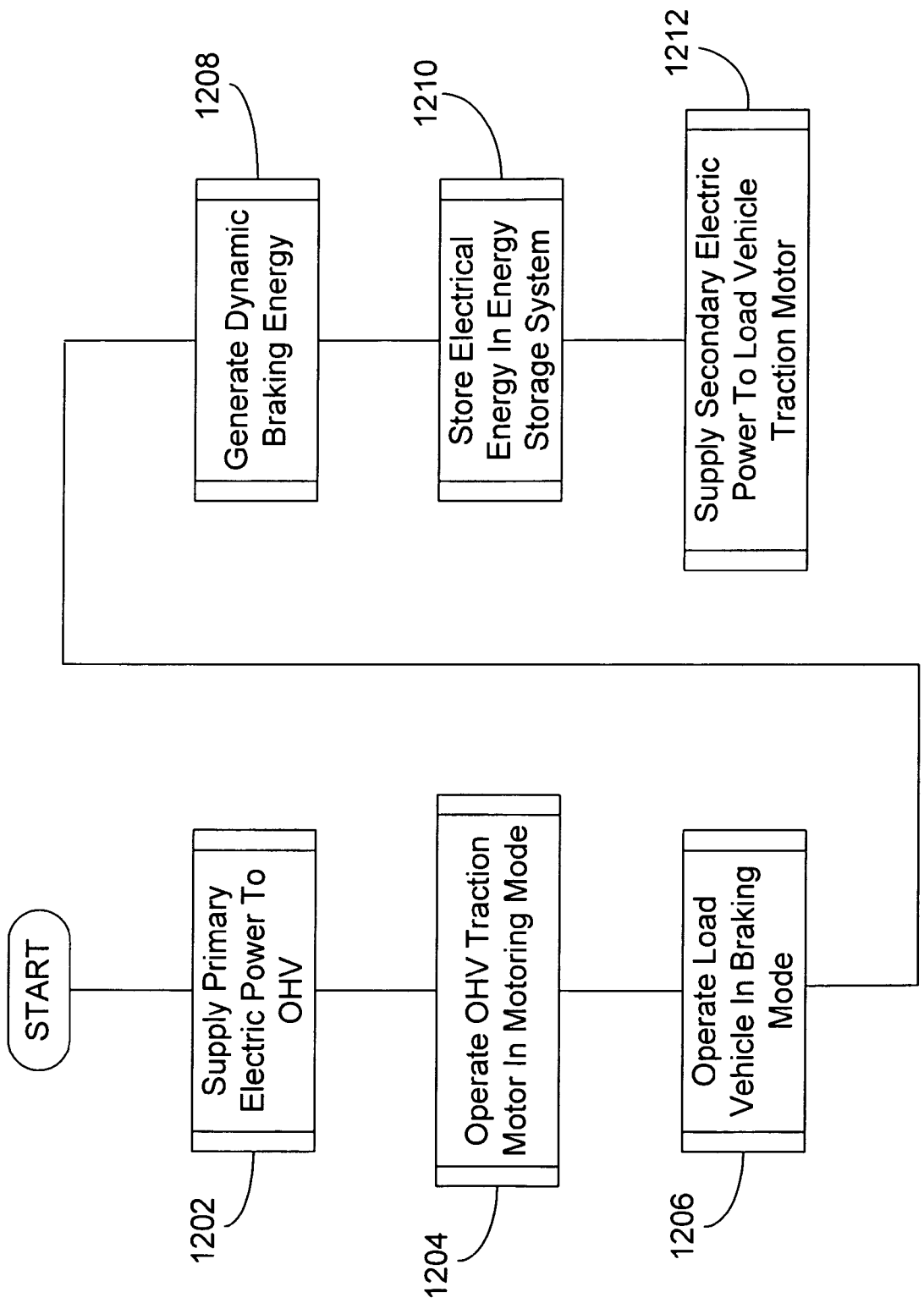
FIG. 12 is a flow chart that illustrates one method of operating a hybrid energy Off Highway Vehicle system.

FIG. 11 is an electrical schematic that illustrates one way of connecting electrical storage elements. In particular, FIG. 11 illustrates an electrical schematic of a system that may be used for retrofitting a prior art Off Highway Vehicle to operate as a hybrid energy Off Highway Vehicle, or for installing a hybrid energy system as part of the original equipment during the manufacturing process. The embodiment illustrated assumes an AC diesel-electric Off Highway Vehicle with four wheels, a pair of wheels located on two axle-equivalents. Two wheels 109 of a single axle-equivalent are driven by individual traction motor subsystems. However, in other embodiments all four wheels 109A and 109B of the two axle-equivalents may be driven by four traction motor subsystems, or any number of traction motors are envisioned consistent with the current invention. For instance, while not commonplace for Off Highway Vehicles would be to have two wheels 109A on a single axle with a single traction motor subsystem for the single axle two wheel arrangement.

Typically, the primary energy source has extra capability (e.g., power capacity) available in the majority of operating conditions. Such extra capability may be due to lower actual ambient conditions, as compared with the design criteria. For example, some Off Highway Vehicles are designed to operate in ambient temperatures of up to 60 degrees Celsius, which is well above typical operating conditions. Considerations other than thermal conditions may also result in extra capacity during significant operating periods. In a typical Off Highway Vehicle, for instance, the use of all of the traction motors may only be required for low speed and when the Off Highway Vehicle operates in an adhesion limited situation (poor tractive conditions). In such case, the weight on the driven wheels 109 determines the pulling power/tractive effort. Hence, all available wheel/motors need to be driven to obtain maximum tractive effort. This can be especially true if the Off Highway Vehicle is heavily loaded during poor tractive conditions (snow, mud, or wet). Such conditions may normally be present for only a fraction of the operating time. During the majority of the operating time, all of the traction motors/inverters are not fully utilized to supply tractive effort. Thus, for example, when retrofitting an existing prior art Off Highway Vehicle, or manufacturing a new Off Highway Vehicle, it is possible to take advantage of this partial underutilization of the traction motors/inverters.

By way of a specific example, the embodiment of FIG. 11 is configured such that one of the two traction motor subsystems is connected to the energy storage element 1102, through a transfer switch 1104 and a plurality of inductors 1110. More particularly, the traction motor subsystem 124B includes an inverter 106B and a traction motor 1108B. Such a configuration is suited for retrofitting a single wheel 109 of an existing prior art Off Highway Vehicle. It should be understood that retrofitting a typical prior art Off Highway Vehicle requires the addition of power conversion equipment and associated cooling devices. The space available for installing the retrofit equipment, however, is generally limited. Therefore, one of the advantages of the "single-wheel" configuration of FIG. 11 is that it tends to minimize impacts and makes retrofitting a more viable option. Similar advantages, however, may also be enjoyed when the hybrid energy system is installed as original equipment during manufacturing.

The transfer switch 1104 preferably comprises a three-phase set of contactors or a set of motorized contacts (e.g., bus bars) that connect inverter 106B to traction motor 1108B when all of the wheels 109A and 109B are needed, and connects inverter 106B to inductors 1110 and battery 1102 when battery charging or discharging is desired. Thus, transfer switch 1104 has a first connection state and a second connection state. In the first connection state, transfer switch 1104 connects inverter 106B to traction motor 1108B. In the second connection state, transfer switch connects inverter 106B to battery 1102.

Transfer switch 1104 is preferably controlled by a switch controller 1120. In one form, the switch controller 1120 is a manual operator-controlled switch that places transfer switch 1104 into the first or the second connection state. In another form, the switch controller reflects control logic that controls the connection state of transfer switch 1104 in accordance with one operating scheme. Table I (below) is indicative of one such operating scheme. Other schemes are possible.

Although FIG. 11 illustrates a three-phase connection between battery 1102 and transfer switch 1104, it is not necessary that all three phases be used. For example, if the power requirement is relatively low, only one or two phases may be used. Similarly, three separate batteries could be independently connected (one to each phase), or one large battery could be connected to two phases, with a relatively smaller battery connected to the third phase. Further, power transfer between multiple batteries having different voltage potentials and/or capacities is also possible.

The configuration of FIG. 11 is especially advantageous in the context of retrofitting existing Off Highway Vehicles because transfer switch 1104 is believed to be much less expensive than adding additional inverters and/or dc-to-dc converters. Such advantage, however, is not limited to the retrofit context. Also, it should be understood that the configuration of FIG. 11 is not limited to a single inverter per transfer switch configuration.

FIG. 11 further illustrates an optional charging source 1130 that may be electrically connected to DC traction bus 122. The charging source 1130 may be, for example, another charging energy source or an external charger, such as that discussed in connection with FIG. 5.

The general operation of the configuration of FIG. 11 will be described by reference to the connection states of transfer switch 1104. When transfer switch 1104 is in the first switch state, the second wheel 109B is selectively used to provide additional motoring or braking power. In this switch state, battery 1102 is effectively disconnected and, therefore, neither charges nor discharges.

When the second wheel 109B is not needed, switch controller 1120 preferably places transfer switch 1104 in the second connection state—battery 1102 is connected to inverter 106B. If, at this time, the other traction motor (e.g., traction motor 108A) is operating in a dynamic braking mode, electrical energy is generated and carried on DC traction bus 122, as described in greater detail elsewhere herein. Inverter 106B transfers a portion of this dynamic braking electrical energy to battery 1102 for storage. If, on the other hand, the other traction motor is operating in a motoring mode, inverter 106B preferably transfers any electrical energy stored in battery 1102 onto DC traction bus 122 to supplement the primary electric power supplied by prime mover power source 104. Such electrical energy transferred from battery 1102 to DC traction bus 122 may be referred to as secondary electric power. In one embodiment, inverter 106B comprises a chopper circuit for controlling the provision of secondary electric power to DC traction bus 122 from battery 1102.

It should be understood, however, that battery 1102 can also be charged when the other traction motors are not operating in a dynamic braking mode. For example, the battery can be charged when transfer switch 1104 is in the second connection state (battery 1102 is connected to inverter 106B) and the other traction motors are motoring or idling if the amount of power drawn by the other traction motors is less than the amount of primary electric power carried on DC traction bus 122.

Advantageously, battery 1102 can also be charged using charging electric power from optional energy source 1130. As illustrated in FIG. 11, optional energy source 1130 is preferably connected such that it provides charging electric power to be carried on DC traction bus 122. When optional energy source 1130 is connected and providing charging electric power, switch controller 1120 preferably places transfer switch 1104 in the second connection state. In this configuration, inverter 106B transfers a portion of the electric power carried on DC traction bus 122 to battery 1102 for storage. As such, battery 1102 may be charged from optional energy source 1130.

In summary, in the embodiment of FIG. 11, when transfer switch is in the second connection state, battery 1102 may be charged from dynamic braking energy, from excess Off Highway Vehicle energy (i.e., when the other traction motors draw less power than the amount of primary electric power carried on DC traction bus 122), and/or from charging electric power from optional charging source 1130. When transfer switch 1104 is in the second connection state and the other traction motor draws more power than the amount of primary electric power carried on DC traction bus 122, inverter 106B transfers secondary electric power from battery 1102 to DC traction bus 122 to supplement the primary electric power. When transfer switch 1104 is in the first connection state, battery 1102 is disconnected and traction motor 1108B is operable to assist in motoring and/or dynamic braking. Table I summarizes one set of operating modes of the embodiment of FIG. 11.

TABLE I

| One Axle | Two Axles |
|---|---|
| Low Speed and Low Tractive Effort Settings | Battery Fully Charged & Dynamic Braking |
| High Speed Motoring | No Battery Charging & Motoring Battery Discharged & Motoring Very High Speed Dynamic Braking |

While FIG. 11 illustrates an energy storage device in the form of a battery, other energy storage devices, such as flywheel systems or ultra-capacitors, may also be employed instead of or in addition to battery 1102. Further, it should be understood that the configuration of FIG. 11 may be scaled. In other words, the configuration can be applied to more than one axle.

Although the foregoing descriptions have often referred to AC Off Highway Vehicle systems to describe several pertinent aspects of the disclosure, the invention should not be interpreted as being limited to such Off Highway Vehicle systems. For example, aspects of the present disclosure may be employed with diesel-electric, fuel cell, "all electric," third-rail, trolley or overhead powered Off Highway Vehicles. Further, aspects of the hybrid energy Off Highway Vehicle systems and methods described herein can be used with Off Highway Vehicles using a DC generator rather than an AC alternator and combinations thereof. Also, the hybrid energy Off Highway Vehicle systems and methods described herein are not limited to use with AC traction motors. As explained elsewhere herein, the energy management system disclosed herein may be used in connection with locomotives, mine trucks, large excavators, etc.

As can now be appreciated, the hybrid energy systems and methods herein described provide substantial advantages over the prior art. Such advantages include improved fuel efficiency, increased fuel range, and reduced emissions such as transient smoke. Other advantages include improved speed by the provision of an on-demand source of power for a horsepower burst. Significantly, the hybrid energy Off Highway Vehicle system herein described may also be adapted for use with existing Off Highway Vehicle systems.

Figure 1B:
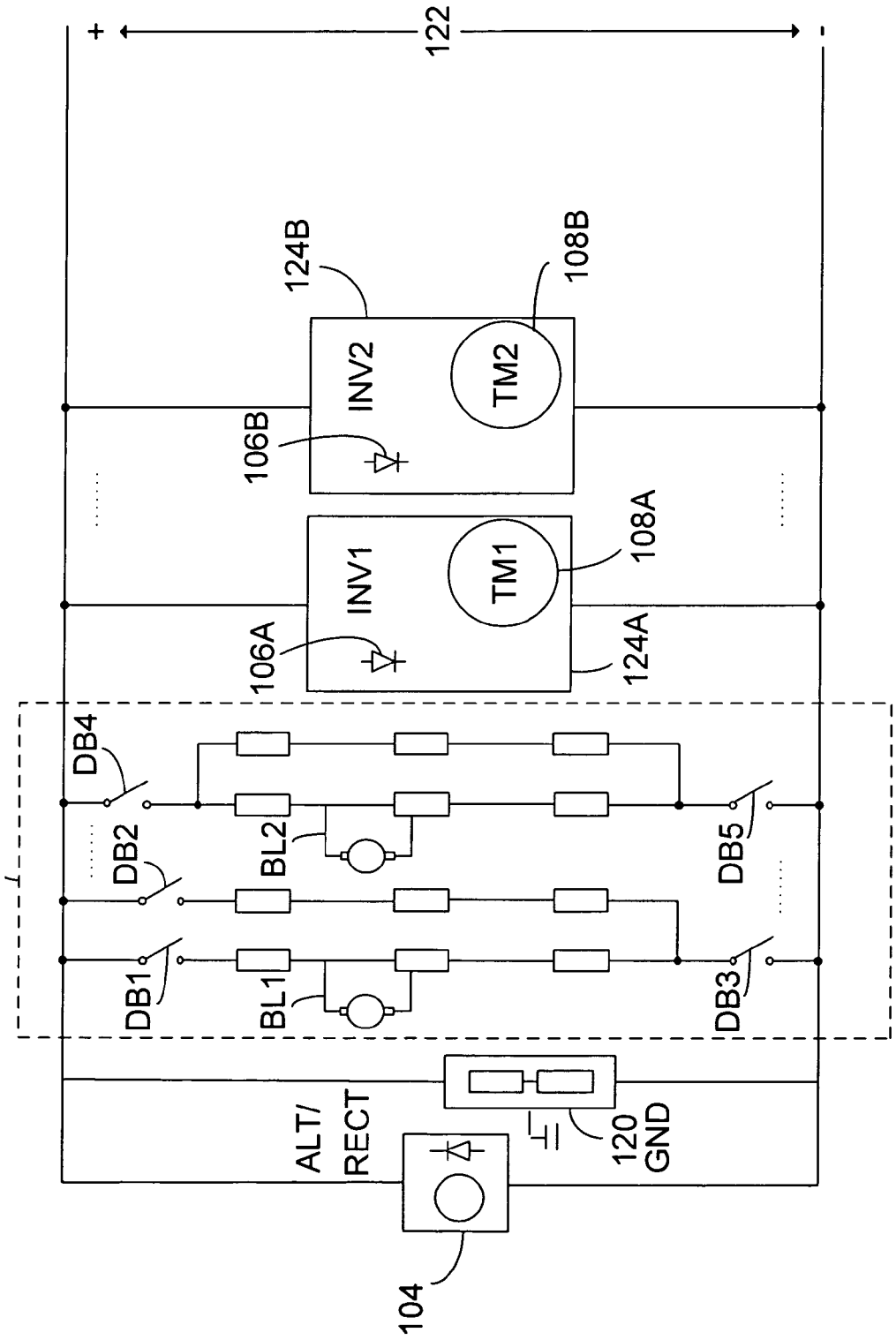
FIG. 1B is an electrical schematic of a prior art AC diesel-electric Off Highway Vehicle.
Figure 13:
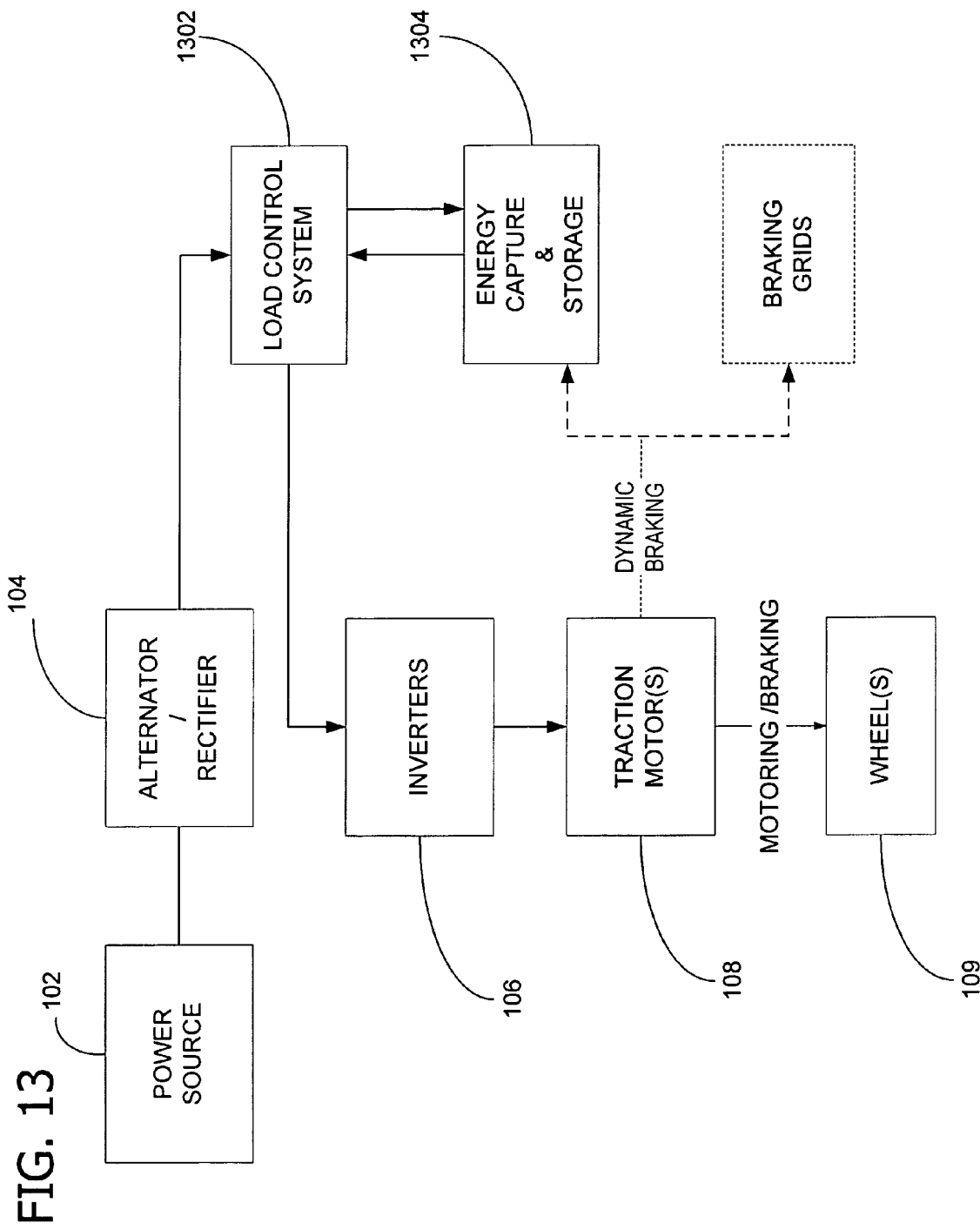
FIG. 13 is a block diagram illustrating one embodiment of hybrid energy Off Highway Vehicle system configured with a load control system.

Referring now to FIG. 13, a block diagram illustrates one embodiment of a hybrid energy Off Highway Vehicle system having a load control system 1302. As described above in reference to FIG. 1B, in a typical prior art Off Highway Vehicle the power source (e.g., engine) 102 drives the prime mover power source 104 (e.g., an alternator and rectifier). The output of prime mover power source 104 is connected to the DC bus 122 that supplies DC power to the traction motor(s) 108 to propel the Off Highway Vehicle. As is generally understood in the art, the alternator/rectifier 104

(also referred to as a generator) provides DC electric power to an inverter 106 that converts the AC electric power to a form suitable for use by a traction motor system (traction motor) 108. The traction motor 108 has a motoring mode of operation and a braking mode of operation. During the motoring mode, the traction motor 108 rotates at least one wheel of the vehicle to propel the off-highway vehicle in response to the received primary electric power. During the braking mode or power generation mode, the traction motor 108 operates as a generator driving the rotating wheel and generates dynamic braking electrical power, which is returned to the traction bus 122 and dissipated through the resistance grid system 110. The dissipation slows the rotation of the wheel and, thus, slow or stops the off highway vehicle.

The load control system 1302 is coupled to an energy storage system 1304 (e.g., capture and energy storage 204) and to the engine 102 via the prime mover power source 104, and provides at least a portion of the electrical power generated by the engine 102 to the energy storage system 1304 for storage when the engine 102 is in a pre-loading or loading mode of operation and/or during a transient operating condition. Some Off Highway Vehicles such as mining trucks are of sufficient size to carry loads in excess of 300 tons. Because of the tremendous weight of such vehicles, they are said to have a high load-to-power ratio (i.e., tons/h.p.), as compared to a passenger bus. Generally, some period of time will pass between engine start-up and the engine 102 being capable of producing a threshold power level (i.e., torque) that corresponds to a minimum amount of power sufficient to drive traction motor 108 and propel the Off Highway Vehicle. In other words, some initial period of time will pass before the engine speed reaches sufficient revolutions per minute (rpm) to drive traction motor 108 and propel the Off Highway Vehicle. The ratio of the amount of tractive power required for propelling the Off Highway Vehicle to the magnitude of the preloading time period is the engine load rate. Thus, the engine load rate directly affects the rate at which the Off Highway Vehicle accelerates. During the period of time between engine start-up and the engine 102 producing the threshold power level, referred to herein as a preloading time period, the engine 102 remains in a pre-loading mode or loading mode of operation. During the pre-loading time period, the load control system 1302 is responsive to electrical power output from the prime mover power source 104 to provide the generated power to the storage system 1304 for later regeneration and use. After the electrical power produced by the engine 102 meets or exceeds the threshold power level, the engine 102 is loaded. After the engine 102 is loaded and the motoring mode or driving mode of the Off Highway Vehicle has been activated, for example, by an operator, the load control system 1302 provides the electrical power output from the prime mover power source 104 to the traction motor 108 to propel the Off Highway Vehicle at an improved acceleration rate. That is, because the engine 102 is already producing the threshold power level (i.e., the engine is loaded) the acceleration and response time of the Off Highway Vehicle is improved. Notably, the load control system 1302 can be responsive to electrical power output from the prime mover power source 104 after the engine 102 is loaded, but prior to activation of the motoring mode (i.e., vehicle in an idling mode), to provide the generated power to the energy storage system 1304 via power control components for later regeneration. The power control components may be relays such as described below in reference to FIG. 15, and/or choppers such as described above in reference to FIG. 9B.

In one embodiment, the load control system 1302 selectively supplies electrical power output from the prime mover power source 104 to the energy storage system 1304 as a function of one or more operating parameters. Operating parameters include operator input; throttle position, axle pedal position, brake position, a predetermined time, parking brake operation (ex. release), direction change, truckload sensing, and/or bed position. For example, an operator initiates the power storage process by selecting a power storage option displayed for example on a control panel (not shown) and initiating engine start-up. Alternatively, the operator can initiate the power storage process by selecting a power storage option displayed on the control panel while the off highway vehicle is in a motoring mode. For instance, if the Off Highway Vehicle is traveling down an incline along a path, the operator may determine that at least a portion of the electric energy generated by the engine 102 is not required for propelling the Off Highway Vehicle and manually initiates the power storage process by selecting the power storage option displayed on the control panel. In either case, the load control system 1302 is responsive to such operator input to provide the generated power to the energy storage system 1304 for later regeneration and use.

As yet another example, the power storage process can be programmed via the control panel to begin at a particular time during the day at a specified interval (e.g., 7 days a week, 5 days a week, weekly, etc.). For instance, the operator can program a start time for both the engine 102 and the power storage process via a program time option displayed for example on a control panel. Thereafter, the load control system 1302 is responsive to the programmed start time to provide the generated power to the energy storage system 1304.

Figure 14:
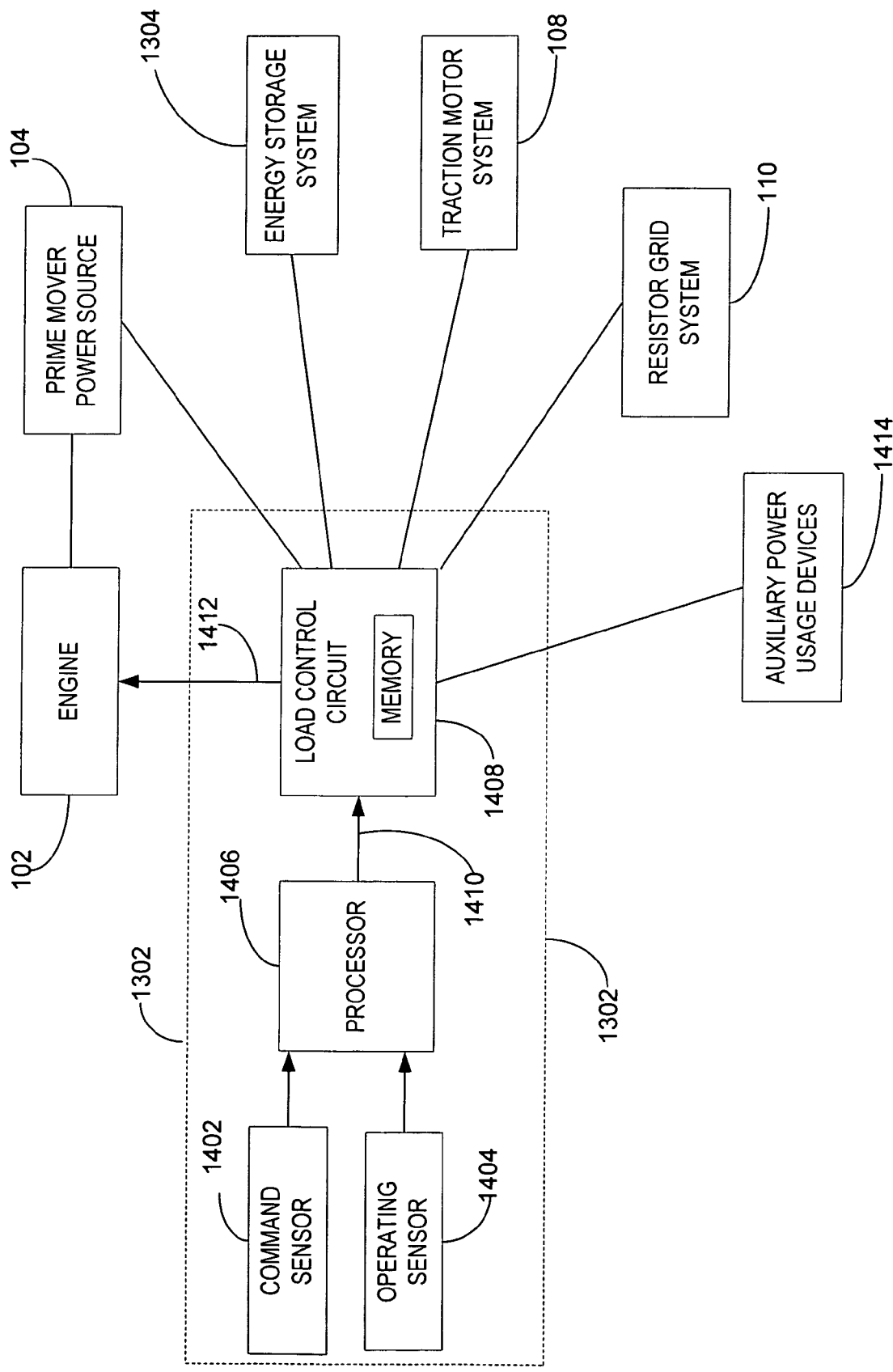
FIG. 14 is a block diagram illustrating components of a load control system suitable for use in connection with a hybrid energy vehicle.

Referring now to FIG. 14, a block diagram illustrates components of a load control system 1302 for use in one preferred embodiment of the invention. The load control system 1302 includes a command sensor 1402, an operating sensor 1404, a processor 1406, and a load control circuit 1408. The command sensor 1402 senses a command parameter that indicates a commanded operating condition of the Off Highway Vehicle. For example, the commanded operation may correspond to an operator setting a throttle position that causes the engine speed to change which results in the Off Highway Vehicle moving from a stopped position, moving at a faster speed, or moving at a slower speed. The operating sensor 1404 senses an operating parameter indicative of a current operating condition of the vehicle. For example, the current operating condition sensed by the operating condition sensor may be a current throttle position that corresponds to a particular engine speed, and, thus, a particular current power output level of the engine 102. The processor 1406 is responsive to the command and operating parameters for generating a load control signal 1410 representative of operational transients. That is, when both the command and operating parameters correspond to the same operating condition (e.g., throttle position), the processor 1406 generates a load control signal 1410 representative of the difference between the sensed command and operating parameters. The load control circuit 1408 is coupled to the processor 1406 for receiving the control signal 1410, and is responsive to the control signal 1410 for selectively controlling the delivery of the power provided from the power source 104 to the traction motor 108 and/or the delivery of the power provided from the power source 104 to the energy storage system 1304. The load control circuit 1408 is also coupled to the engine 102 and is responsive to the load control signal 1410 for generating an engine control signal 1412.

In one embodiment, the processor 1406 controls the load control circuit 1408 to direct the transmission of electrical power generated at the primary power source 104 to the energy storage system 1304 for an initial period of time. The initial period of time can be predetermined and stored in a memory (e.g., see FIG. 15). During this initial period of time, the engine 102 is responsive to the engine control signal 1412 generated by the load control circuit 1408 to increase the engine speed to the amount required to generate an amount of electrical power output that corresponds to the new throttle position. Also, during this initial period the load control circuit is responsive to the load control signal 1410 to direct the transmission of at least a portion of the electrical power generated at the primary power source 104 to the energy storage 1304. The portion of energy being directed to the energy storage system 1304 may correspond to an additional amount of electrical power output from the engine at the new throttle position as compared to the current throttle position. That is, the portion of generated electrical power output being directed to the energy storage system during the initial period corresponds to an amount of electrical power being generated by the primary power source at the new throttle position that exceeds the current power output (i.e., previous throttle position). For example, if the speed of the engine at the current throttle position corresponds to 2,000 rpm, and the speed of the engine at the commanded throttle position corresponds to 3000 rpm, the amount of power directed to the energy storage system 1304 during the initial period corresponds to the power associated with the additional 1000 rpm required at the commanded throttle position. After the initial period of time expires, the processor 1406 generates a load control signal 1410 that causes the load control circuit 1408 to direct the transmission of electrical power generated at the primary power source 104 to the to the traction motor 108. In other words, rather than immediately providing the additional electrical energy generated by the engine 102 to the traction motor 108, the additional electrical energy is directed to the energy storage system 1304.

As another example, after the operator selects a new throttle position that causes the speed of the engine to decrease, and, thus causing the Off Highway Vehicle to move at a slower speed, during an initial period the processor 1406 generates an engine control signal 1412 that causes the load control circuit 1408 to maintain the current engine speed that corresponds to the previous throttle position. Also, during this initial period, the load control circuit 1408 is responsive to the load control signal 1410 to direct the transmission of at least a portion of the electrical power generated at the primary power source 104 to the energy storage 1304. In this case, the portion of energy being directed to the energy storage system 1304 corresponds to the amount of electrical energy being generated by the engine 102 during the initial period that exceeds the amount of electrical power output from the engine at the new throttle position as compared to the current throttle position. For example, if the speed of the engine at the current throttle position corresponds to 2,500 rpm, and the speed of the engine at the commanded throttle position corresponds to 1000 rpm, the amount of power directed to the energy storage system 1304 during the initial period corresponds to the power associated with the additional 1500 rpm required to maintain the current throttle position. After the initial period of time expires, the processor 1406 generates an engine control signal 1412 that causes the load control circuit 1408 to decrease the engine speed to an amount required to operated the Off Highway Vehicle at a speed corresponding to the new throttle position, and generates a load control signal 1410 that causes the load control circuit 1408 to direct the transmission of electrical power generated at the primary power source 104 to the traction motor 108.

In another embodiment, the load control circuit 1408 is coupled to an auxiliary electrical power usage device 1414. The load control circuit 1408 is responsive to the load control signal 1410 for directing the transmission of power from the energy storage system 1304 to the auxiliary electrical power usage device 1414 when the device 1414 operates to maintain the electrical load on the primary power source 104 generally constant. For example, Off Highway Vehicles typically utilize hydraulic power to assist the operator in turning a steering wheel of the vehicle. A pump driven by the engine via a belt and pulley provides the hydraulic power for the steering. As a result, when the operator turns the vehicle, there will be a decrease in the amount of power being provided to the traction motor 108 by at least the amount of power being used to drive the pump. In this example, the load control circuit 1408 directs the transmission of power from the energy storage system 1304 to the pump, and, thus maintains the electrical load on the primary power source at a more constant level.

In yet another embodiment of the invention, the load control circuit 1408 is coupled the resistance grid system 110 for selectively controlling the dissipation of excess electrical power. More specifically, the load control circuit 1408 is responsive to the load control signal 1410 for directing the transmission of excess electrical power generated by the traction motor 108 to the resistance grid system 110 when the off highway vehicle is operating in the power generating mode or dynamic braking mode.

Figure 15:
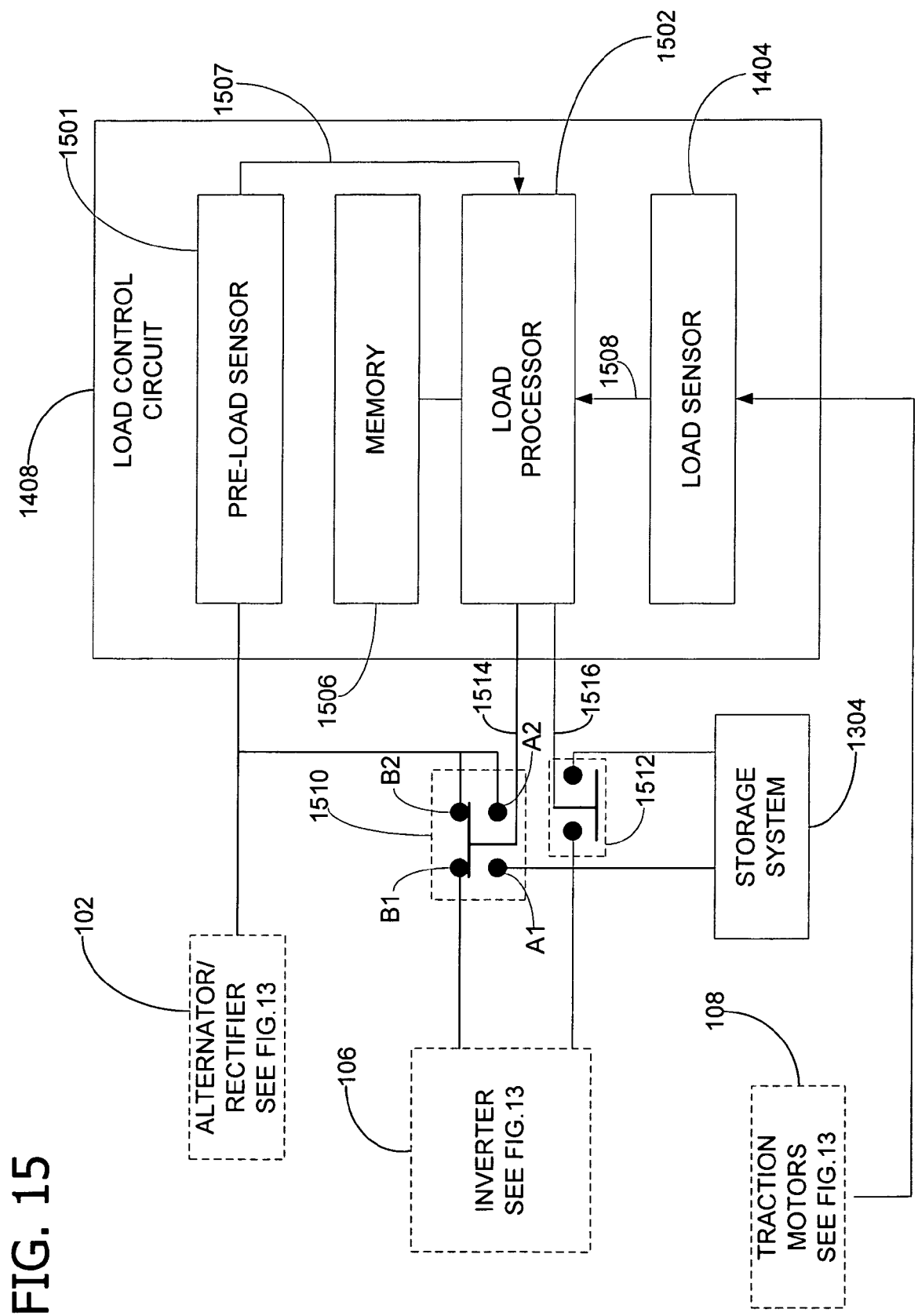
FIG. 15 is a block diagram illustrating components of a load control circuit suitable for use in connection with a hybrid energy vehicle

Referring now to FIG. 15, a block diagram illustrates components of a load control circuit 1408 for use in one embodiment of the invention. The load control circuit 1408 includes a pre-load sensor 1501, a load processor 1502, a load sensor 1504, and memory 1506. The pre-load sensor 1501 senses the amount of primary electric power being generated by the engine 102 from the output of the prime mover power source 104 and generates a primary power signal 1507. The primary power signal 1507 can be in an analog format (e.g., voltage) or can be a digital signal having a magnitude corresponding to the sensed amount of primary power. The load sensor 1504 is coupled to the traction motor 108 and senses an amount of traction power being used to drive the traction motor 108 and generates a traction demand signal 1508. The traction demand signal 1508 can be in an analog format or can be a digital signal having a magnitude corresponding to the sensed traction demand. The memory 1506 stores a threshold power value corresponding to a magnitude of electrical power required for electrical energy to operate the traction motor 108 and propel the Off Highway Vehicle. The load processor 1502 is electrically connected to the pre-load sensor 1501 and determines a magnitude of the primary power signal 1507, and is connected to the memory 1506 for retrieving the threshold power value. The load processor 1502 compares the determined magnitude of the primary power to the threshold power value to control the operation of a switch 1510 as a function of the comparison.

In one embodiment, the switch 1510 selectively interconnects the prime mover power source 104 to the energy storage system 1304 during the loading mode so that electrical energy generated by the prime mover power source 104 is provided to the energy storage system 1304 for storage. The switch 1510 selectively interconnects the prime mover power source 104 to the traction motor 108 during the motoring mode so that the generated electrical energy is provided to the traction motor 108 to propel the Off Highway Vehicle. The switch 1510 is, for example, a relay having two sets of contacts (contacts A1, A2 and contacts B1, B2). In this example, the relay is configured to connect contact point A1 to contact point A2 during a non-activated state. When the load processor 1502 determines that the magnitude of the primary power is less than the threshold power value, the relay remains in a non-activated state and contacts A1 and A2 remain connected, and, thus, connect the prime mover power source 104 to the energy storage system 1304. When the load processor 1502 determines that the magnitude of the primary power is equal to or greater than the threshold power value, the processor 1502 produces a first output voltage signal 1514 that activates the relay (i.e., switch 1510). When activated, the relay connects contact B1 to contact B2 and, thus, connects the prime mover power source 104 to the traction motor 108.

Although the selective switching is described above as being implemented with contacts, it should be appreciated that power electronic components can be used to implement the switching functions described above. For example, in one embodiment, chopper circuits (e.g., see DBC1: FIG. 9B) are controlled by the load control circuit and provide dynamic switching to control power storage and/or power delivery during a transient condition.

As described above in reference to FIG. 13, the load control circuit 1408 selectively supplies electrical power output from the prime mover power source 104 to the energy storage system 1304 as a function of the received load control signal 1410. The load processor 1502 is electrically linked to the command sensor 1402 via processor 1406, and is responsive to a sensed command parameter, the load controls signal 1410, and a predetermined time period received from the memory 1506 to control the operation of switch 1510. For example, after the operator selects a new throttle position that causes the Off Highway Vehicle to move from a stopped position, or to move at a faster speed, the load processor 1502 controls the first switch so that the generated electrical energy is provided to storage system for an initial period of time that corresponds to the predetermined time stored in the memory 1506. After the initial period of time expires, the load processor 1502 controls the first switch 1510 so that the generated electrical energy is provided to the traction motor 108 to propel the Off Highway Vehicle at a speed that corresponds to the new throttle position. Notably, although processor 1406 and load processor 1502 are described herein as separate processors, it is contemplated that a single processor can perform the operations of both processor 1406 load processor 1502.

The load control circuit 1408 also selectively supplies electrical power output from the prime mover power source 104 to the energy storage system 1304 as a function of one or more operating conditions. For example, when the Off Highway Vehicle is traveling at a constant speed on a path having on a substantially level surface, the load demand of the traction motor 108 is substantially constant, and the off highway vehicle is in a steady state operating condition. Alternatively, when the Off Highway Vehicle is moving from a relatively flat portion of the path to an inclined portion of the path or a non-uniform surface (e.g., bumps in the road) the load demand of the traction motor 108 changes, and the off highway vehicle is in a transient operating condition. The load control circuit 1408 provides transient power from the energy storage system 1304 (e.g., battery) and steady state power from the engine 102. In other words, as long as the load demand of the traction motor 108 is substantially constant, the load control circuit 1408 supplies the output of the prime mover power source 104 to the traction motor 108 to propel the off highway vehicle. However, when load demand of the traction motor 108 is changing, the load control circuit supplies additional power to or from the energy storage system 1304 to the traction motor 108 to assist in propelling the off highway vehicle.

In one such embodiment, the load processor 1502 determines a magnitude of the traction demand signal 1508 and is responsive to a change in the determined magnitude of the traction demand signal over a short period of time (e.g., 0.5–20 seconds), indicating a transient load condition, to control the amount of power being supplied from the energy storage system 1304 and/or from the prime mover power source 104 to propel the Off Highway Vehicle. For example, the memory 1506 is linked to the load sensor 1504 and the load processor 1502 and at periodic intervals (e.g., 0.1 sec, 0.5 sec, 5 sec., 10 sec., 15 sec., etc.) determines and stores the magnitude of the traction demand signal 1508. The load processor 1502 receives a current traction demand signal 1508 and compares the magnitude of the currently received traction demand signal 1508 to the magnitude of the last traction demand signal 1508 stored in the memory 1503 to calculate a transient compensation parameter representative of a difference between the magnitude of the currently received traction demand signal 1508 and magnitude of the last traction demand signal stored in the memory 1506. The load processor 1502 controls the operation of a switch 1512 as a function of the calculated transient compensation parameter. Switch 1512 is for example, a relay that having normally opened contacts during a non-activated state or power electronic switches or control functions as described above. The transient compensation parameter may be a percent difference between the magnitude of the currently received traction demand signal 1508 and magnitude of the last traction demand signal 1508. Thus, when the magnitude of the currently received traction demand signal 1508 is less than the magnitude of the last traction demand signal 1508 the percent difference is negative. In contrast, when the magnitude of the currently received traction demand signal 1508 is greater than the magnitude of the last traction demand signal 1508 the percent difference is positive. If the transient compensation parameter is equal to or greater than a predetermined value (e.g., +10%, or −10%), the load processor 1502 outputs a second output signal 1516 that activates relay (i.e., switch) 1512. When activated, the relay closes and, thus, connects storage system 1304 to the traction motor 108 to supply power from storage system 1304 to the traction motor 108 to assist in propelling the Off Highway Vehicle. In the circuits described in FIG. 9A through 9G, it can be seen that the transfer of power between prime mover, energy storage and traction can be done with power electronic switches and alternator control. It can also be seen that the amount of power transfer need not be at discrete steps and can be continuously varied. It should also be obvious from FIGS. 9A thru 9G the alternator, energy storage and traction system are all connected to the same bus and can transfer power between one another easily and also share the loads. For example, alternator and energy storage can supply power simultaneously to the traction motor.

The load processor 1502 controls the switch 1512 to control the amount of power supplied from the energy storage system 1304 to assist the Off Highway Vehicle effort (i.e., to supplement and/or replace primary energy source power) during a large throttle down. For example, when the traction demand signal 1508 is reduced rapidly due to a large throttle down, the load sensor 1504 generates a traction demand signal 1508 having a smaller magnitude than the magnitude of the last traction demand signal 1508 stored in a memory 1506. When the calculated transient parameter indicates the engine 102 demand is reduced rapidly (e.g., −20%), the load processor 1502 provides power from the engine 102 to the energy storage system 1304 such that the engine load can be slowly decreased. As a result, if a traction demand increases rapidly, the engine 102 can be loaded faster (achieve required torque), and operators can perform quick maneuvers of the vehicle while reducing engine transients that would otherwise be experienced. Reducing engine transients not only provides better truck handling, but also provides for an overall improvement in the fuel economy of the Off Highway Vehicle. Moreover, load processor 1502 could also assist in preventing turbo stalls experienced occasionally in the present Off Highway Vehicles during quick maneuvers.

In another embodiment of the invention, the load control system 1302 provides transient power from the energy storage system 1304 and steady state power from the engine 102. That is, when the engine 102 is supplying a substantially constant load to the traction motor 108 (e.g., when the Off Highway Vehicle traveling at a constant speed on a path having on a substantially level surface), the load processor 1502 selectively limits the power being provided to the traction motor 108 to power output from the prime mover power source 104. In contrast, during a transient power condition caused, for example, by steering pump cycling, auxiliary power, roadbed variation (bumps), and speed control (e.g., grade/rolling resistance variations), the load control system selectively provides additional electrical power to or from the storage subsystem to the traction motor 108 to assist in propelling the Off Highway Vehicle.

For example, when the Off Highway Vehicle is traveling at a desired speed along a particular path for a particular duration and the engine 102 is supplying a substantially constant amount of power to the traction motor 108, the engine is said to be operating in a steady state condition. When the engine 102 experiences a transient condition such as a steeper grade encounter by the Off Highway Vehicle along the path, addition traction power is required to propel the Off Highway Vehicle at the desired speed. The load sensor 1504 senses the increased traction power demand and generates the traction demand signal 1508. The load processor 1502 calculates a transient parameter representative of the difference in magnitude between the traction demand signal 1508 generated during the steady state condition (i.e., magnitude of the last traction demand signal stored in the memory 1506) and the current traction demand signal 1508 generated during the transient condition. In this instance, because the off highway vehicle encountered a steeper grade, the transient parameter indicates an increasing traction demand (i.e., positive percentage). The load processor 1502 is responsive to the transient parameter to provide additional power from the energy storage system 1304 to the traction motor 108 to assist in propelling the Off Highway Vehicle. In other words, the greater the calculated difference, the more electrical power the load processor 1502 supplies to traction motor 108 from the storage subsystem.

Similarly, when the engine experiences a transient condition such as a declining grade encounter by the Off Highway Vehicle along the path, less traction power is required to propel the Off Highway Vehicle at the desired speed. The load sensor 1504 senses the decreased traction power demand and generates the traction demand signal 1508. The load processor 1502 calculates a transient parameter representative of the difference in magnitude of the traction demand signal 1508 generated during the steady state condition (i.e., magnitude of the last traction demand signal 1508 stored in the memory 1506) and the current traction demand signal 1508 generated during the transient condition. In this instance, because the Off Highway Vehicle encountered a declining grade, the transient parameter indicates a decreasing traction demand (i.e., negative percentage). In this case, the load processor 1502 is responsive to the transient parameter to provide the excess power received from the power source to the energy storage system 1304 for storage as secondary electric power.

In another embodiment, while the Off Highway Vehicle is traveling at a desired speed, the load control circuit 1408 is responsive to relatively quick changes from an uphill grade to a downhill grade (e.g., bumps) to transfer power from the energy storage system 1304 to the traction motor and to transfer power from the power source to the storage system, respectively. In one such embodiment, the engine 102 is responsive to a desired speed set point as defined by an operator to provide a target amount of electrical power to the traction motor 108 to propel the off highway vehicle at the desired speed. The load sensor 1504 senses the magnitude of traction power currently being used to drive the traction motor 108. The load processor 1502 compares the sensed magnitude of traction power to the target amount of electrical power. If the sensed magnitude is less than the target amount of electrical power, the load processor 1502 outputs the second output signal 1516 to activate the switch 1512 that connects the storage system 1304 to the traction motor 108 to supply power from storage system 1304 to the traction motor 108 to assist in propelling the Off Highway Vehicle. If the sensed magnitude is greater than the target amount of electrical power; the load processor 1502 deactivates the switch 1510 such that contacts A1 and A2 are connected, and, electrical power provided from the prime mover power source 104 is transferred to the energy storage system 1304 for storage as secondary power.

In another embodiment, the load control circuit 1408 selectively supplies secondary electrical power from the energy storage system 1304 to the traction motor 108 as a function a load control profile stored in the memory 1506. The load control profile represents a preferred response of the Off Highway vehicle based on a command parameter and an operating parameter as sensed by sensors 1402, 1404, respectively. For example, the load control profile defines target magnitudes for the load control signal 1410 as a function of differences between the sensed command and operating parameters. The processor 1406 is linked to the memory 1506 and is responsive to the load control profile, the sensed operating parameter and sensed operating parameter to generate a target load control signal (i.e., load control signal 1410.) The load processor 1502 is responsive to the target load control signal to provide a maximum amount of secondary electrical energy to assist in propelling the Off Highway Vehicle without wasting the stored energy. In other words, the processor 1406 determines the difference between command and operating parameters, and generates a load control signal 1410 based on the load control profile to achieve the most efficient response of the off highway vehicle.

Presently, during an off highway vehicle speed control operation, the engine 102 runs at a higher speed than necessary for the average power needed. The purpose of running the engine 102 at a higher speed is to allow faster transient loading and, thus, better speed control. However, if the energy storage system provides the transient power, the engine speed could be reduced to the level required to provide only the average power, thus improving fuel economy.

Historically, when off highway vehicle operate at mid-throttle (between idle and full throttle), the engine 102 runs at a speed higher than necessary to make the power required. The higher speed is required so the engine can produce additional torque to accelerate if the operator commands more power. However, as described above, the load control system 1302 of the present invention allows such additional load to be supplied from the storage system 1304, thereby decreasing the amount of additional torque required by the engine 102 to accelerate if the operator commands more power. As a result, the engine runs closer to its maximum torque line, which is typically a more efficient operating point.

Another advantage of the present invention is that the load control system can propel the off highway vehicle even when the engine is not operable due to failures or conditions (e.g., inside buildings). For example, the load control system is responsive to operator input to provide power to the traction motor 108 from the storage system 1304 to propel the off highway vehicle.

Another advantage of the present invention is that even if an engine stalls or if for any reason if power production from the alternator/rectifier collapses (e.g., alternator/excitation failure) such that subsequent braking is not possible since the traction motor 108 requires flux to be produced to initiate braking, the storage device could be used to provide the initial power for flux build up.

Figure 16:
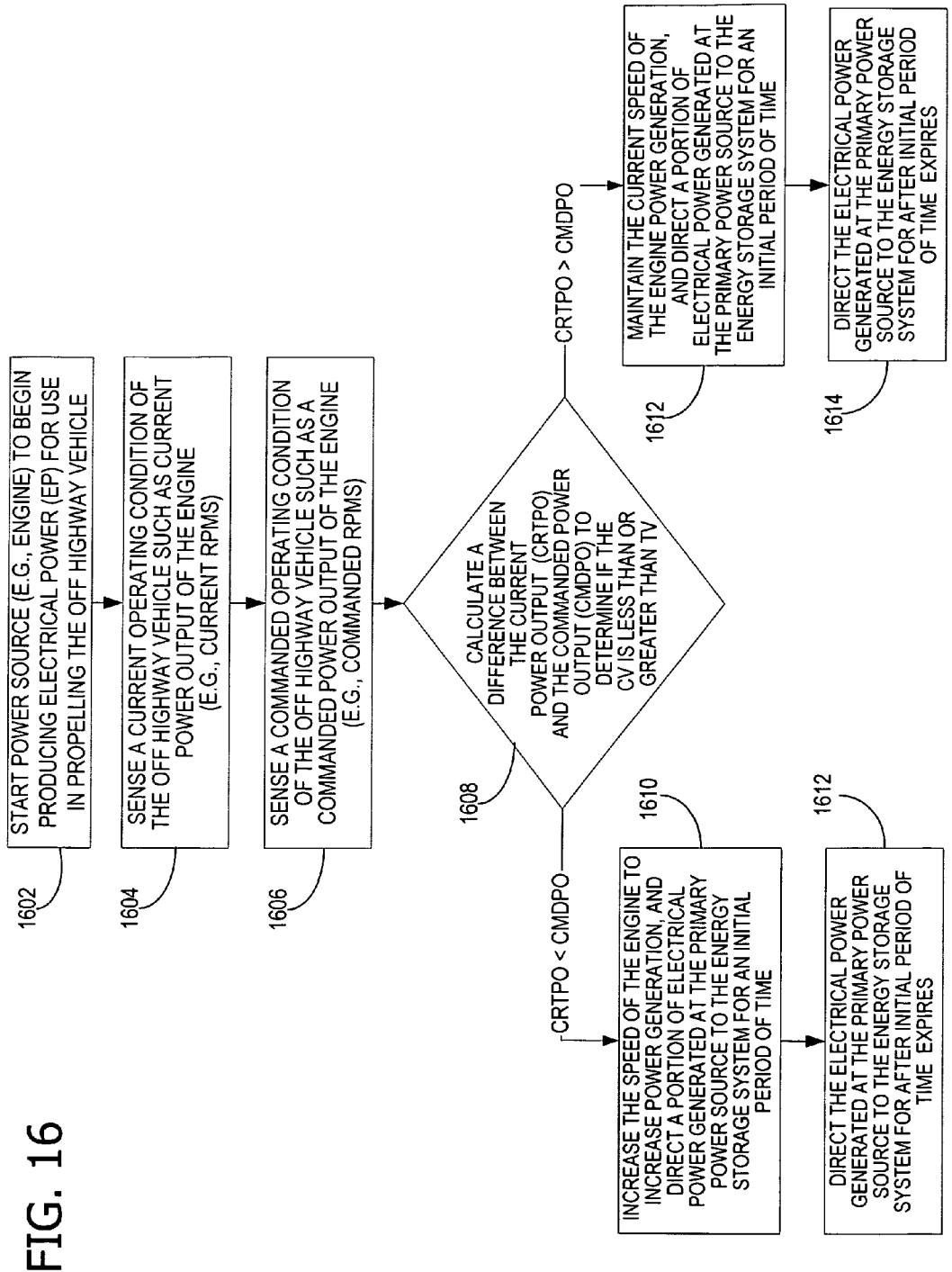
FIG. 16 is a flow chart that illustrates one method of load control suitable for use in connection with a hybrid energy vehicle.

Referring now to FIG. 16, a flow chart illustrates one method of load control suitable for use in connection with a hybrid energy vehicle. At 1602 a power source such as an engine is started to generate electrical power to drive the traction motor and propel the off highway vehicle. At 1604, the load control system senses a current operating condition of the off highway vehicle such as the current power output being generated by the power source. The load control system senses a commanded operating condition of the Off Highway Vehicle such as a commanded power output of the engine, for example, by operator input at 1606. At 1608, the load control system calculates a difference between the current operating condition and the commanded operating condition, and controls the delivery of power from the power source to the traction motor, and from the power source to an energy storage system as function of the calculated difference to control the generation, transmission, and storage of power on the vehicle. If the load control system determines that the current power output of the engine is less than the commanded power output of the engine at 1608, the load control system increases the speed of the engine to increase power generation, and directs a portion of electrical power generated at the primary power source to the energy storage system for an initial period of time at 1610. For example, the portion of generated electrical power being directed to the energy storage system during the initial period corresponds to an amount of electrical power being generated by the primary power source that exceeds the power output energy required to propel the Off Highway Vehicle at the current velocity. Notably, if the Off Highway vehicle is parked, or idling, the current velocity is zero and substantially all of the generated electrical power can be directed to the energy storage system during the initial period for storage. At 1612, the load control system directs the electrical power generated at the primary power source to the traction motor system after the initial period of time expires. If the load control system determines that the current power output from the engine is greater than the commanded power output at 1608, the load control system maintains the current speed of the engine to maintain the current power output, and directs a portion of the transmission of electrical power generated at the primary power source to the energy storage system for an initial period of time at 1614. For instance, the portion of generated electrical power being provided to the energy storage system corresponds to an amount of electrical energy being generated by the primary power source that exceeds the commanded power output. After the initial period of time expires, the load control system decreases the engine speed until the engine generate an amount of electrical power equal to the commanded power out and directs the electrical power generated at the primary power source to the traction motor system to propel the Off highway Vehicle at the commanded velocity at 1616.

Figure 17:
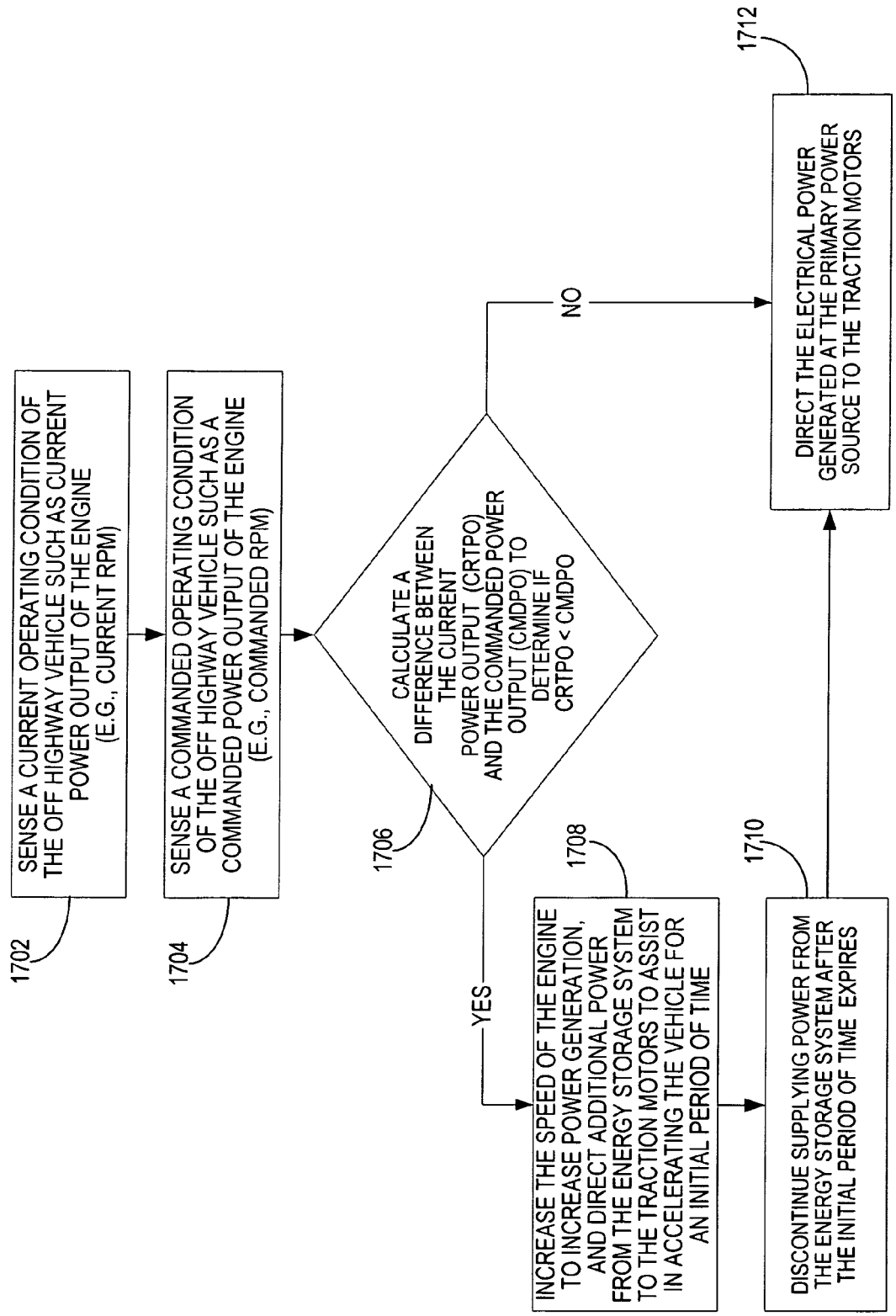
FIG. 17 is a flow chart that illustrates another method of load control suitable for use in connection with a hybrid energy vehicle.

Referring now to FIG. 17, a flow chart illustrates another method of load control suitable for use in connection with a hybrid energy vehicle. At 1702, the load control system senses a current operating condition of the off highway vehicle such as the current power output being generated by the power source. The load control system senses a commanded operating condition of the Off Highway Vehicle such as a commanded power output of the engine, for example, by operator input at 1704. At 1706, the load control system calculates a difference between the current operating condition and the commanded operating condition, and controls the delivery of power from the power source to the traction motor, and from the power source to an energy storage system as function of the calculated difference to control the generation, transmission, and storage of power on the vehicle. If the load control system determines that the current power output of the engine is less than the commanded power output of the engine at 1706, the load control system increases the speed of the engine to increase power generation, and directs additional power from the energy storage system to the traction motors to assist in accelerating the vehicle for an initial period of time at 1708. For example, the portion of the generated electrical power being directed from the energy storage system during the initial period corresponds to a difference between the amount of electrical power being generated by the primary power source and the amount of power output energy required to propel the Off Highway Vehicle at the commanded velocity. In other words, the energy storage provides the additional power (e.g., transient power) required to propel the Off Highway Vehicle at the commanded velocity. After the initial time period expires, the load control system discontinues supplying power from the energy storage system to the traction motors at 1710. After the load control discontinues supplying power from the energy storage system at 1710, or if the current power output of the engine is not less than the commanded power output of the engine at 1706, the load control system directs power from the primary power source to the traction motors to propel the vehicle 1712.

When introducing elements of the present invention or preferred embodiments thereof, the articles a, an, the, and said are intended to mean that there are one or more of the elements. The terms comprising, including, and having are intended to be inclusive and mean that there may be additional elements other than the listed elements.

In view of the above, it will be seen that several objects of the invention are achieved and other advantageous results attained.

As various changes could be made in the above exemplary constructions and methods without departing from the scope of the invention, it is intended that all matter contained in the above description or shown in the accompanying drawings shall be interpreted as illustrative and not in a limiting sense. It is further to be understood that the steps described herein are not to be construed as necessarily requiring their performance in the particular order discussed or illustrated. It is also to be understood that additional or alternative steps may be employed with the present invention.

The invention claimed is:

1. A hybrid off-road vehicle having a high load to power ratio, the vehicle comprising wheels supporting the vehicle, a primary power source on the vehicle for generating primary electrical power, said power source comprising an engine and an electrical power generator, a traction motor system associated with at least one of the wheels for rotating the wheel to propel the vehicle, and said primary power source having a pre-loaded mode of operation during which the off-road highway vehicle is not being propelled during a starting-up of the engine and a loaded mode of operation during which the off-road highway vehicle is being propelled, an electric energy storage system on the vehicle for storing and discharging electrical power, said hybrid off-road vehicle comprising:
a load control circuit electrically connected to the primary power source, the energy storage system and the traction motor system for selectively delivering power from the power source to the traction motor system and from the power source to the energy storage system;
a first sensor for sensing a command parameter indicative of a commanded operating condition of the vehicle, a second sensor for sensing an operating parameter indicative of a current operating condition of the vehicle; and
a processor responsive to the command and operating parameters for generating a control signal provided to the load control circuit, said load control circuit responsive to the control signal to selectively control the delivery of the power from the power source to the energy storage system during the pre-loaded mode of operation.

2. The hybrid vehicle of claim 1 wherein the commanded parameter sensed by the first sensor is of a type corresponding to that of the operating parameter, and wherein the processor generates the control signal as a function of a difference between the operating and commanded parameters.

3. The vehicle of claim 1 wherein:
the command parameter specifies a commanded power output of the power source;
when the operating parameter indicates a current power output less than the commanded power output then the control signal generated by the processor causes a speed of the engine to increase in response to the command and operating parameters; and
the load control circuit directs at least a portion of the transmission of electrical power generated at the primary power source to the energy storage system during the pre-loaded mode, and directs the transmission of electrical power generated at the primary power source to the traction motor system during the loaded mode.

4. The hybrid vehicle of claim 3 wherein the power output corresponds to a speed of the engine speed of rotation.

5. The hybrid vehicle of claim 3 wherein the pre-loaded mode, corresponds to a preset amount of time.

6. The hybrid vehicle of claim 3 wherein the pre-loaded mode corresponds to a period of time required for the electrical power generated at the power source to increase to a threshold amount of power output.

7. The hybrid vehicle of claim 3 wherein the portion of generated electrical power being directed to the energy storage system during the pre-loaded mode corresponds to an amount of electrical power being generated by the primary power source that exceeds the power output indicated by the sensed operating parameter.

8. The hybrid vehicle of claim 3 wherein:
when the operating parameter indicates a current power output greater than the commanded power output then the control signal generated by the processor causes a speed of the engine to be maintained at a current speed in response to the command and operating parameters; and
the load control circuit directs transmission of a portion of the electrical power generated at the primary power source to the energy storage system during the pre-loaded mode.

9. The hybrid vehicle of claim 8 wherein the current speed of the engine is maintained for a predetermined time after the first sensor senses a commanded power output that corresponds to a reduction from the current power output.

10. The hybrid vehicle of claim 8 wherein the portion of generated electrical power being provided to the energy storage system corresponds to an amount of electrical energy being generated by the primary power source that exceeds the commanded power output.

11. The hybrid vehicle of claim 8 wherein the load control circuit controls a first switch for selectively interconnecting the primary power source to the storage system or to the traction motor system, wherein during the pre-loaded mode the load control circuit controls the switch so that the electrical power generated at the primary power source is directed to the storage system for storage, and during the loaded mode the load control circuit controls the switch so that the generated electrical energy is provided to the traction motor system to propel the off highway vehicle.

12. The hybrid vehicle of claim 11 wherein the load control circuit further controls a second switch for selectively interconnecting the storage system to the traction motor system, wherein the processor is responsive to the command and operating parameters to control the load control circuit to control the second switch so that the stored electrical energy is transferred from the storage system to the traction motor system to supplement the primary electric power to propel the off highway vehicle.

13. The hybrid vehicle of claim 1 wherein the load control circuit directs the transmission of power stored in the storage system to the traction motor system to assist in propelling the vehicle when vehicle movement is initiated.

14. The hybrid vehicle of claim 1 wherein the traction motor system comprises a motoring mode for receiving electrical power to propel the vehicle and a power generation mode for generating secondary electrical power by slowing the movement of the vehicle, with the load control circuit directing the transmission of secondary electrical power generated by the traction motor system to the energy storage system for storage.

15. The hybrid vehicle in claim 14 wherein the load control circuit directs the transmission of excess electrical power being generated by the power source to the energy storage system when the current power output being generated by the power source is greater than the commanded power output, and directs the transmission of electrical power from the energy storage system to the traction motor system when the current power output is less than the commanded power output.

16. The hybrid vehicle of clam 15 wherein the difference in the current power output and the commanded power output is due to relatively rapid changes of throttle positions.

17. The hybrid vehicle of claim 15 wherein the difference in the current power output and the commanded power output is due to variations in a terrain over which the vehicle travels.

18. The hybrid vehicle of claim 15 further comprising at least one auxiliary electrical power usage device electrically connected to the load control circuit, with the load control circuit directing the transmission of power from the energy storage system to the auxiliary electrical power usage device when the device operates so as to maintain the electrical load on the primary power source generally constant.

19. The hybrid vehicle of claim 15 wherein the load control circuit directs the transmission of electrical power from the energy storage system to the traction motor system to propel the vehicle if the primary power source is not operating.

20. The hybrid vehicle of claim 15 wherein the load control circuit directs the transmission of electrical power from the energy storage system to the traction motor system for applying flux voltage to enable secondary power generation at the traction motor system when in the power generation mode, if the primary power source is not operating.

21. The hybrid vehicle of claim 15 further comprising resistance grids for dissipating electrical power, with the load control circuit further being electrically connected to the resistance grids and selectively directing the transmission of excess electrical power generated by the traction motor system when operating in the power generating mode.

22. The hybrid vehicle of claim 1 wherein the primary power source is a fuel cell.

23. The hybrid vehicle of claim 1 wherein the energy storage system comprises a fuel cell.

24. The hybrid vehicle of claim 1 wherein the off-road highway vehicle is a dump vehicle or a locomotive.

25. The hybrid vehicle of claim 1, wherein during the pre-loaded mode of operation the generated primary electric power is less than a threshold amount of power required to drive the traction motor, and wherein during the loaded mode of operation the primary electric power is greater than the threshold amount of power required to drive the traction motor and propel the off-road highway vehicle.

26. The hybrid vehicle of claim 1, wherein the pre-loaded mode and loaded mode are mutually exclusive.

27. A method for managing electrical power generated by a power source for use in connection with operating a hybrid energy off highway vehicle, wherein the vehicle includes wheels supporting the vehicle, the primary power source on the vehicle for generating primary electrical power, said power source including an engine and an electrical power generator, said engine having a pre-loaded mode of operation during which the off-road highway vehicle is not being propelled during a starting-up of the engine and a loaded mode of operation during which the off-road highway vehicle is being propelled, a traction motor system associated with at least one of the wheels for rotating the wheel to propel the vehicle, said method comprising:

sensing an operating parameter of the off highway vehicle, said operating parameter being indicative of a current operating condition;

sensing a commanded parameter for the off highway vehicle, said commanded parameter being indicative of a commanded operating condition;

calculating a difference between the current operating condition and the commanded operating condition; and selectively controlling the delivery of the power from the power source to an energy storage system as function of the calculated difference during the pre-loaded mode of operation.

28. The method of claim 27 wherein sensing a current operating condition includes sensing a current power output being generated by the power source, and wherein sensing the commanded operating condition includes sensing a commanded power output.

29. The method of claim 28 wherein the power output corresponds to a speed of the engine in revolutions per minute (rpm), and further including increasing a speed of the engine and power generation in response to the command and operating parameters when the sensed current power output is less than the sensed commanded power output, and wherein selectively controlling the delivery of the power from the power source includes directing at least a portion of the transmission of electrical power generated at the primary power source to the energy storage system during the pre-loaded mode of operation, and then directing the transmission of electrical power generated at the primary power source to the traction motor system during the loaded mode of operation.

30. The method of claim 29 wherein the the pre-loaded mode corresponds to a period of time required for the electrical power generated at the power source to increase to a threshold amount of power output.

31. The method of claim 29 wherein the portion of generated electrical power being directed to the energy storage system during the pre-loaded mode of operation corresponds to an amount of electrical power being generated by the primary power source that exceeds the current power output.

32. The method of claim 27 further including directing the transmission of electrical power from the energy storage system to the traction motor system to propel the vehicle if the primary power source is not operating.

33. The method of claim 27 wherein the traction motor system comprises a motoring mode for receiving electrical power to propel the vehicle and a power generation mode for generating secondary electrical power by slowing the movement of the vehicle, and wherein the method further includes directing the transmission of electrical power from the energy storage system to the traction motor system for applying flux voltage to enable secondary power generation at the traction motor system when in the power generation mode, if the primary power source is not operating.

* * * * *